(12) United States Patent
Seong et al.

(10) Patent No.: US 11,407,318 B2
(45) Date of Patent: Aug. 9, 2022

(54) METHOD AND APPARATUS FOR CONTROLLING WIRELESS POWER TRANSFER

(71) Applicants: Hyundai Motor Company, Seoul (KR); Kia Motors Corporation, Seoul (KR); Myongji University Industry and Academia Cooperation Foundation, Gyeonggi-do (KR)

(72) Inventors: Jae Yong Seong, Gyeonggi-Do (KR); Min Ho Shin, Gyeonggi-do (KR)

(73) Assignees: Hyundai Motor Company, Seoul (KR); Kia Motors Corporation, Seoul (KR); Myongji University Industry and Academia Cooperation Foundation, Gyeonggi-do (KR)

( * ) Notice: Subject to any disclaimer, the term of this patent is extended or adjusted under 35 U.S.C. 154(b) by 0 days.

(21) Appl. No.: 17/477,696

(22) Filed: Sep. 17, 2021

(65) Prior Publication Data
US 2022/0001756 A1    Jan. 6, 2022

Related U.S. Application Data

(63) Continuation of application No. 16/854,482, filed on Apr. 21, 2020, now Pat. No. 11,148,537.
(Continued)

(30) Foreign Application Priority Data

Apr. 6, 2020    (KR) ................. 10-2020-0041422

(51) Int. Cl.
*H02J 50/80*    (2016.01)
*H02J 50/90*    (2016.01)
(Continued)

(52) U.S. Cl.
CPC ............. *B60L 53/12* (2019.02); *B60L 53/126* (2019.02); *B60L 53/38* (2019.02); *B60L 53/65* (2019.02);
(Continued)

(58) Field of Classification Search
CPC ........ B60L 53/10; B60L 53/12; B60L 53/126; B60L 53/35; B60L 53/38; B60L 53/39; B60L 53/65; B60L 53/66; H02J 7/00034; H02J 7/00045; H02J 7/02; H02J 50/10; H02J 50/12; H02J 50/80; H02J 50/90
See application file for complete search history.

(56) References Cited

U.S. PATENT DOCUMENTS 9,315,109 B2    4/2016    Marathe et al.
2015/0283909 A1    10/2015    Ichikawa et al.
(Continued)

*Primary Examiner* — Levi Gannon
(74) *Attorney, Agent, or Firm* — Fox Rothschild LLP

(57) ABSTRACT

A method for controlling wireless power transfer (WPT), performed by an electric vehicle (EV) device receiving power from a supply device is provided. The method includes checking service details regarding at least one method for fine positioning and pairing between the supply device and the EV device and selecting a service. Fine positioning is performed with the supply device according to a pairing method associated with the selected service. Additionally, LF pairing is performed based on the selected service; an initial alignment check is performed using pre-charging power transmission; and LPE pairing is performed based on the selected service and a result of the initial alignment check.

20 Claims, 57 Drawing Sheets

Related U.S. Application Data

(60) Provisional application No. 62/990,143, filed on Mar. 16, 2020, provisional application No. 62/842,160, filed on May 2, 2019, provisional application No. 62/839,347, filed on Apr. 26, 2019.

(51) Int. Cl.
| | |
|---|---|
| *B60L 53/12* | (2019.01) |
| *H02J 50/10* | (2016.01) |
| *B60L 53/66* | (2019.01) |
| *B60L 53/38* | (2019.01) |
| *H02J 7/02* | (2016.01) |
| *H02J 7/00* | (2006.01) |
| *B60L 53/65* | (2019.01) |
| *B60L 53/126* | (2019.01) |

(52) U.S. Cl.
CPC .......... *B60L 53/66* (2019.02); *H02J 7/00045* (2020.01); *H02J 7/02* (2013.01); *H02J 50/10* (2016.02); *H02J 50/80* (2016.02); *H02J 50/90* (2016.02)

(56) References Cited

U.S. PATENT DOCUMENTS

| | | |
|---|---|---|
| 2016/0325632 A1 | 11/2016 | Ichikawa |
| 2017/0066335 A1 | 3/2017 | Verghese et al. |
| 2018/0152057 A1 | 5/2018 | Misawa |
| 2019/0184842 A1 | 6/2019 | Waters |
| 2019/0232733 A1 | 8/2019 | Patel et al. |

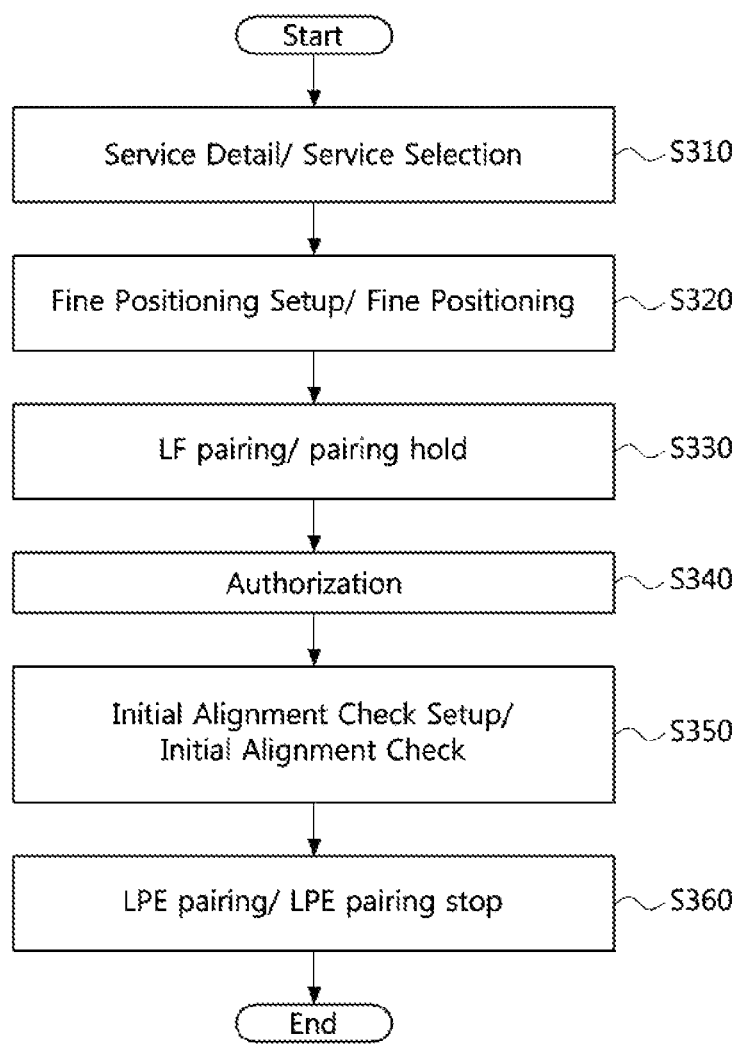

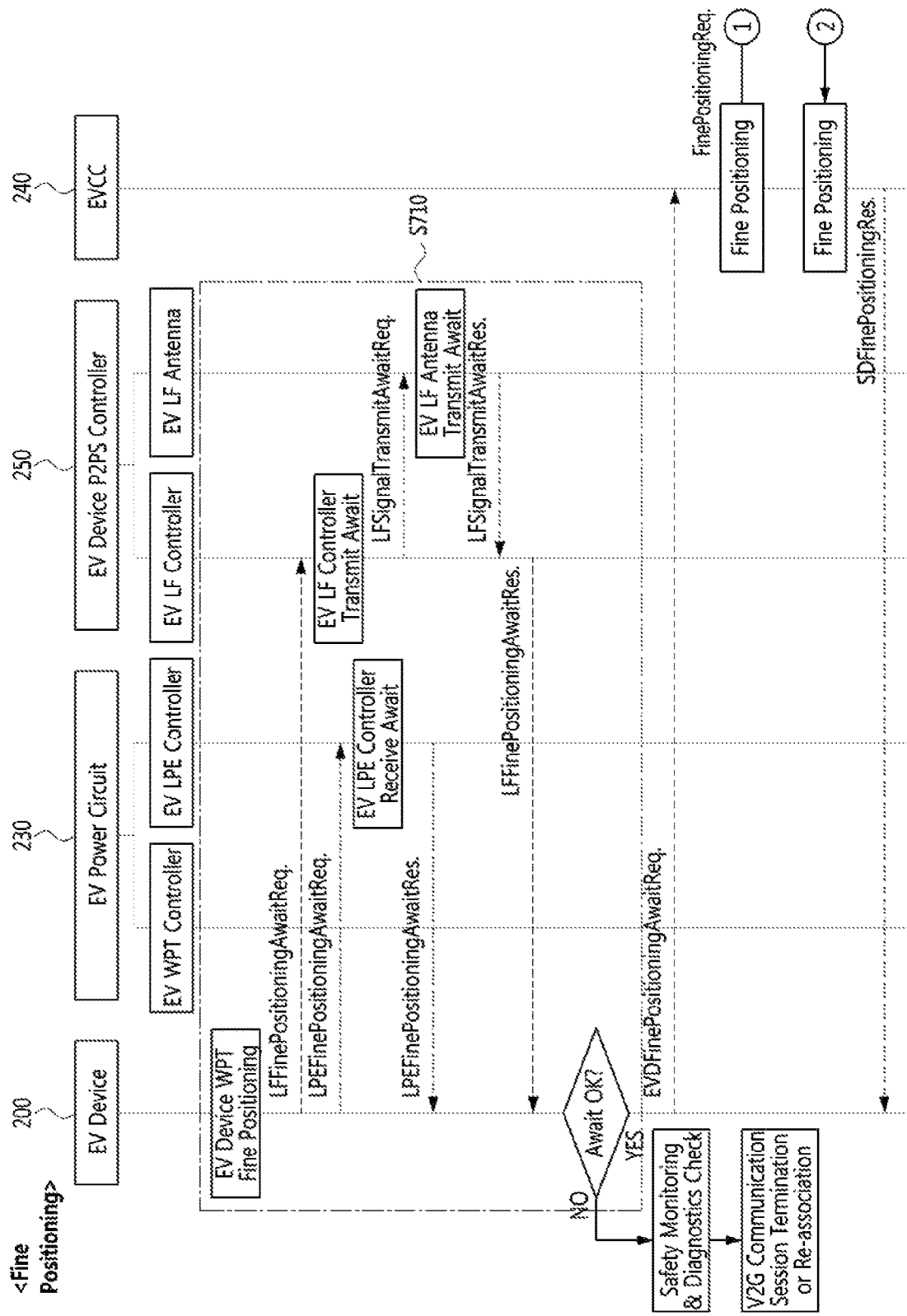

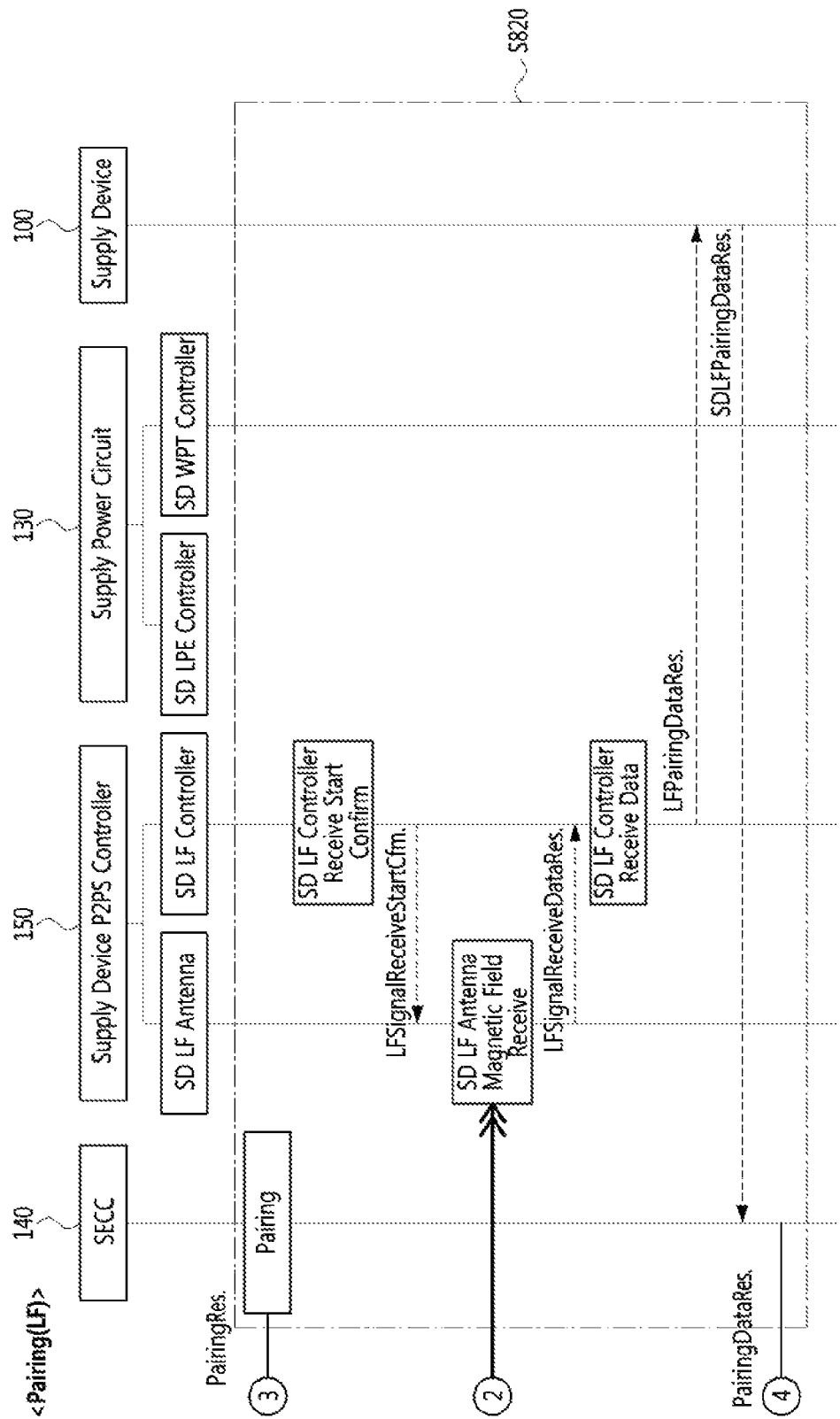

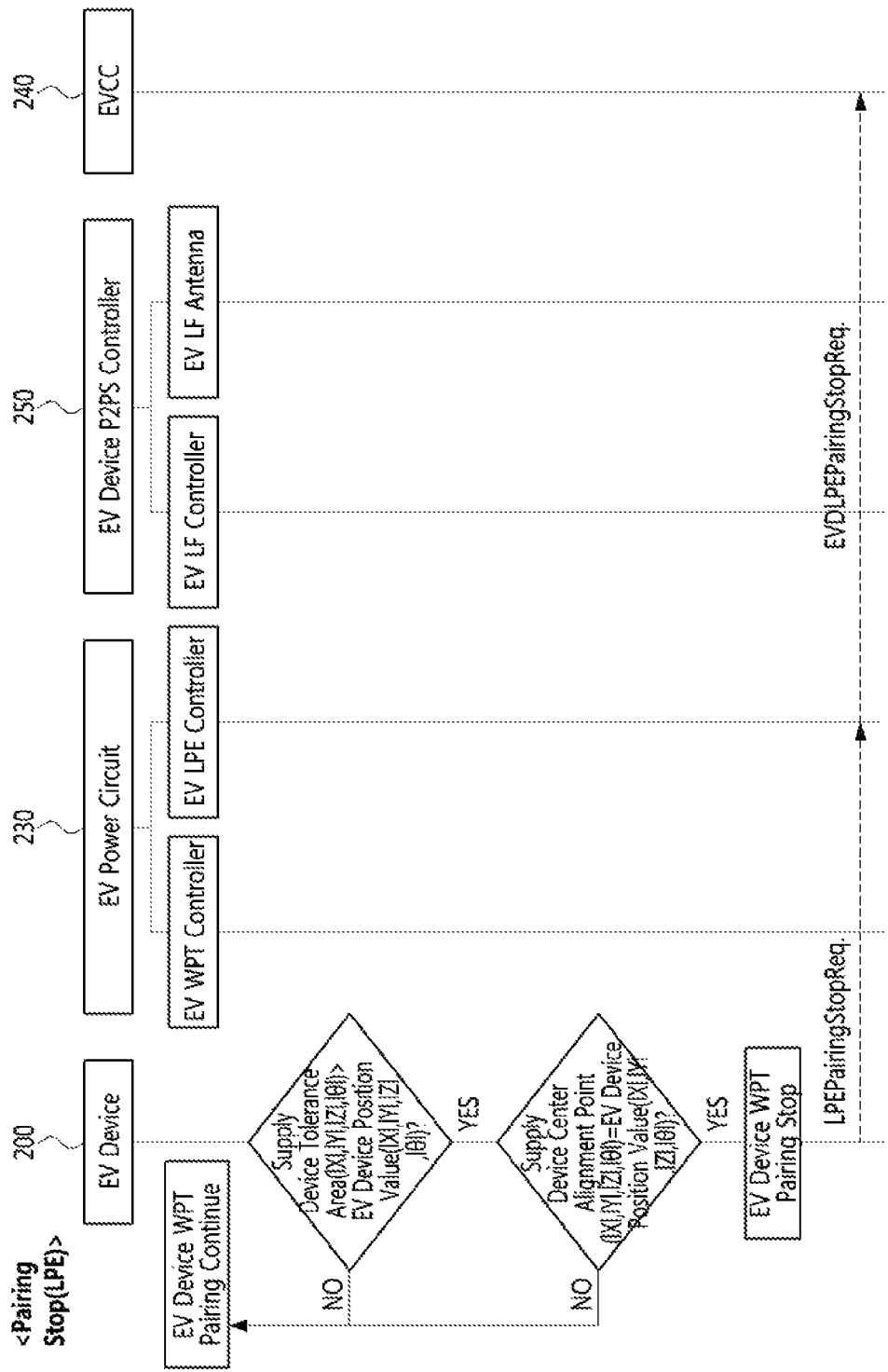

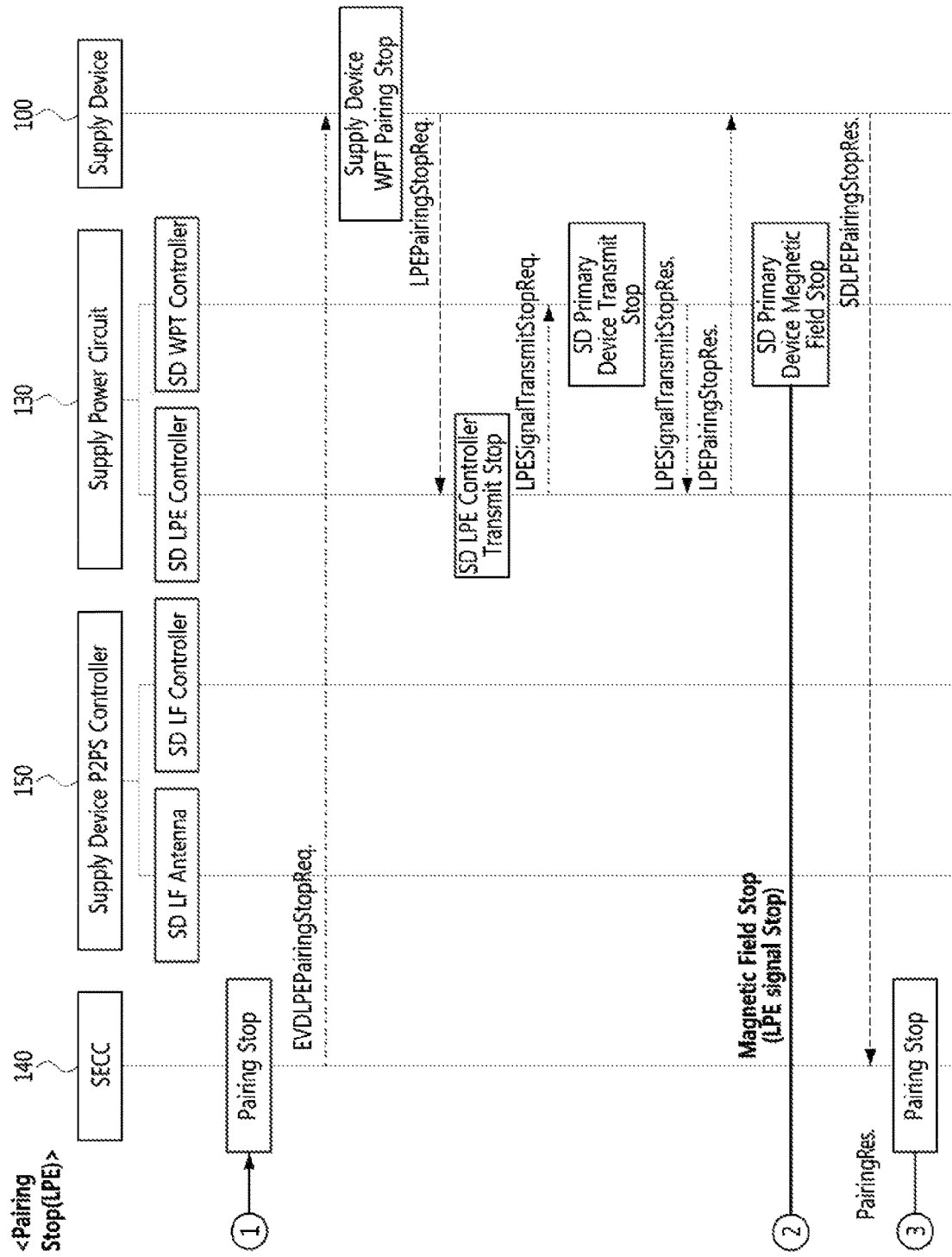

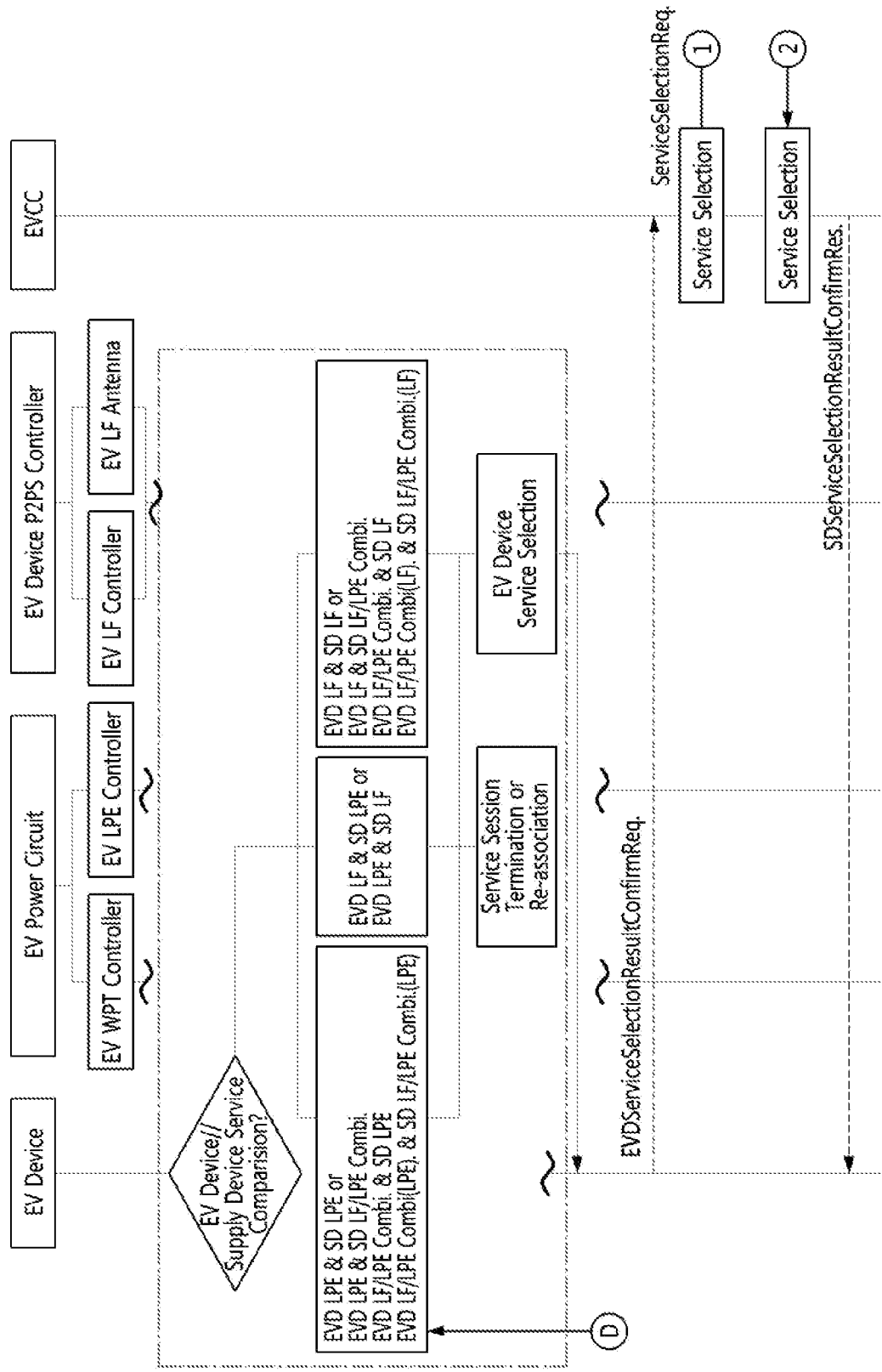

METHOD AND APPARATUS FOR CONTROLLING WIRELESS POWER TRANSFER

CROSS-REFERENCES TO RELATED APPLICATIONS

The present application is a Continuation Application of U.S. Ser. No. 16/854,482, filed on Apr. 21, 2020, which claims the benefit of priority to U.S. Provisional Patent Applications No. 62/839,347 filed on Apr. 26, 2019, No. 62/842,160 filed on May 2, 2019 and No. 62/990,143 filed on Mar. 16, 2020 with the U.S. Patent and Trademark Office, and Korean Patent Application No. 10-2020-0041422 filed on Apr. 6, 2020 with the Korean Intellectual Property Office (KIPO), the entire contents of which are incorporated herein by reference.

TECHNICAL FIELD

The present disclosure relates to a method and an apparatus for controlling wireless power transfer, and more specifically, to a method for controlling wireless power transfer performed by an electric vehicle (EV), an apparatus for controlling wireless power transfer and a supply device.

BACKGROUND

An electric vehicle (EV) drives an electric motor by a power of a battery, and has less air pollution sources such as exhaust gas and noise compared with a conventional gasoline engine vehicle, fewer failures, a long life span, and, advantageously, the operation of the EV is simplified. The EVs are classified into hybrid electric vehicles (HEVs), plug-in hybrid electric vehicles (PHEVs), and electric vehicles (EVs), based on a driving source. The HEV has an engine as a main power and a motor as an auxiliary power. The PHEV has a main power motor and an engine used when a battery is discharged. The EV has a motor, but the EV does not have an engine.

An electric vehicle (EV) charging system may be defined as a system for charging a high-voltage battery mounted within an EV using power of an energy storage device or a power grid of a commercial power source. The EV charging system may have various forms according to the type of EV. For example, the EV charging system may be classified as a conductive-type using a charging cable or a non-contact wireless power transfer (WPT)-type (also referred to as an "inductive-type").

The EV charging control may be performed via a communication protocol between an EV and a charging station. Therefore, the controls on an EV charging session should be performed by the charging station or the EV. At this time, a user is required to check the status of the charging of the EV or control the charging progress.

SUMMARY

The present disclosure provides a method for controlling wireless power transfer performed by an electric vehicle (EV) and an apparatus for controlling wireless power transfer. The present disclosure also provides a method for wireless power transfer (WPT) performed by a supply device.

According to exemplary embodiments of the present disclosure, a method for controlling wireless power transfer (WPT), performed by an electric vehicle (EV) device receiving power from a supply device, may include checking service details regarding at least one method for fine positioning and pairing between the supply device and the EV device and selecting a service; performing fine positioning with the supply device based on a pairing method associated with the selected service; performing LF (Low Frequency) pairing based on the selected service; performing an initial alignment check using pre-charging power transmission; and performing Low Power Excitation (LPE) pairing based on the selected service and a result of the initial alignment check.

The performing of an initial alignment check using pre-charging power transmission may include determining whether to perform a WPT fine positioning and pairing renegotiation based on the pre-charging power received from the supply device. The determining of whether to perform a WPT fine positioning and pairing renegotiation based on the pre-charging power received from the supply device may include determining whether a minimum power transfer efficiency of the pre-charging power is greater than or equal to a reference value; confirming that a misalignment has occurred when the minimum power transmission efficiency is less than a reference value; and determining to perform the WPT fine positioning and pairing renegotiation according to the misalignment.

A service discovery response message provided by the supply device for checking the service detail may include a parameter that indicates whether a service renegotiation is possible. The service renegotiation may be triggered through a charging loop message by the supply device or a power delivery request (PowerDeliveryReq) message by the EV device during charging. The service renegotiation may also be triggered when the supply device and the EV device wake up from a charging paused period.

The method may further include, in response to determining a WPT fine positioning and pairing renegotiation, re-executing the steps of checking the service details and selecting a service, performing the fine positioning, and performing the LF pairing. Additionally, the method may include, after performing LF pairing, performing authentication between the EV device and the supply device. The performing of the LPE pairing based on the selected service and the result of the initial alignment check may be executed when the minimum power transmission efficiency is greater than or equal to the reference value.

Furthermore, according to exemplary embodiments of the present disclosure, an apparatus for controlling wireless power transfer (WPT) in an Electric Vehicle (EV) device, may include at least one processor and a memory configured to store at least one instruction executable by the at least one processor. When executed by the at least one processor, the at least one instruction is configured to: check service details regarding a method for fine positioning and pairing between the supply device and the EV device and select a service; perform fine positioning with the supply device based on a pairing method associated with the selected service; perform Low Frequency (LF) pairing based on the selected service; perform an initial alignment check using pre-charging power transmission; and perform Low Power Excitation (LPE) pairing based on the selected service and a result of the initial alignment check.

The apparatus for controlling WPT may further include an EV communication controller (EVCC) configured to communicate with the supply device using wireless communication; and an EV device P2PS controller forming a P2PS connection with the supply device using low frequency (LF) signals. A service discovery response message provided by the supply device for checking the service detail may include a parameter that indicates whether a service renegotiation is possible.

The service renegotiation may be triggered through a charging loop message by the supply device or a power delivery request (PowerDeliveryReq) message by the EV device during charging or triggered when the supply device and the EV device wake up from a charging paused period. The at least one instruction is further configured to determine whether to perform a WPT fine positioning and pairing renegotiation based on the pre-charging power received from the supply device.

Additionally, the at least one instruction is configured to determine whether a minimum power transfer efficiency of the pre-charging power is greater than or equal to a reference value; confirm that a misalignment has occurred when the minimum power transmission efficiency is less than a reference value; and determine to perform the WPT fine positioning and pairing renegotiation according to the misalignment. The at least one instruction is further configured, in response to determining a WPT fine positioning and pairing renegotiation, to re-execute checking the service details and selecting a service, performing the fine positioning, and performing the LF pairing.

Furthermore, according to exemplary embodiments of the present disclosure, a wireless power transfer (WPT) method, performed by a supply device supplying power to an electric vehicle (EV) device, may include checking, in response to a service detail check request from the EV device, service statuses regarding at least one method for fine positioning and pairing between the supply device and the EV device and transmitting a response based on the check; performing fine positioning with the EV device according to a pairing method associated with a service selected by the EV device; performing Low Frequency (LF) pairing based on the selected service; transmitting pre-charging power to be used for initial alignment check to the EV device; performing Low Power Excitation (LPE) pairing based on the selected service and a result of the initial alignment check; and transferring power to the EV device.

A WPT fine positioning and pairing renegotiation may be determined by the EV device based on the pre-charging power. The wireless power transfer (WPT) method may further include, in response to determining a WPT fine positioning and pairing renegotiation, re-executing the steps of checking the service statuses and transmitting a response, performing the fine positioning, and performing the LF pairing. A service discovery response message provided by the supply device for checking the service detail may include a parameter that indicates whether a service renegotiation is possible. The service renegotiation may be triggered by the supply device or by the EV device during charging, or triggered when the supply device and the EV device wake up from a charging paused period.

According to the exemplary embodiments of the present disclosure, wireless power transmission may be provided with improved transmission efficiency by performing a Wireless Power Transfer (WPT) fine positioning renegotiation based on a transmission efficiency of pre-charge power.

BRIEF DESCRIPTION OF DRAWINGS

The present disclosure will become more apparent by describing in detail exemplary embodiments of the present disclosure with reference to the accompanying drawings, in which:

FIG. 3 is a schematic flowchart of wireless power transfer (WPT) according to an exemplary embodiment of the present disclosure;

FIGS. 7A to 7B are flowcharts of a fine positioning process in wireless power transfer according to an exemplary embodiment of the present disclosure;

FIGS. 8A to 8D are flowcharts of an LF pairing process in wireless power transfer according to an exemplary embodiment of the present disclosure;

FIGS. 14A to 14C are flowcharts of an LPE pairing stop process according to an exemplary embodiment of the present disclosure;

FIGS. 17A to 17D are flow charts of service selection and fine positioning setup in wireless power transfer according to another embodiment of the present disclosure;

Figure 1:
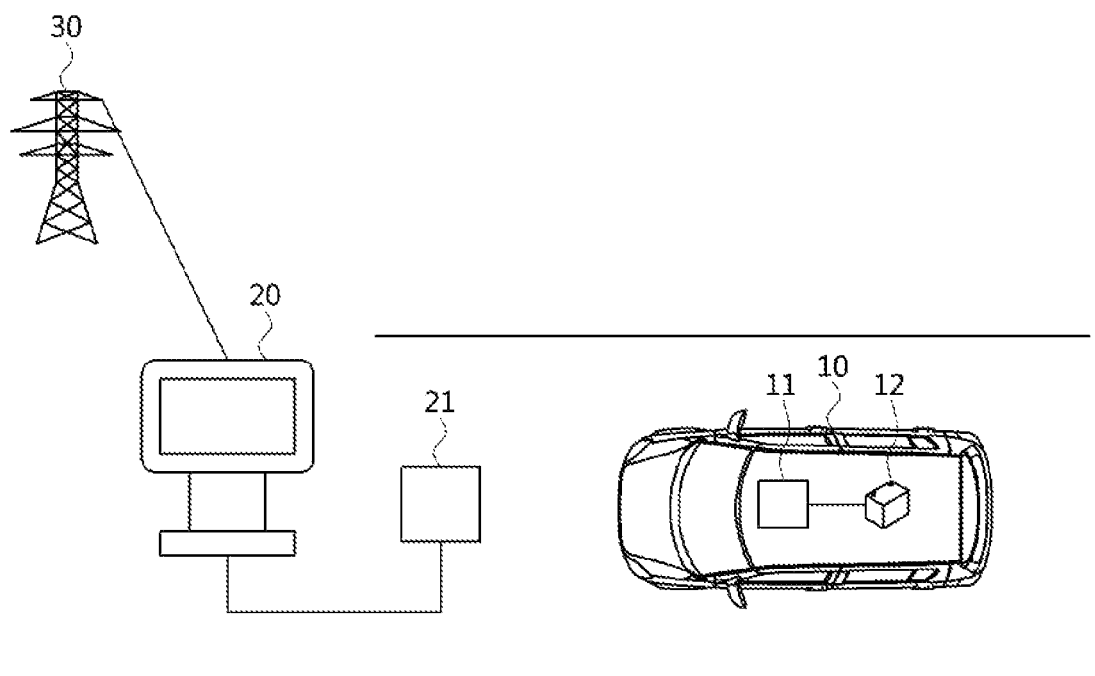
FIG. 1 is a conceptual diagram illustrating a concept of a wireless power transfer (WPT) to which exemplary embodiments of the present disclosure may be applied.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" may include any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure are disclosed herein. However, specific structural and functional details disclosed herein are merely representative for purposes of describing exemplary embodiments of the present disclosure; however, exemplary embodiments of the present disclosure may be embodied in many alternate forms and should not be construed as limited to exemplary embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, the component may be directly or indirectly connected to the other component. In other words, for example, intervening components may be present. On the contrary, when a component is referred to as being "directly connected to" another component, there are no intervening components.

Terms are used herein only to describe the exemplary embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. Terms defined in dictionaries generally used are interpreted as including meanings identical to contextual meanings of the related art, unless definitely defined otherwise in the present specification, are not interpreted as being ideal or excessively formal meanings.

Additionally, one or more of the below methods, or aspects thereof, may be executed by at least one controller. The term "controller" may refer to a hardware device that may include a memory and a processor. The memory is configured to store program instructions, and the processor is specifically programmed to execute the program instructions to perform one or more processes which are described further below. The controller may control operation of units, modules, parts, devices, or the like, as described herein. Moreover, the below methods may be executed by an apparatus comprising the controller in conjunction with one or more other components, as would be appreciated by a person of ordinary skill in the art.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

According to exemplary embodiments of the present disclosure, an EV charging system may be defined as a system for charging a high-voltage battery mounted in an EV using power of an energy storage device or a power grid of a commercial power source. The EV charging system may have various forms according to the type of EV. For example, the EV charging system may be classified as a conductive-type using a charging cable or a non-contact wireless power transfer (WPT)-type (also referred to as an "inductive-type"). The power source may include a residential or public electrical service or a generator utilizing vehicle-mounted fuel, and the like.

Additional terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be a four or more wheeled vehicle manufactured for use primarily on public streets or roads.

The EV may include an electric vehicle, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An EV that recharges the on-vehicle primary battery by connecting to the power grid.

"Plug-in vehicle (PV)": An electric vehicle rechargeable via wireless charging from an electric vehicle supply equipment (EVSE) without using a physical plug or a physical socket.

"Heavy duty vehicle (H.D. Vehicle)": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically via a two-part loosely coupled transformer.

"Wireless power transfer (WPT)": The transfer of electrical power from the alternating current (AC) supply network to the electric vehicle without contact.

"Utility": A set of systems which supply electrical energy and may include a customer information system (CIS), an advanced metering infrastructure (AMI), rates and revenue system, etc. The utility may provide the EV with energy based on a rates table and discrete events. Additionally, the utility may provide information about certification of EVs, interval of power consumption measurements, and a tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position that corresponds to a primary charger assembly that may transfer power. The automatic charging may be performed after obtaining necessary authentication and right.

"Interoperability": A state in which components of a system interwork with corresponding components of the system to perform operations aimed by the system.

Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side including the GA Coil, a power/frequency conversion unit and GA controller as well as the wiring from the grid and between each unit, filtering circuits, at least one housing, etc., necessary to function as the power source of a wireless power charging system. The GA may include the communication elements necessary for communication between the GA and the VA.

"Vehicle assembly (VA)": An assembly on the vehicle including the VA Coil, rectifier/power conversion unit and VA controller as well as the wiring to the vehicle batteries and between each unit, filtering circuits, at least one housing, etc., necessary to function as the vehicle part of a wireless power charging system. The VA may include the communication elements necessary for communication between the VA and the GA. The GA may be referred to as a supply device, and the VA may be referred to as an EV device.

"Supply device": An apparatus which provides the contactless coupling to the EV device. In other words, the supply device may be an apparatus external to an EV. When the EV is receiving power, the supply device may operate as the source of the power to be transferred. The supply device may include the housing and all covers.

"EV device": An apparatus mounted on the EV which provides the contactless coupling to the supply device. In other words, the EV device may be installed within the EV. When the EV is receiving power, the EV device may transfer the power from the primary battery to the EV. The EV device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to adjust an output power level. The GA controller may be referred to as a supply power circuit (SPC), and the VA controller may be referred to as an electric vehicle (EV) power circuit (EVPC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA coil magnetic surface distance": The distance between the plane of the nearest magnetic or conducting component surface to the lower exterior surface of the VA coil when mounted. This distance may include any protective coverings and additional items that may be packaged in the VA coil enclosure. The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized when a fault occurs.

"Hazardous live component": A live component, which under certain conditions may generate a harmful electric shock.

"Live component": Any conductor or conductive component intended to be electrically energized in normal use.

"Direct contact": Contact of persons with live components. (See, IEC 61440.)

"Indirect contact": Contact of persons with exposed, conductive, and energized components made live by an insulation failure. (See, IEC 61140.)

"Alignment": A process of finding the relative position of supply device to EV device and/or finding the relative position of EV device to supply device for the efficient power transfer that is specified. In the present disclosure, the alignment may direct to a fine positioning of the wireless power transfer system.

"Pairing": A process by which a vehicle is correlated with a dedicated supply device, at which the vehicle is located and from which the power will be transferred. Pairing may include the process by which a VA controller and a GA controller of a charging spot are correlated. The correlation/association process may include the process of association of a relationship between two peer communication entities.

"High-level communication (HLC)": HLC is a special type of digital communication. HLC is necessary for additional services which are not covered by command and control communication. The data link of the HLC may use a power line communication (PLC), but the data link of the HLC is not limited to the PLC.

"Low-power excitation (LPE)": LPE refers to a technique of activating the supply device for the fine positioning and pairing for the EV to detect the supply device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN may use the same SSID. Devices that do not use a unique SSID are unable to join the BSS. Since the SSID is shown as plain text, the SSID may not provide any security features to the network.

"Extended service set identifier (ESSID)": ESSID is the name of the network to which one desires to connect. ESSID is similar to SSID but a more extended concept.

"Basic service set identifier (BSSID)": BSSID consisting of 48 bits is used to distinguish a specific BSS. With an infrastructure BSS network, the BSSID may be configured for medium access control (MAC) of the AP equipment. For an independent BSS or ad hoc network, the BSSID may be generated with any value.

Moreover, the charging station may include at least one GA and at least one GA controller configured to manage the at least one GA. The GA may include at least one wireless communication device. The charging station may refer to a place or location having at least one GA, which is installed in home, office, public place, road, parking area, etc. According to exemplary embodiments of the present disclosure, "rapid charging" may refer to a method of directly converting alternating current (AC) power of a power system to direct current (DC) power, and supplying the converted DC power to a battery mounted on an EV. In particular, a voltage of the DC power may be DC 500 volts (V) or less.

According to exemplary embodiments of the present disclosure, "slow charging" may refer to a method of charging a battery mounted on an EV using AC power supplied to a general home or workplace. An outlet in each home or workplace, or an outlet disposed in a charging stand may provide the AC power, and a voltage of the AC power may be AC 220V or less. The EV may further include an on-board charger (OBC) configured to boost the AC power for the slow charging, convert the AC power to DC power, and supply the converted DC power to the battery.

Additionally, according to exemplary embodiments of the present disclosure, a frequency tuning may be used for performance optimization. In particular, the frequency tuning may be performed by a supply device and may not be performed by an EV device. Additionally, all the supply devices may be required to provide the frequency tuning over a full range. An electric vehicle power controller (EVPC) may be configured to operate in a frequency range between about 81.38 kHz and 90.00 kHz. A nominal frequency (hereinafter, referred to as a target frequency, a design frequency, or a resonance frequency) for the magnetic field wireless power transfer (MF-WPT) may be about 85 kHz. The power supply circuits may provide the frequency tuning.

Hereinafter, exemplary embodiments of the present disclosure will be explained in detail by referring to accompanying FIGS. FIG. 1 is a conceptual diagram illustrating a concept of a wireless power transfer (WPT) to which exemplary embodiments of the present disclosure may be applied.

As shown in FIG. 1, a WPT may be performed by at least one component of an electric vehicle (EV) 10 and a charging station 20, and may be used for wirelessly transferring power to the EV 10. In particular, the EV 10 may be usually defined as a vehicle supplying an electric power stored in a rechargeable energy storage including a battery 12 as an energy source of an electric motor which is a power train system of the EV 10.

However, the EV 10 according to exemplary embodiments of the present disclosure may include a hybrid electric vehicle (HEV) having an electric motor and an internal combustion engine together, and may include an automobile and also a motorcycle, a cart, a scooter, and an electric bicycle. Additionally, the EV 10 may include a power reception pad 11 having a reception coil for charging the battery 12 wirelessly and may include a plug connection for conductively charging the battery 12. In particular, the EV 10 configured for conductively charging the battery 12 may be referred to as a plug-in electric vehicle (PEV).

The charging station 20 may be connected to a power grid 30 or a power backbone, and may provide an alternating current (AC) power or a direct current (DC) power to a power transmission pad 21 having a transmission coil via a power link. Additionally, the charging station 20 may be configured to communicate with an infrastructure management system or an infrastructure server that manages the power grid 30 or a power network via wired/wireless communications, and perform wireless communications with the EV 10. The wireless communications may be Bluetooth, ZigBee, cellular, wireless local area network (WLAN), or the like. For example, the charging station 20 may be located at various locations including a parking area attached to a house, a parking area for charging an EV at a gas station, a parking area at a shopping center or a workplace, but the present disclosure is not limited to such locations.

A process of wirelessly charging the battery 12 of the EV 10 may begin with first disposing the power reception pad 11 of the EV 10 in an energy field generated by the power transmission pad 21, and coupling the reception coil and the transmission coil with each other. An electromotive force may be induced in the power reception pad 11 as a result of the interaction or coupling, and the battery 12 may be charged by the induced electromotive force.

The charging station 20 and the transmission pad 21 may be referred to as a ground assembly (GA) in whole or in part, where the GA may refer to the previously defined meaning. All or part of the internal components and the reception pad 11 of the EV 10 may be referred to as a vehicle assembly (VA), in which the VA may refer to the previously defined meaning. The power transmission pad or the power reception pad may be configured to be non-polarized or polarized.

When a pad is non-polarized, one pole (e.g., a first pole) may be disposed in a center of the pad and an opposite pole (e.g., a second pole) may be disposed in an external periphery. In particular, a flux may be formed to exit from the center of the pad and return to external boundaries of the pad. When a pad is polarized, a respective pole may be disposed at either end portion of the pad. In particular, a magnetic flux may be formed based on an orientation of the pad. In the present disclosure, the transmission pad 21 or the reception pad 11 may collectively be referred to as a "wireless charging pad".

Figure 2:
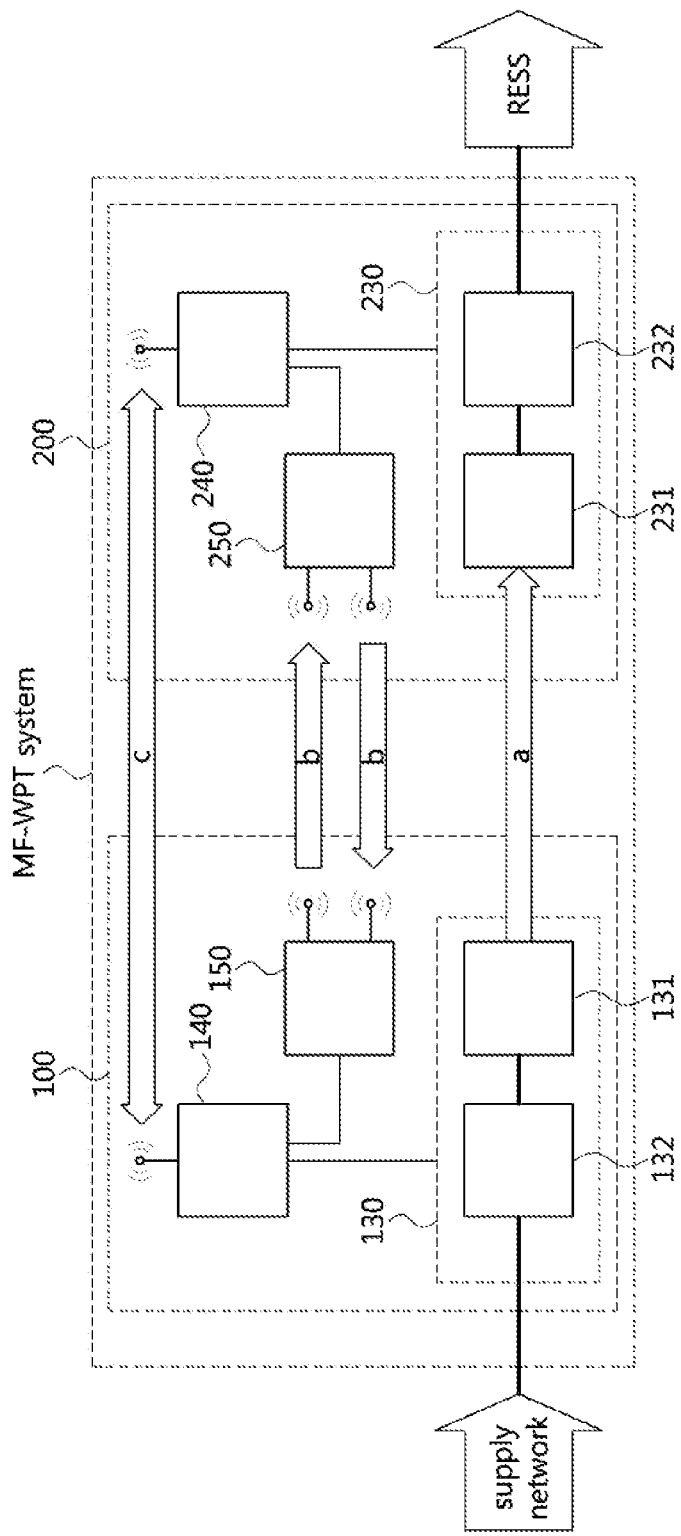
FIG. 2 is a block diagram for describing elements related to wireless power transfer according to an exemplary embodiment of the present disclosure.

FIG. 2 is a block diagram for describing elements related to wireless power transfer according to an exemplary embodiment of the present disclosure. A magnetic field wireless power transfer (MF-WPT) for the EV may be defined as a transfer of electrical energy from a supply network via electric and/or magnetic fields or waves between a primary and a secondary device without current flow over a galvanic connection. Referring to FIG. 2, the MF-WPT may be performed between a supply device (100) and an EV device (200). In particular, the supply device 100 may be connected to a supply network and the EV device 200 may be associated with a Rechargeable Energy Storage System (RESS).

More specifically, the supply device 100 may include a supply power circuit (SPC) 130, a supply equipment communication controller (SECC) 140, and a supply device Point to Point Signal (P2PS) controller 150. The supply power circuit 130 may include a primary device 131 and a supply power electronics 132. The EV device 200 may include an EV power circuit (EVPC) 230, an EV communication controller (EVCC) 240, and an EV device P2PS controller 250. The EV power circuit 230 may include a secondary device 231 and EV power electronics 232.

As shown in FIG. 2, a wireless power flow (a) may exist between the primary device 131 and the secondary device 231. In other words, wireless power transfer from the primary device 131 to the secondary device 231 may occur. In addition, a wireless P2PS interface (b) may be formed between the supply device P2PS controller 150 and the EV device P2PS controller 250 and a wireless communication interface c may be formed between the supply device communication controller 140 and the EV communication controller 240. The wireless communication between the supply device communication controller and the EV communication controller may be performed based on IEEE Std 802.11. In addition, the P2PS interface formed between the supply device P2PS controller 150 and the EV device P2PS controller 250 may be implemented based on LF signaling.

FIG. 3 is a schematic flowchart of wireless power transfer (WPT) according to an exemplary embodiment of the present disclosure. Referring to FIG. 3, the wireless power transfer method according to the present disclosure may include steps for service detail and service selection (S310), fine positioning setup and fine positioning (S320), LF pairing and LF pairing hold (S330), authentication (S340), initial alignment check setup and initial alignment check (S350), LPE pairing and LPE pairing stop (S360).

The wireless power transfer according to the present disclosure may be performed by a supply device and an EV device. More specifically, the wireless power transfer according to the present disclosure may be performed by one of the supply device communication controller (SECC) 140, the supply power circuit (SPC) 130, and the supply device P2PS controller 150 in the supply device, and the EV communication controller (EVCC) 240, the EV power circuit 230, and the EV device P2PS controller 250 in the EV device 200.

The supply power circuit 130 may include an SD WPT controller and an SD Low Power Excitation (LPE) controller. The SD P2PS controller 150 may include an SD Low Frequency (LF) controller and an SD LF antenna. In addition, the EV power circuit 230 may include an EV WPT controller and an EV LPE controller. The EV device P2PS controller 250 may include an EV LF controller and an EV LF antenna.

Details of each step indicated in FIG. 3 will be described below with reference to FIGS. 4 to 14. FIGS. 4A to 14 are described, for convenience of illustration, with the supply device 100 as a separate block from the supply device communication controller (SECC) 140, the supply power circuit (SPC) 130, and the supply device P2PS controller 150. However, it should be understood that the supply device may include a supply device communication controller (SECC) 140, a supply power circuit (SPC) 130, and a supply device P2PS controller 150. Furthermore, the supply device 100 illustrated in FIGS. 4 to 14 may also be understood as a main processor of a supply device configured to perform wireless power transfer according to the present disclosure.

In the same context, the EV device 200 may also include an EV communication controller (EVCC) 240, an EV power circuit 230, and an EV device P2PS controller 250. Furthermore, the EV device 200 illustrated in FIGS. 4 to 14 may also be understood as a main processor of an EV device configured to perform wireless power transfer according to the present disclosure.

Figure 4A:
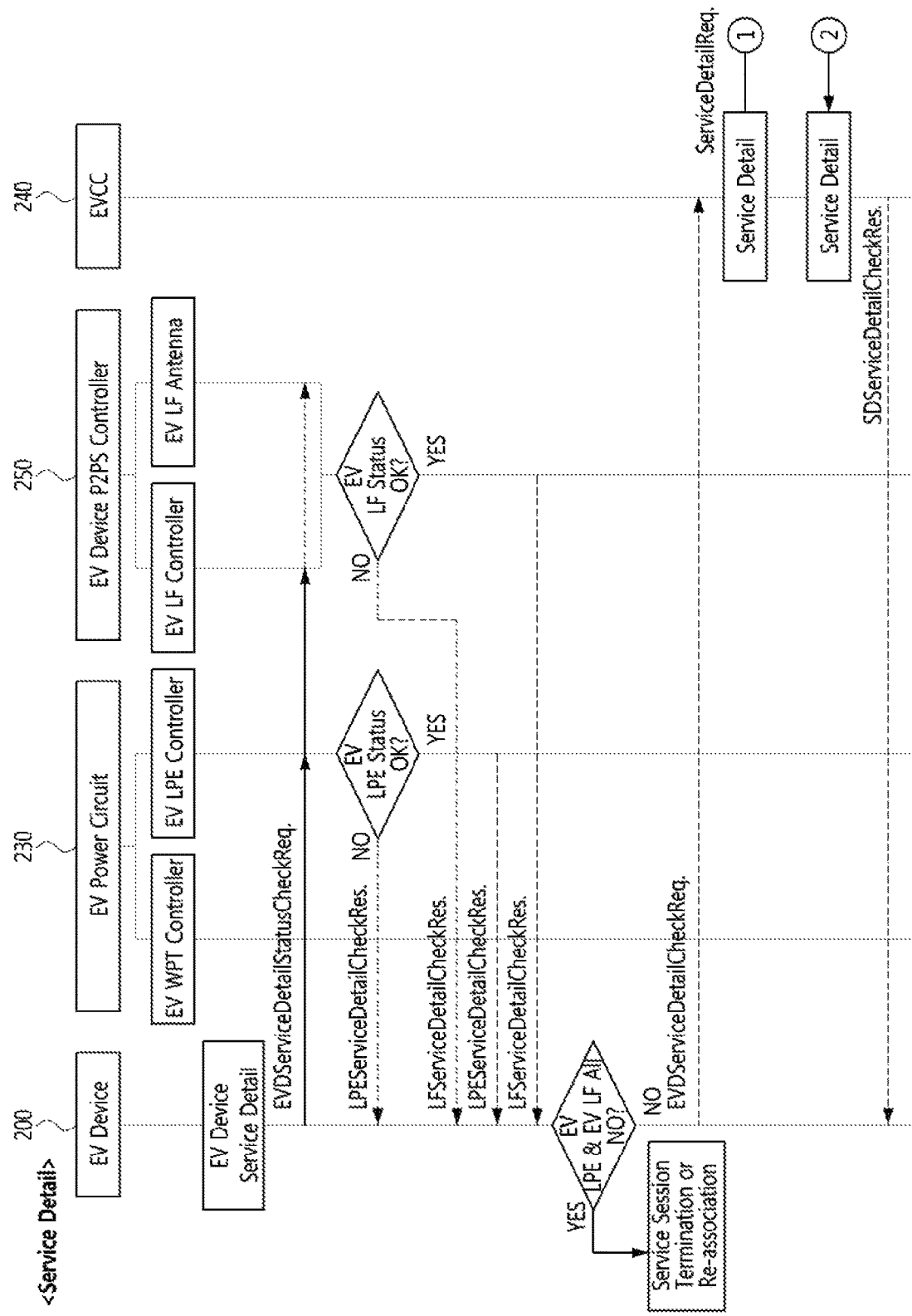
FIGS. 4A to 4B are flowcharts of a service detail check process in wireless power transfer according to an exemplary embodiment of the present disclosure.
Figure 4B:
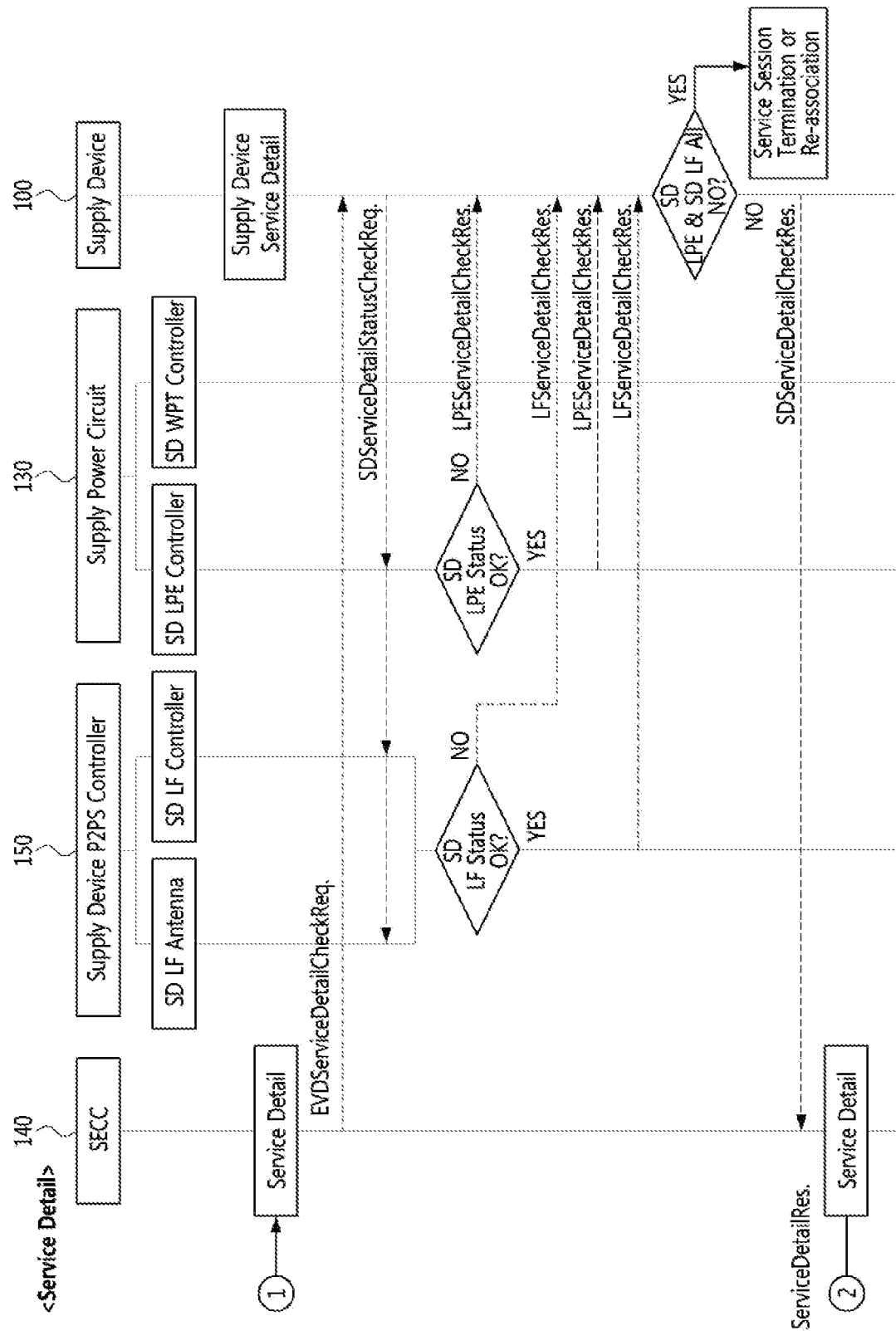

FIGS. 4A to 4B are flowcharts of a service detail check process in wireless power transfer according to an exemplary embodiment of the present disclosure. Referring to FIGS. 4A to 4B, in the service detail check process, the EV power circuit 230, the EV device P2PS controller 250, the supply power circuit 130, and the supply device P2PS controller 150, in response to a service detail check request from the EV device, may be configured to check a state of the EV LPE, a state of the EV LF, a state of the supply device (SD) LPE, and a state of the SD LF, and return each state information to the EV device (e.g., transmit information of the state information to the EV device).

Figure 5A:
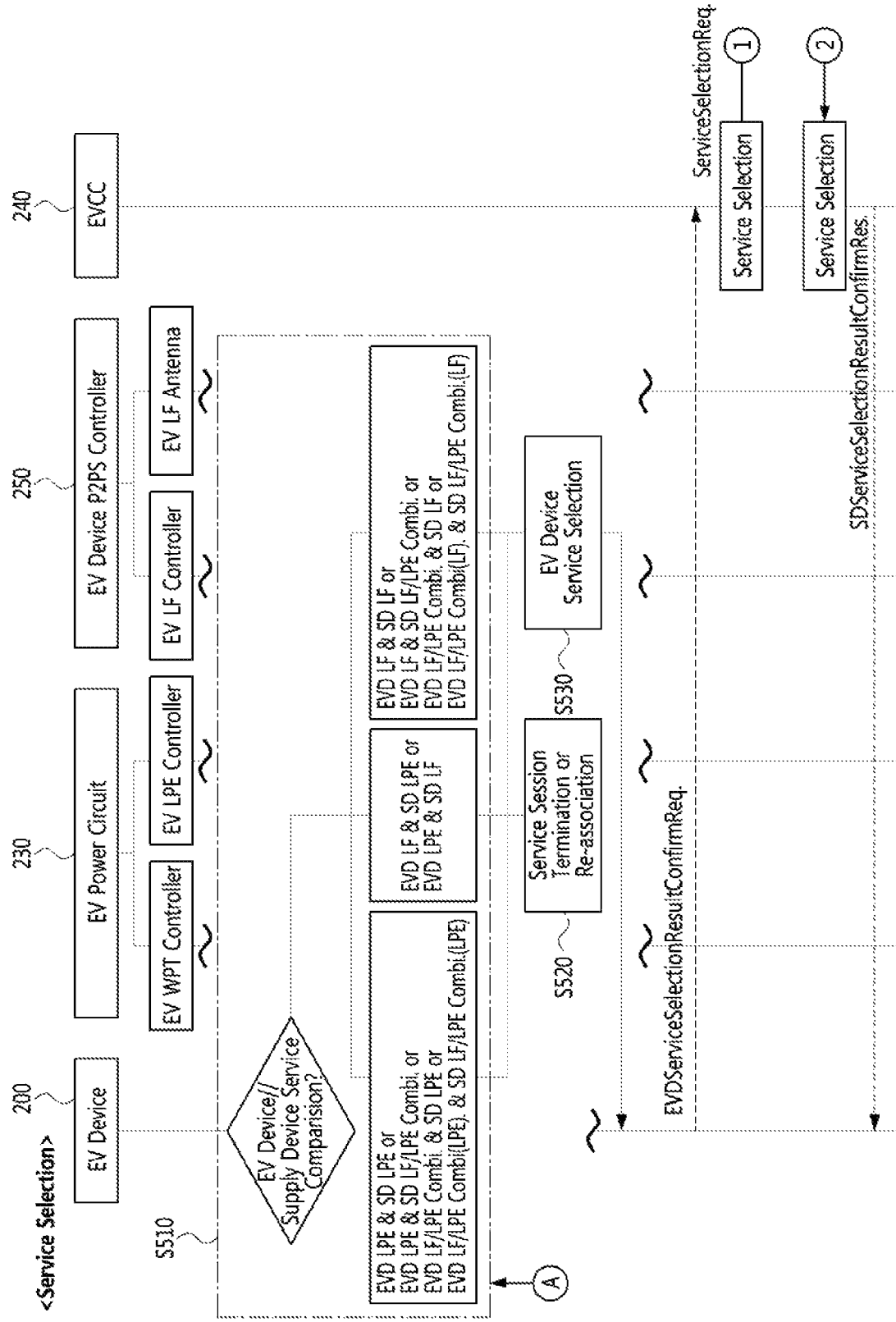
FIGS. 5A to 5B are flowcharts of a service selection process in wireless power transfer according to an exemplary embodiment of the present disclosure.
Figure 5B:
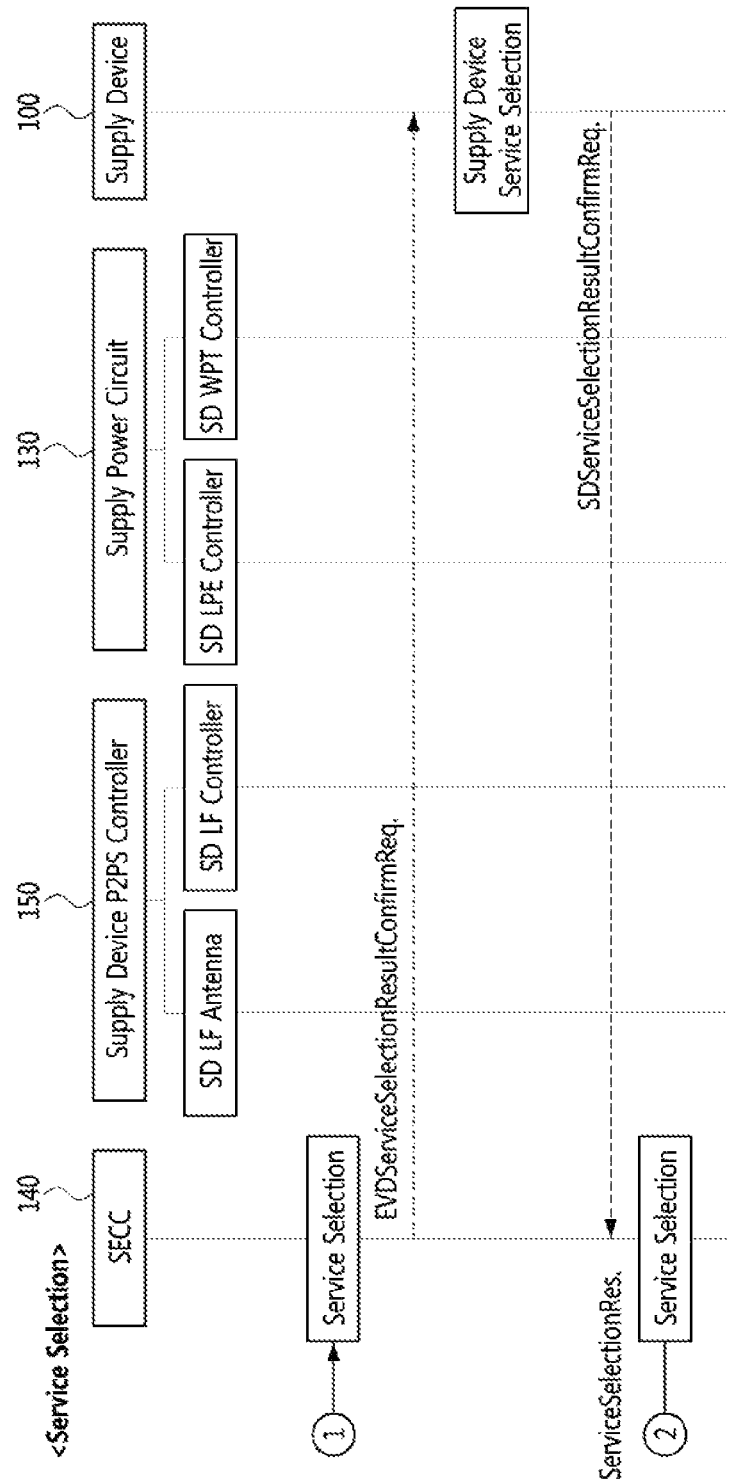

FIGS. 5A to 5B are flowcharts of a service selection process in wireless power transfer according to an exemplary embodiment of the present disclosure. Referring to FIG. 5A to 5B, the EV device 200 may be configured to compare services that the EV device is capable of providing and services the supply device is capable of providing based on the state of the EV LPE, the state of the EV LF, the state of the SD LPE, and the state of the SD LF confirmed through the service detail check (S510).

Specifically, in this step, the EV device 200 may be configured to check or determine if the service that the EV device (EVD) is capable of providing is LPE, LF, or both LPE and LF, check or determine if the service that the supply device (SD) is capable of providing is LPE, LF, or LPE and LF, and compare available services of the EV device and the supply device. In response to determining that the types of services capable of being provided by the EV device and the types of services capable of being provided by the supply device SD are different, the service session may be terminated or a re-association procedure may be performed (S520). In response to determining that one or more service of the same type capable of being provided by both the EV device and the supply device (SD), the EV device may be configured to select the one or more service (S530) and send or transmit the service selection result to the supply device 100 through the EVCC 240.

Figure 6A:
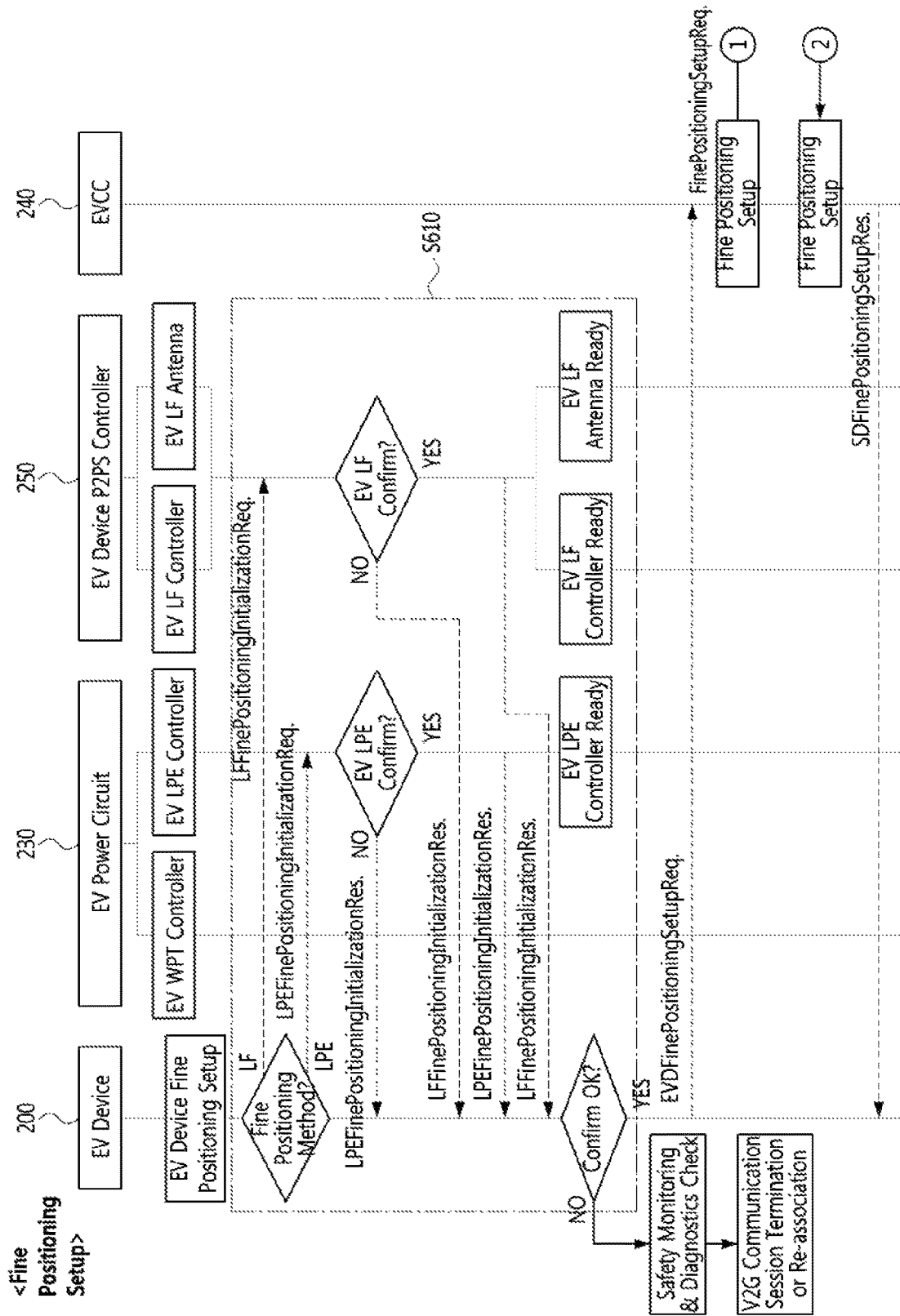
FIGS. 6A to 6B are flowcharts of a fine positioning setup process in wireless power transfer according to an exemplary embodiment of the present disclosure.
Figure 6B:
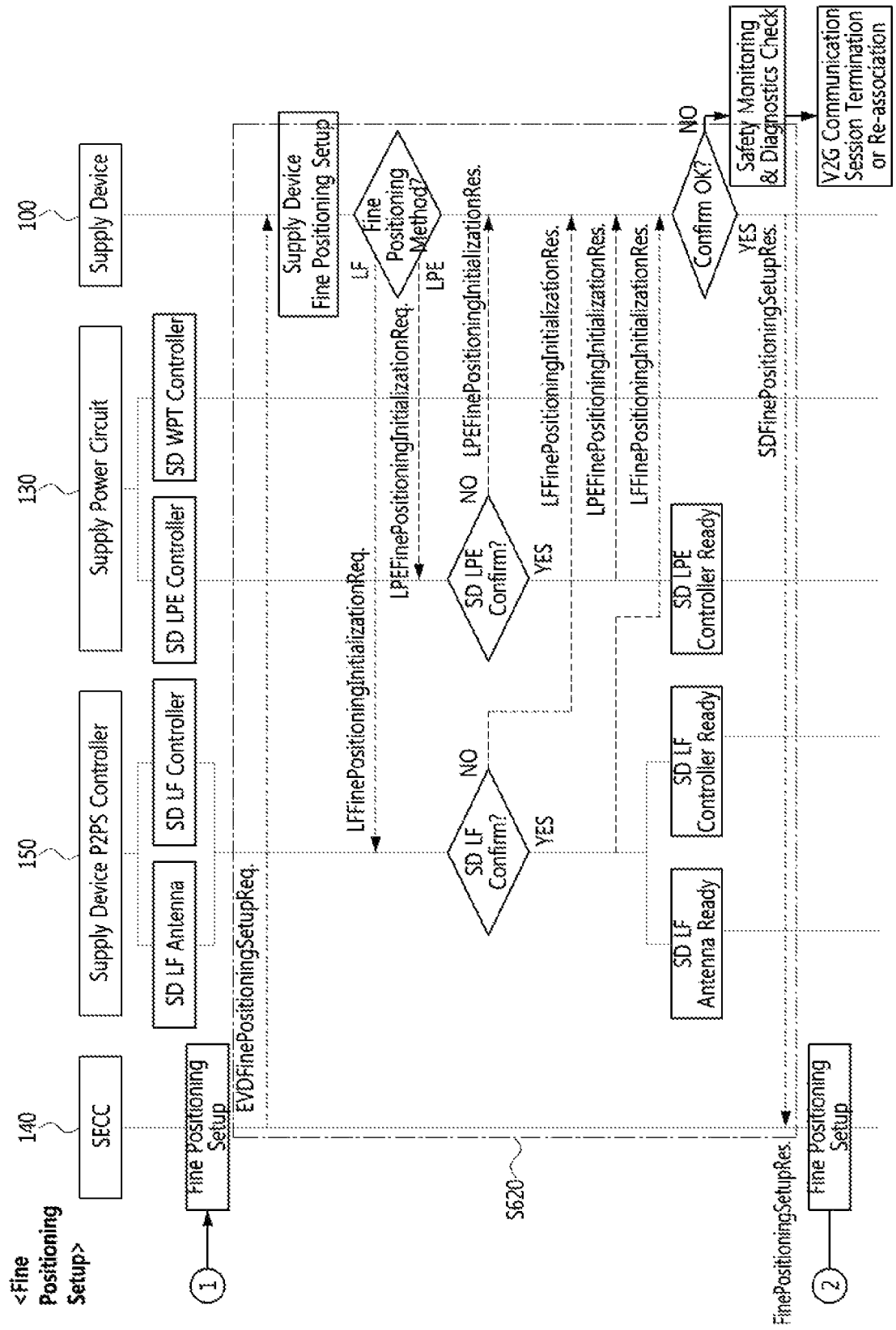

FIGS. 6A to 6B are flowcharts of a fine positioning setup process in wireless power transfer according to an exemplary embodiment of the present disclosure. In the fine positioning setup process (S610), the EV device may be configured to check or determine the fine positioning method selected through the service detail check and service selection process. Depending on whether the EV device uses LF, LPE, or both for fine positioning, the EV device may transmit a fine positioning initialization request (FinePositioningInitializationReq.) to the EV LPE controller and/or the EV device P2PS controller and receive a response to the initialization request (FinePositioningInitializationRes) from the controllers.

The EV device 200 may be configured to transmit a fine positioning setup request (FinePositioningSetupReq.) to the supply device when the confirmation of the LPE and/or LF for fine positioning is completed. The supply device 100 may be configured to perform a fine positioning setup procedure (S620), by transmitting a fine positioning initialization request (FinePositioningInitializationReq.) to the SD LPE controller or the SD P2PS controller based on whether the supply device uses LF, LPE, or both methods for fine positioning and receiving a response (FinePositioningInitializationRes.) from the controllers.

Figure 7B:
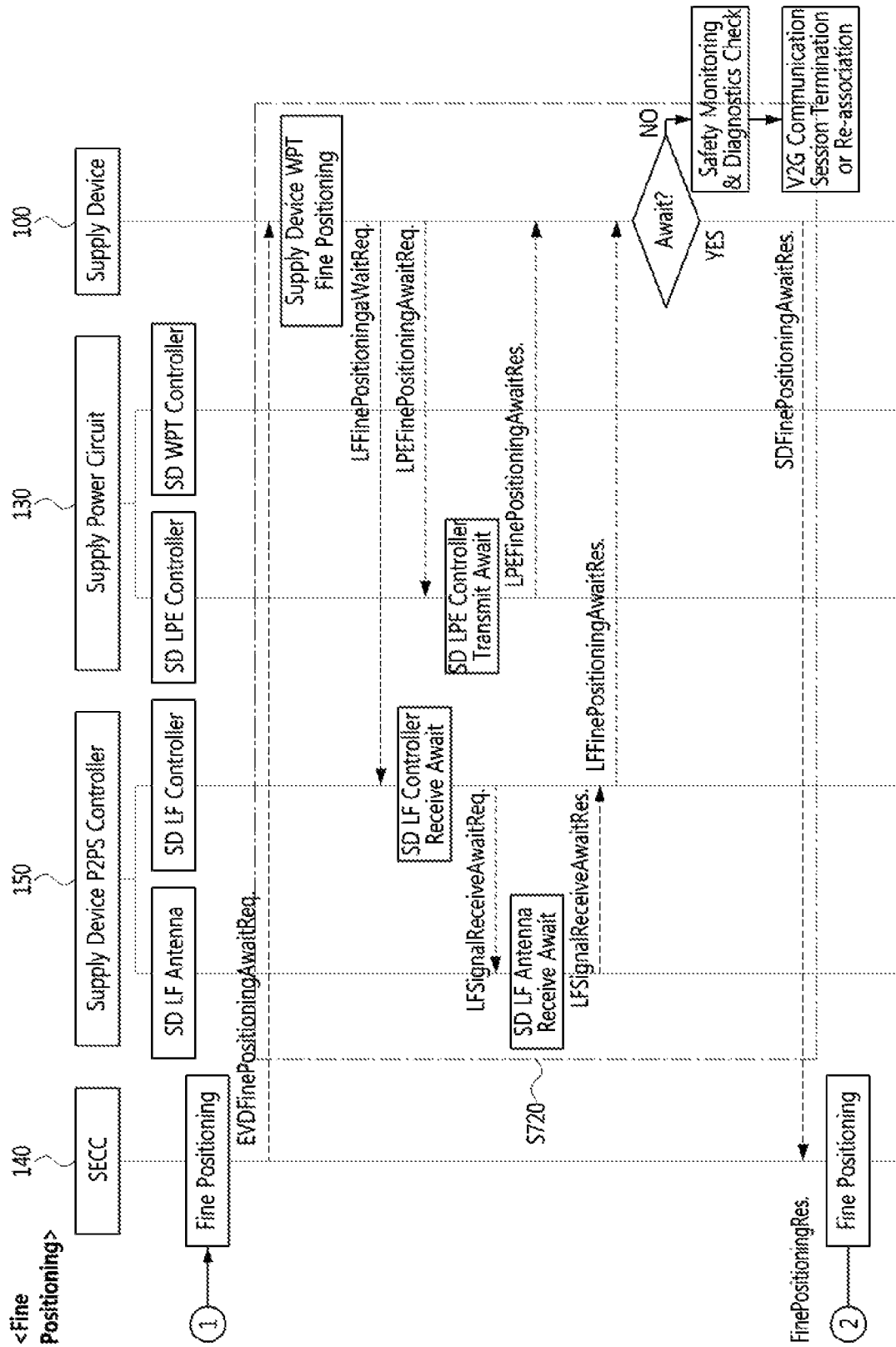
Figure 8A:
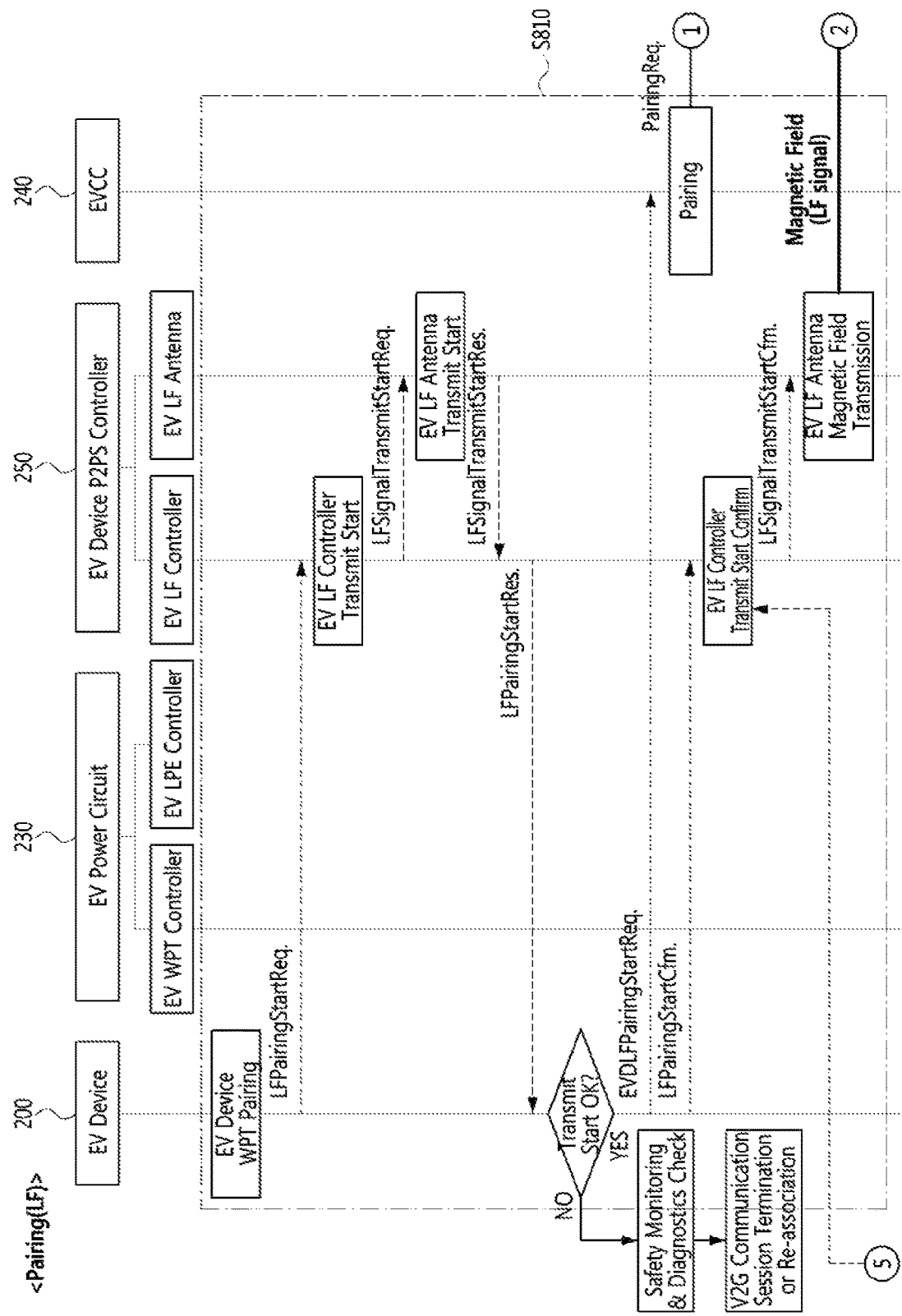
Figure 8B:
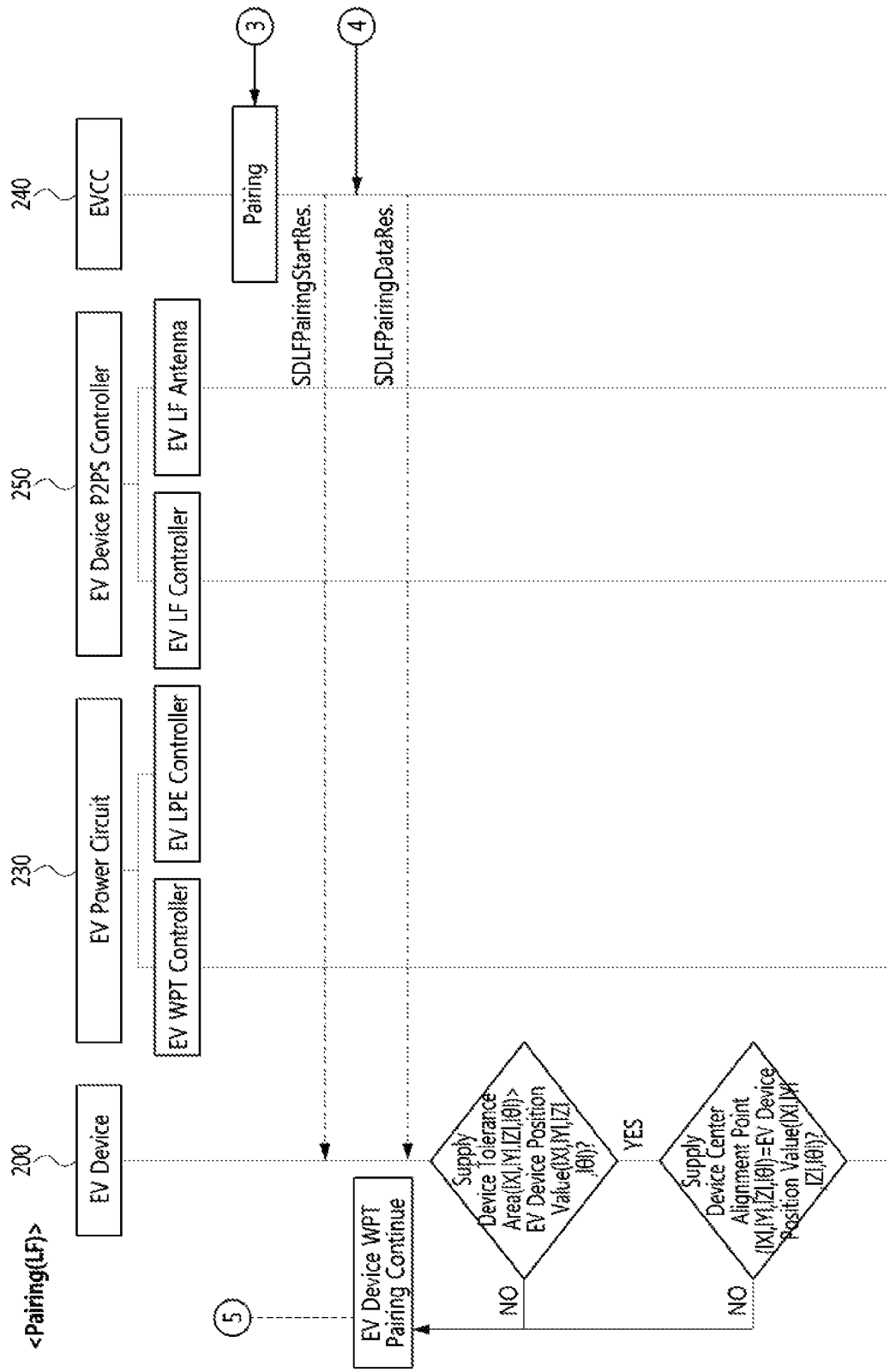
Figure 8C:
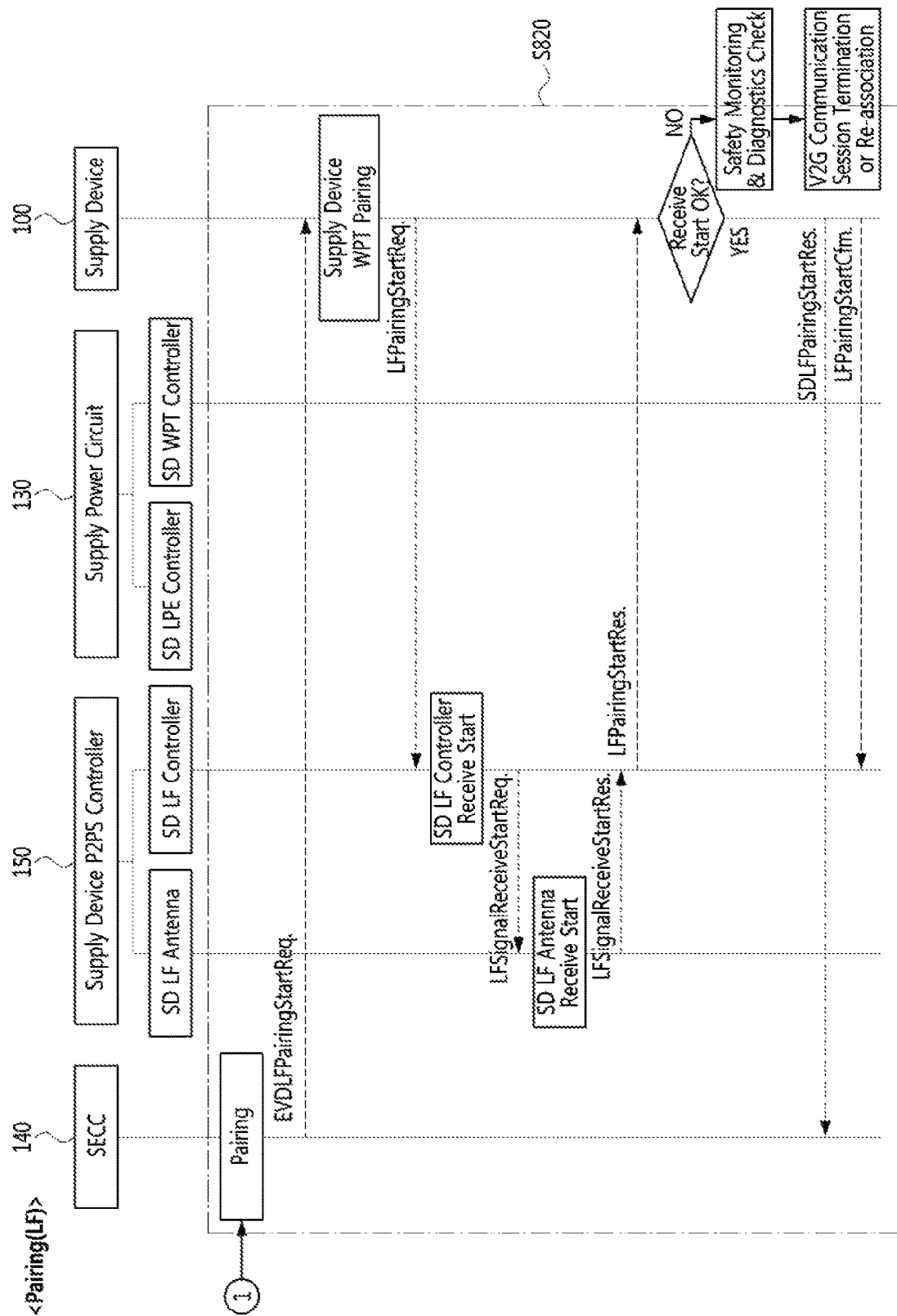

FIGS. 7A to 7B are flowcharts of a fine positioning process in wireless power transfer according to an exemplary embodiment of the present disclosure. When the fine positioning setup procedure is completed, the EV device may be configured to transmit a fine positioning wait request signal (FinePositioningAwaitReq.) to the EV power circuit 230 and the EV device P2PS controller 250 and receive response signals from the controllers (S710). The supply device may also be configured to transmit a fine positioning wait request signal to the SD power circuit 130 and the supply device P2PS controller 150 and receive response signals from the controllers (S720). In the pairing procedure, LF pairing or LPE pairing may be performed according to the fine positioning method serviced by the EV device and the supply device, and the LF pairing and LPE pairing may be performed when both positioning methods are used.

FIGS. 8A to 8D are flowcharts of an LF pairing process in wireless power transfer according to an exemplary embodiment of the present disclosure. As shown in FIGS. 8A to 8D, in the LF pairing process, the EV device P2PS controller 250 may be configured to transmit a magnetic field using an EV LF antenna based on a LF pairing start request (LFParingStartReq.) from the EV device (S810). The supply device 100 may be configured to detect magnetic field using a SD LF antenna, the magnetic field (i.e., the LF signal) being transmitted by the EV LF antenna and reply to the EV device that the LF pairing data has been received (S820).

Figure 9A:
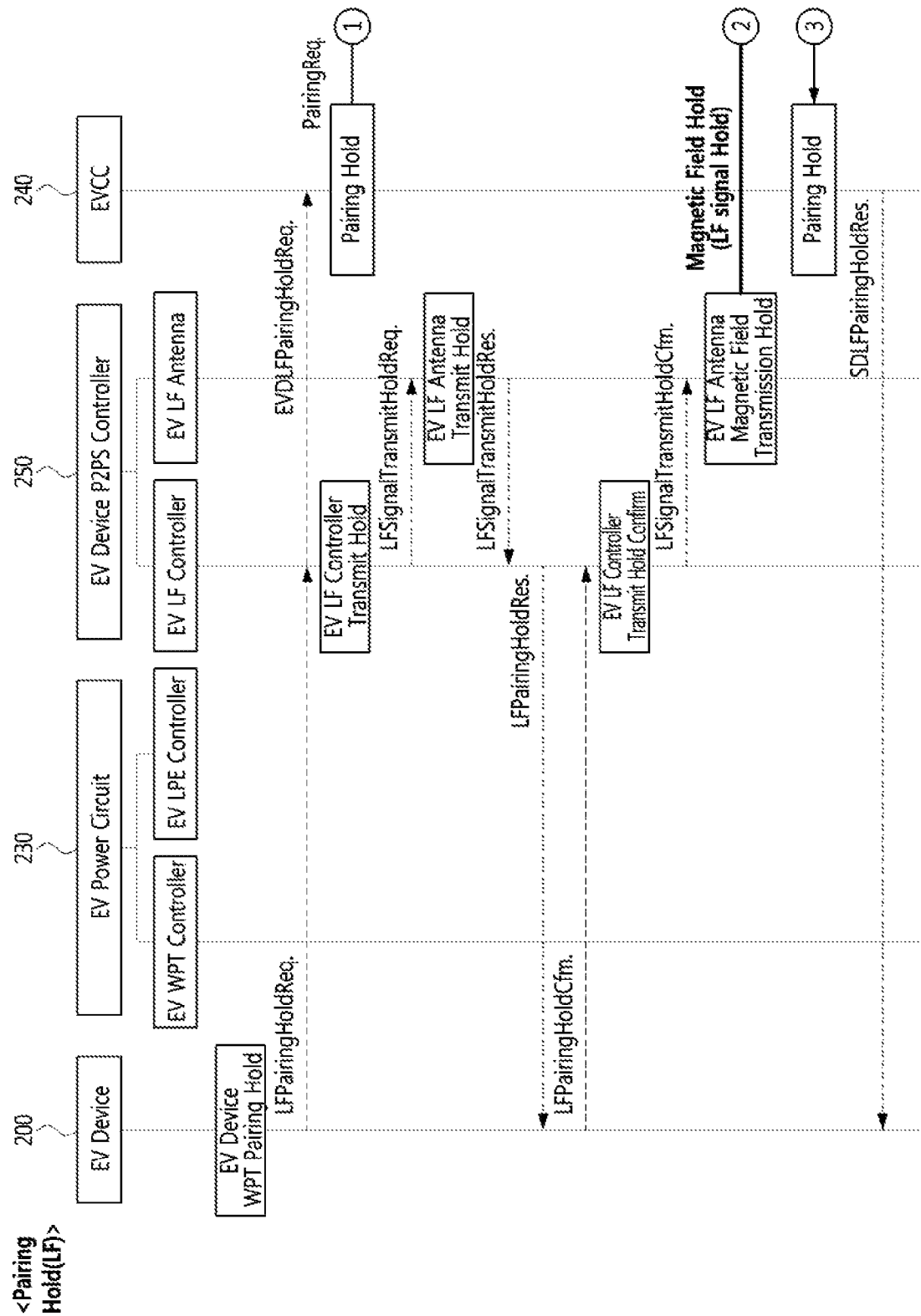
FIGS. 9A to 9C are flowcharts of an LF pairing hold process in wireless power transfer according to an exemplary embodiment of the present disclosure.
Figure 9B:
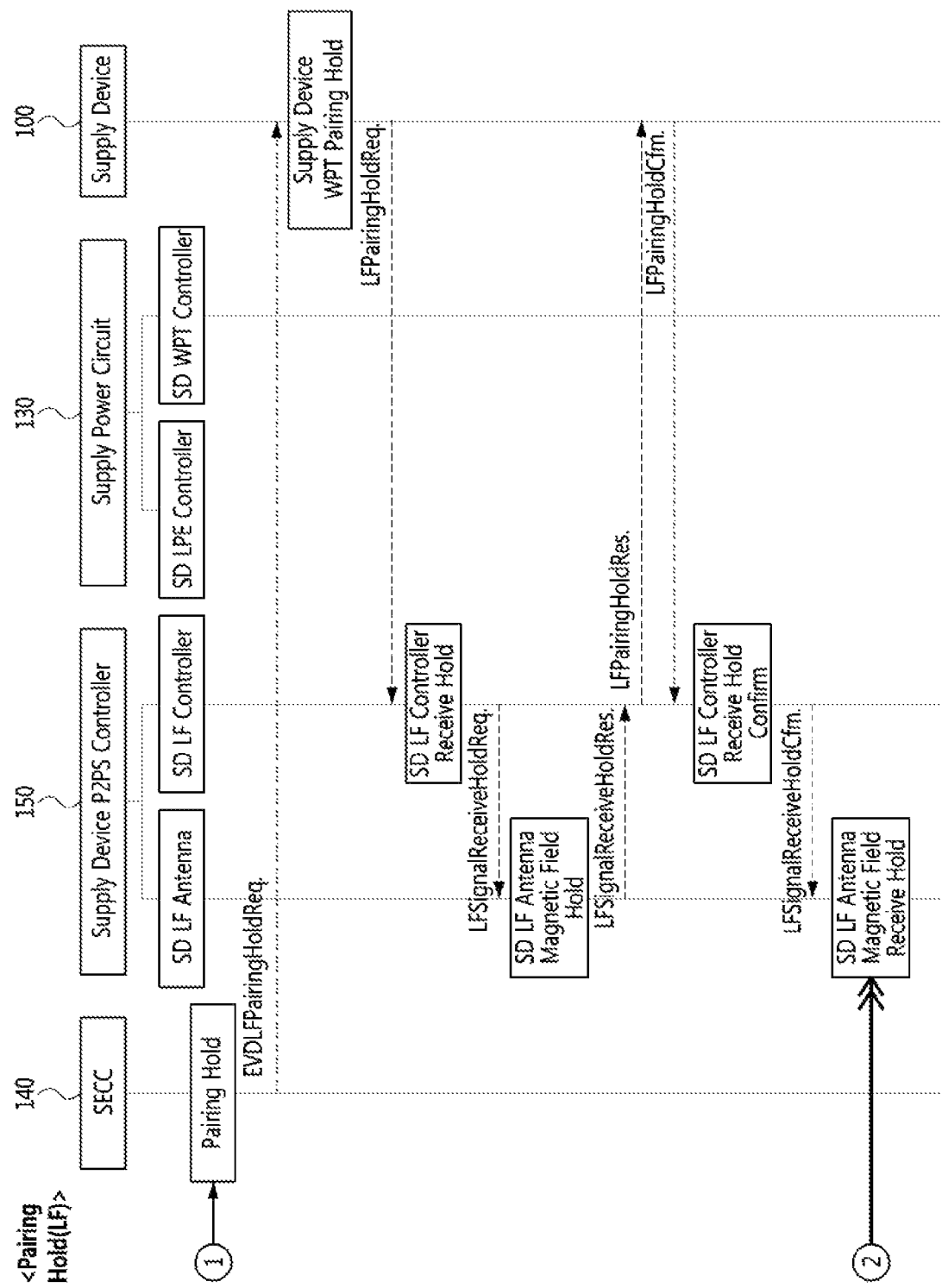
Figure 9C:
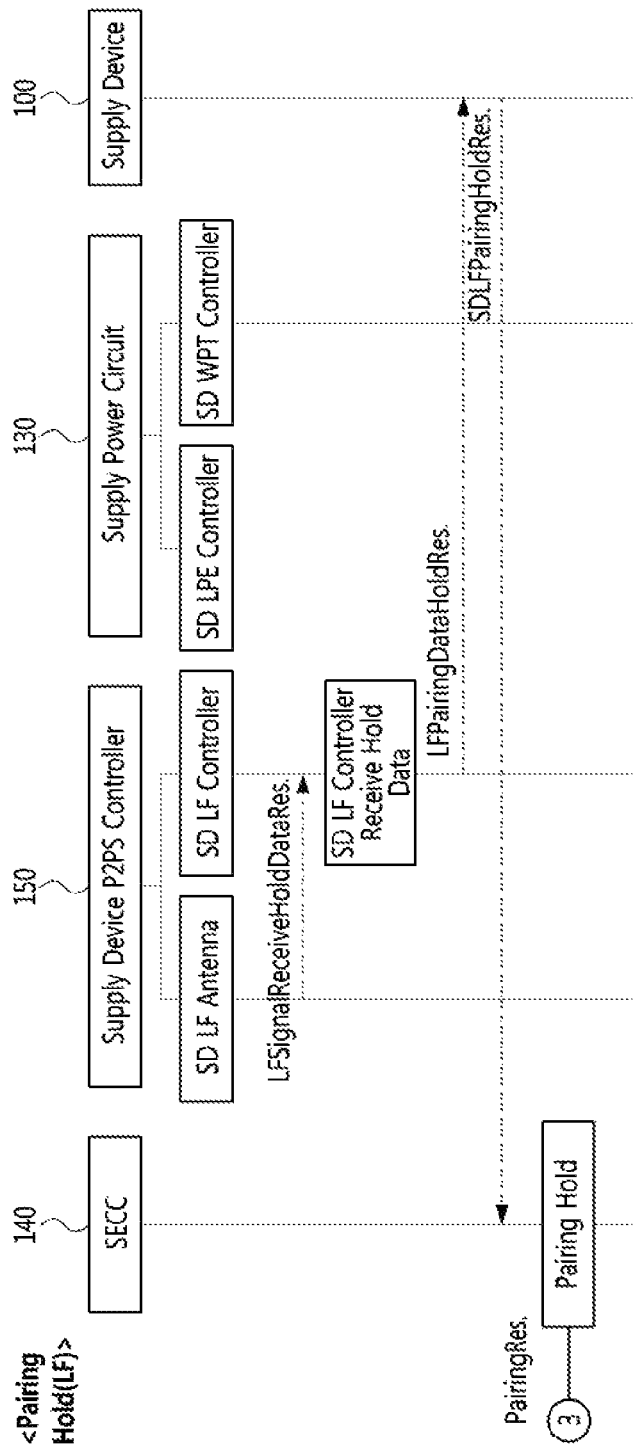

FIGS. 9A to 9C are flowcharts of an LF pairing hold process in wireless power transfer according to an exemplary embodiment of the present disclosure. LF pairing may be held by a pairing hold request, as shown in FIGS. 9A to 9C.

Figure 10A:
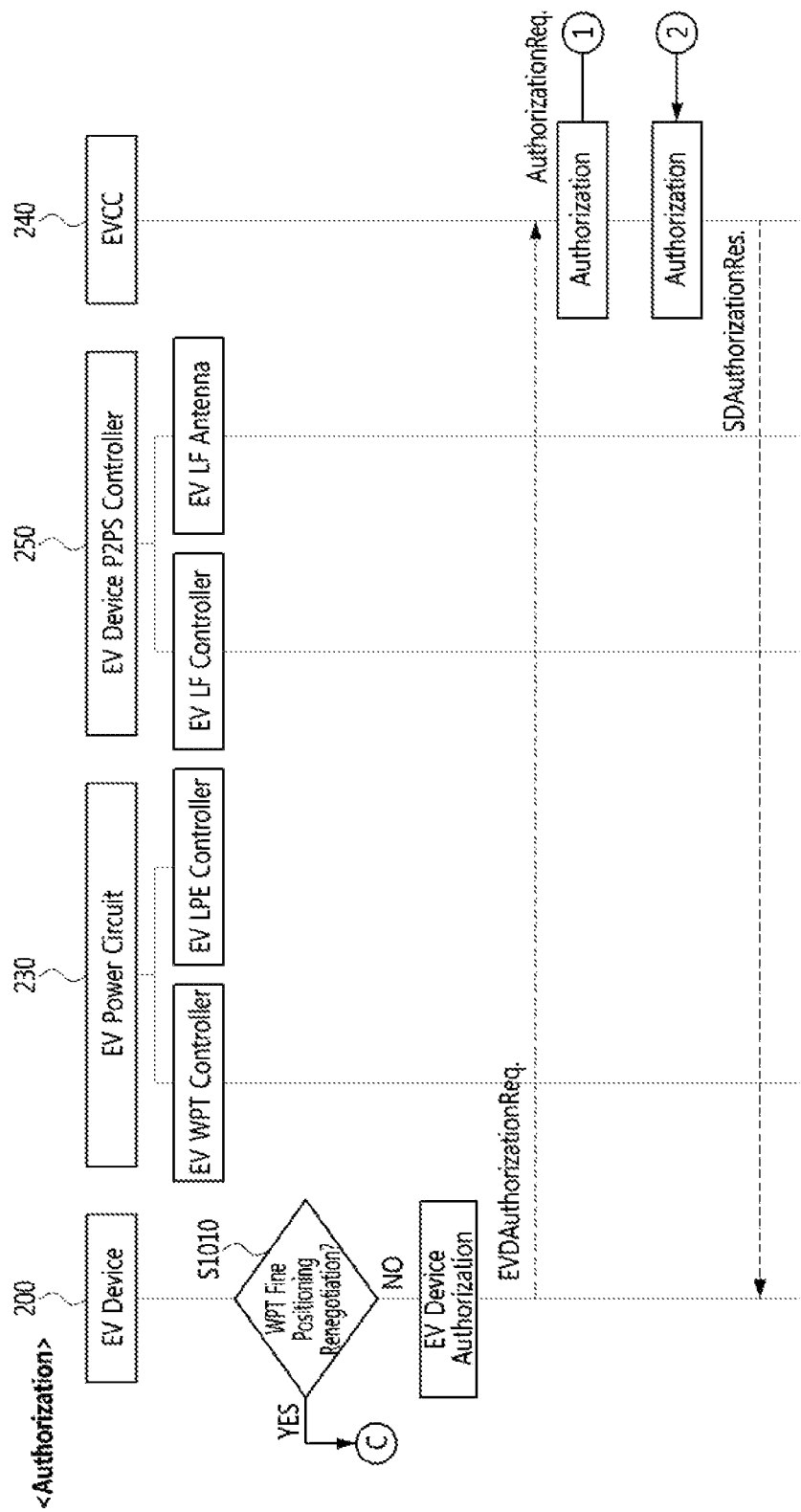
FIGS. 10A to 10B are flowcharts of an authentication process in wireless power transfer according to an exemplary embodiment of the present disclosure.
Figure 10B:
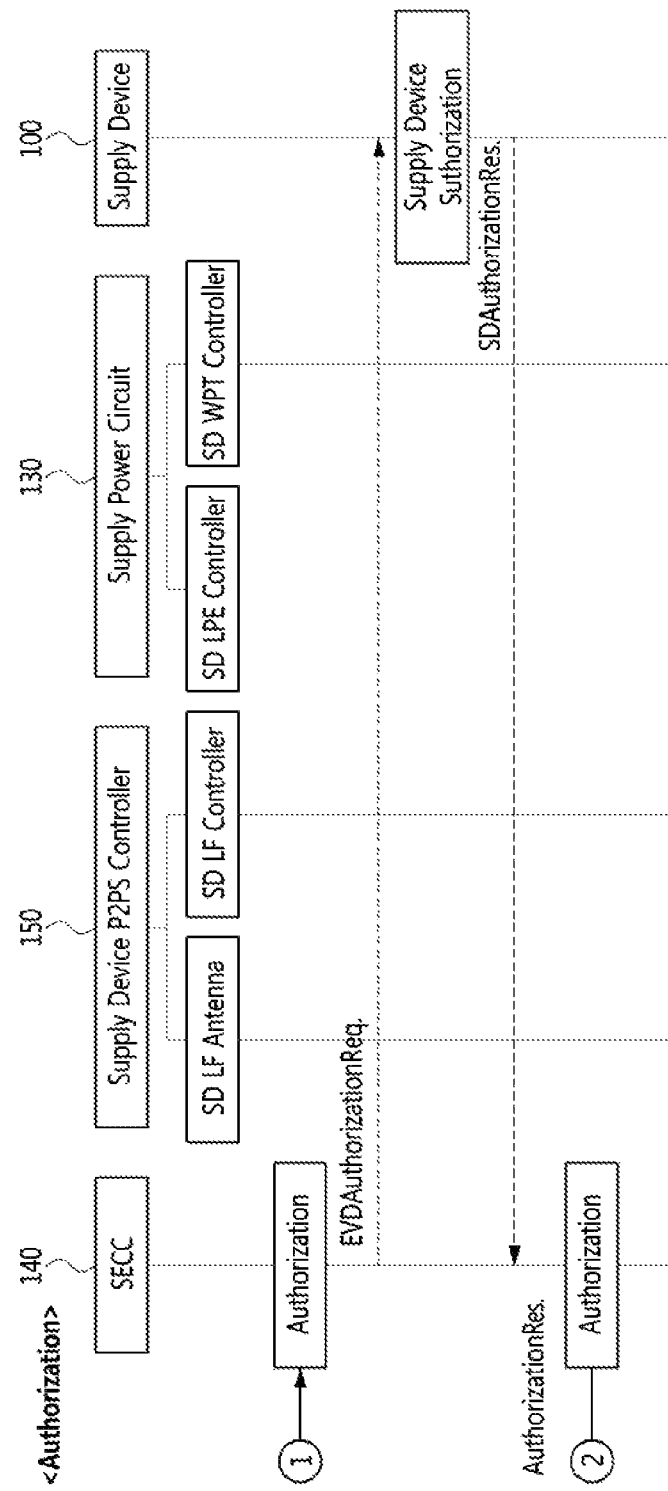

FIGS. 10A to 10B are flowcharts of an authentication process in wireless power transfer according to an exemplary embodiment of the present disclosure. As shown in FIGS. 10A to 10B, the authentication process may follow the LF pairing, which may be omitted when the ongoing procedure is a WPT fine positioning renegotiation process (Yes in S1010).

Authentication may be performed between the EV device 200 and the supply device 100 based on an authentication request (EVDAuthorizationReq.) from the EV device. In addition, the authentication process may include an identification detail check process. The identification detail check procedure may be performed such that the EV device transmits an identification detail request (EVDIdentificationDetailReq; IdentificationDetailReq) to the supply device and receives a response (SDIdentificationDetailRes; IdentificationDetailRes) from the supply device.

Figure 11A:
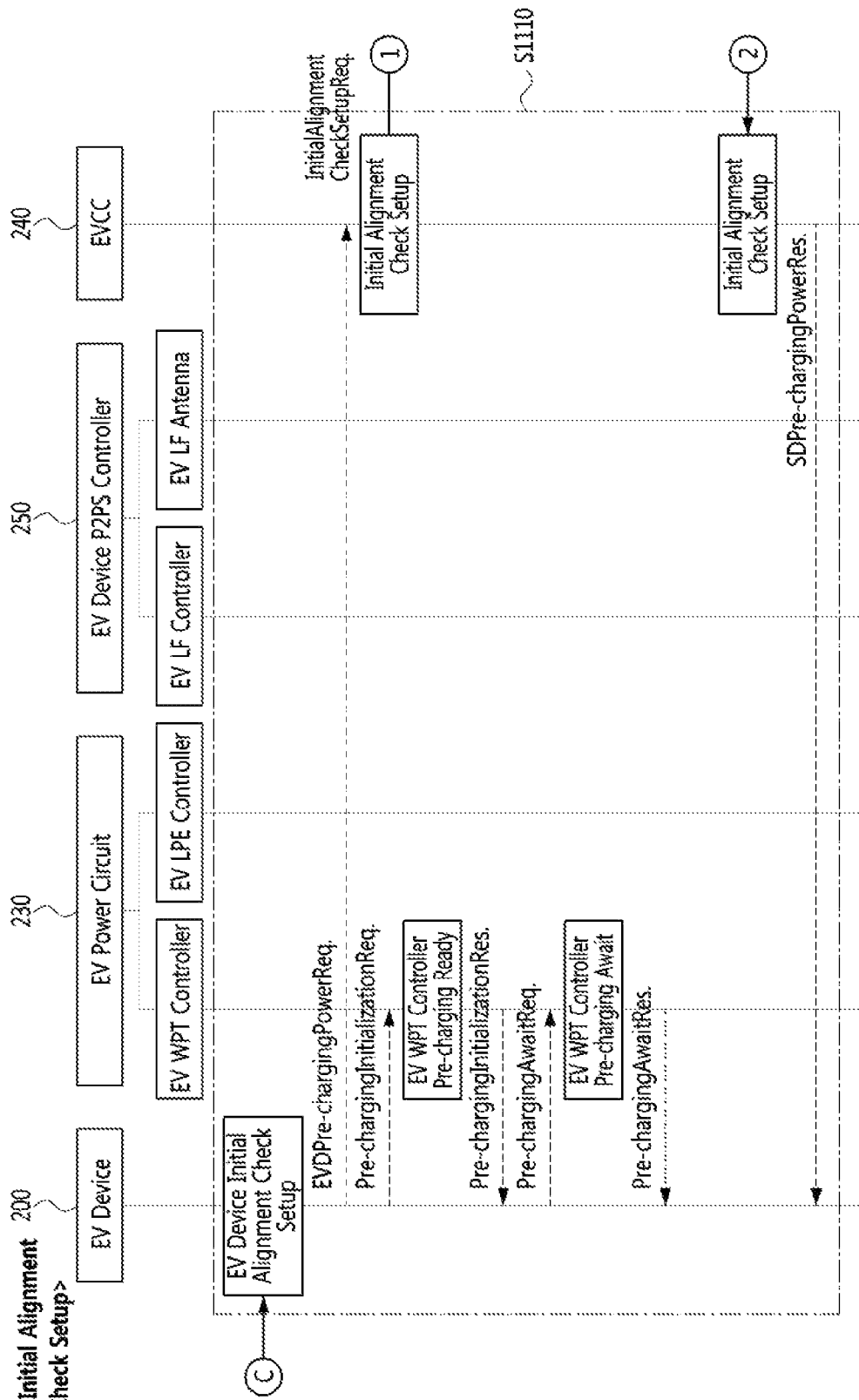
FIGS. 11A to 11B are flowcharts of an initial alignment check setup process according to an exemplary embodiment of the present disclosure.
Figure 11B:
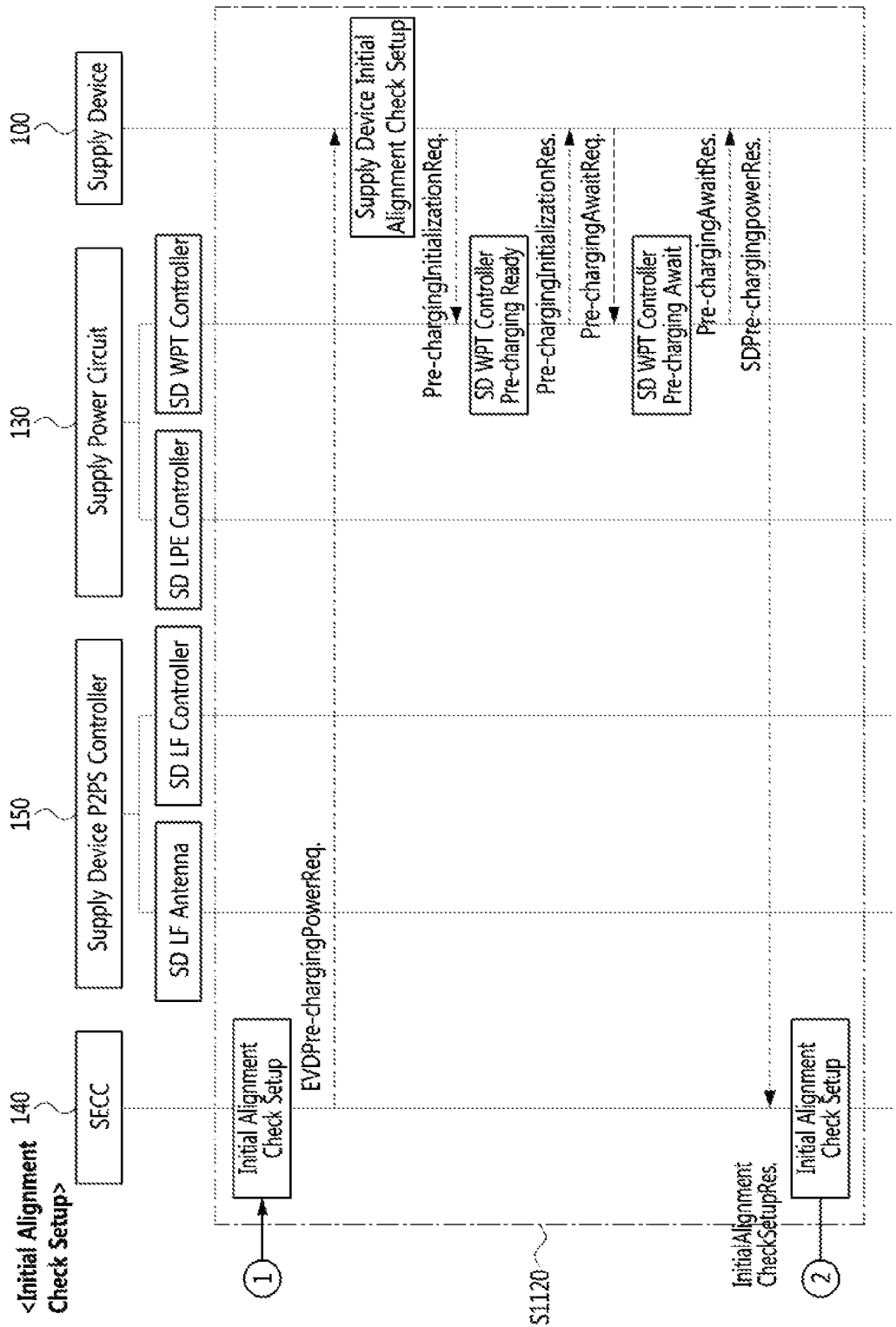
Figure 12A:
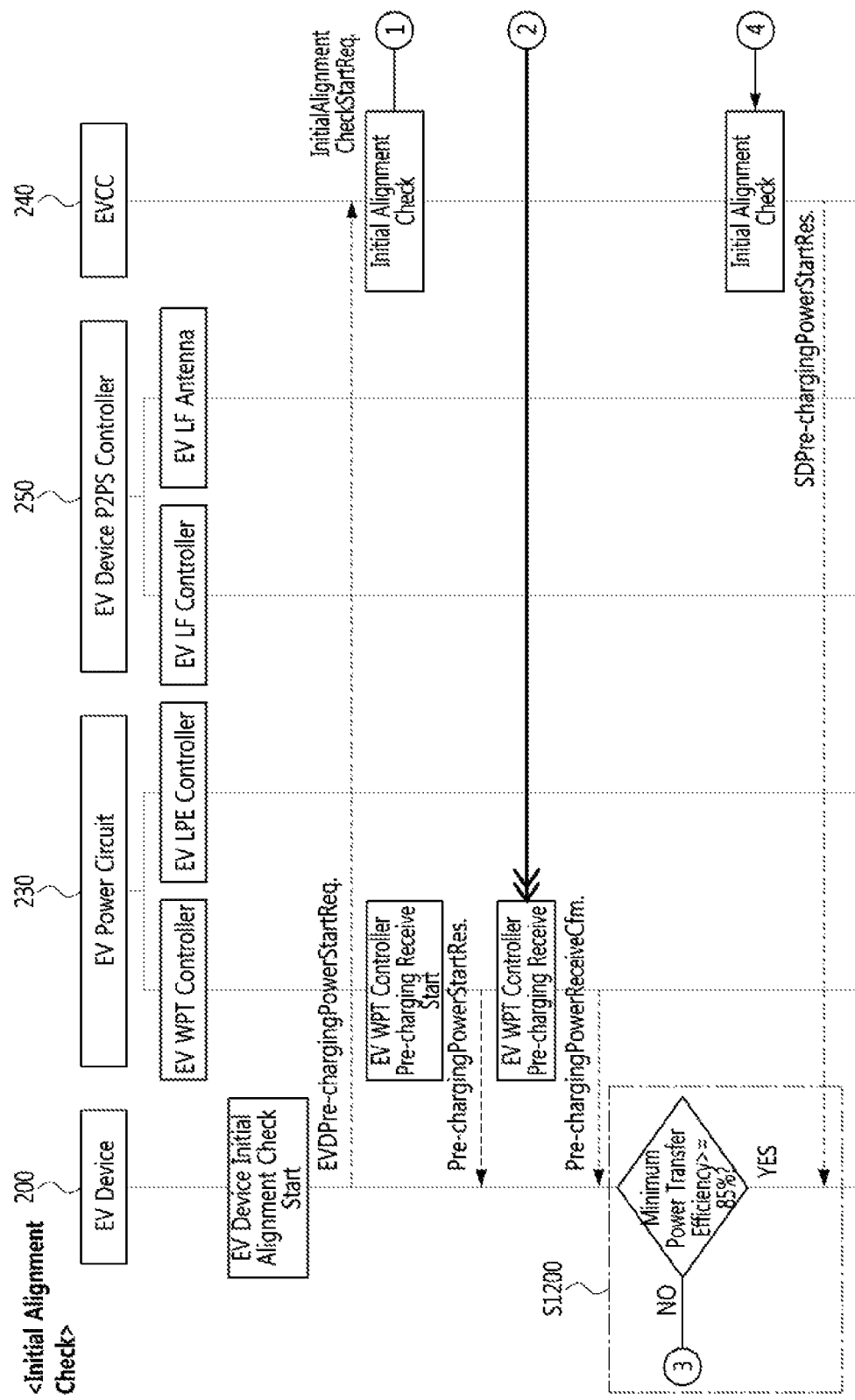
FIGS. 12A to 12E are flowcharts of an initial alignment check process according to an exemplary embodiment of the present disclosure.
Figure 12B:
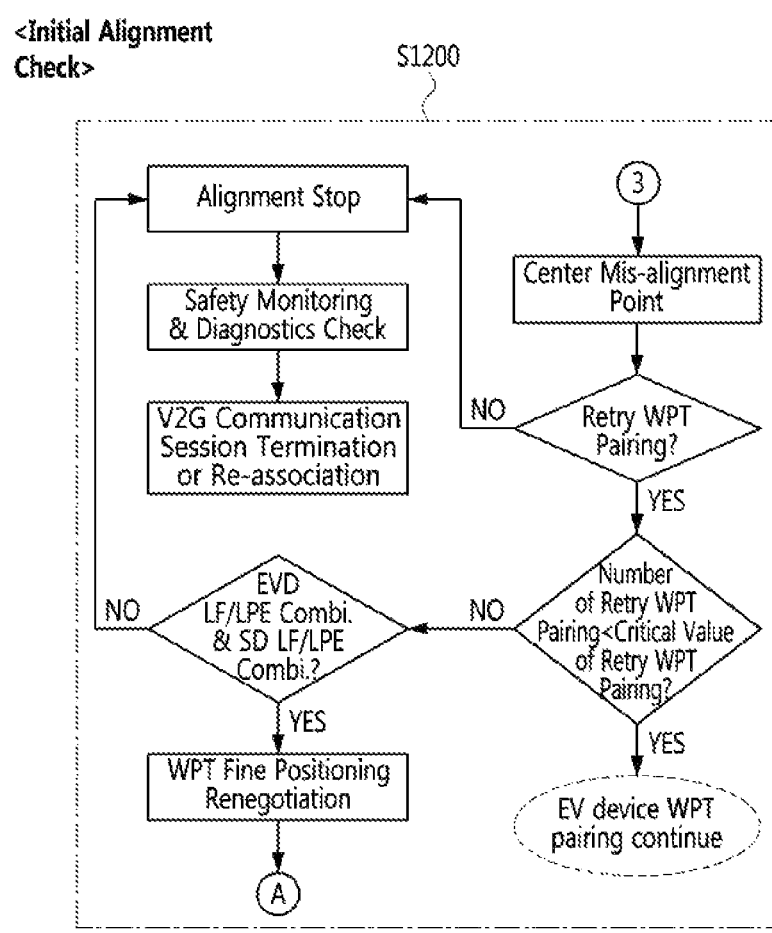
Figure 12C:
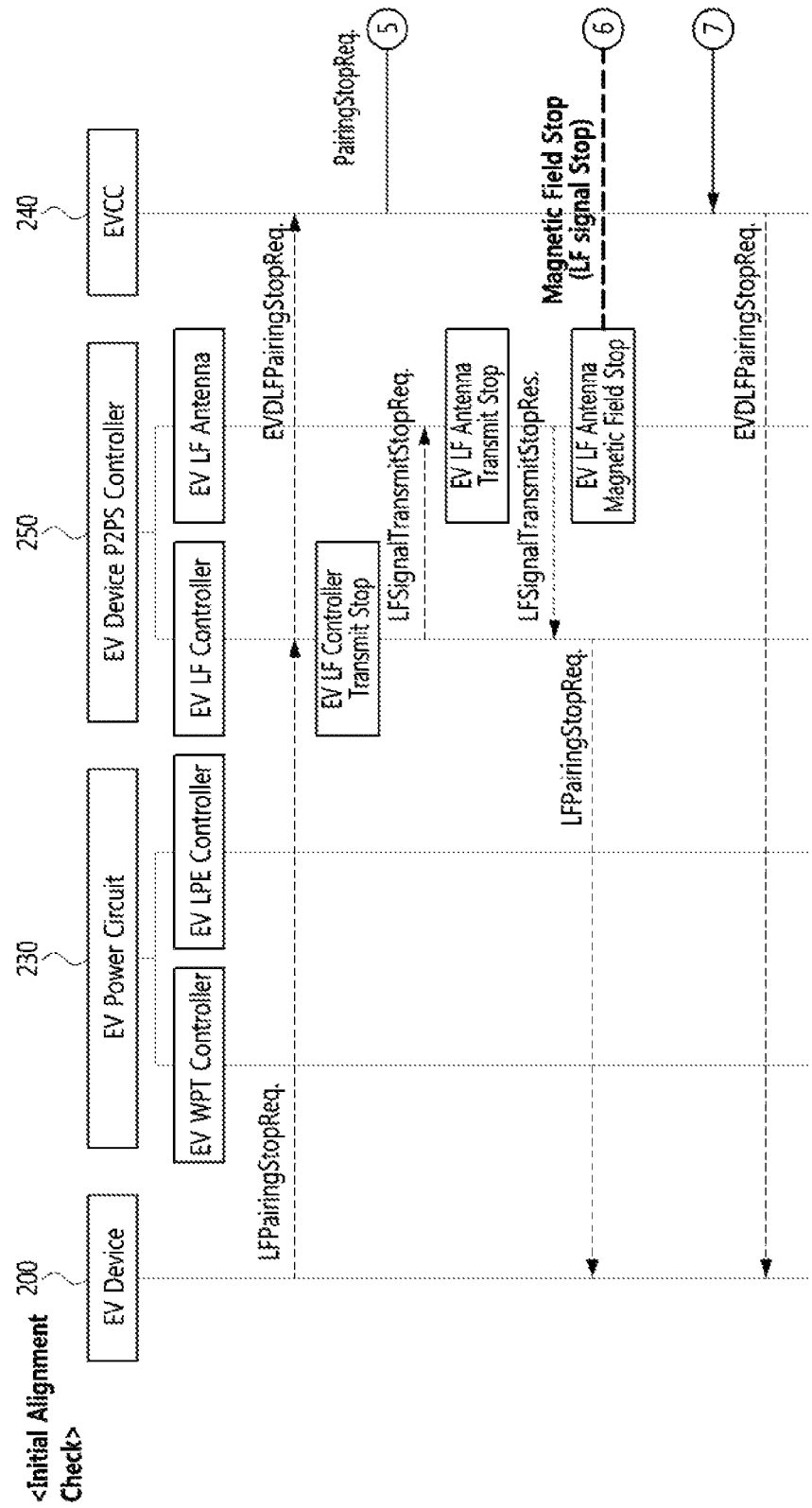
Figure 12D:
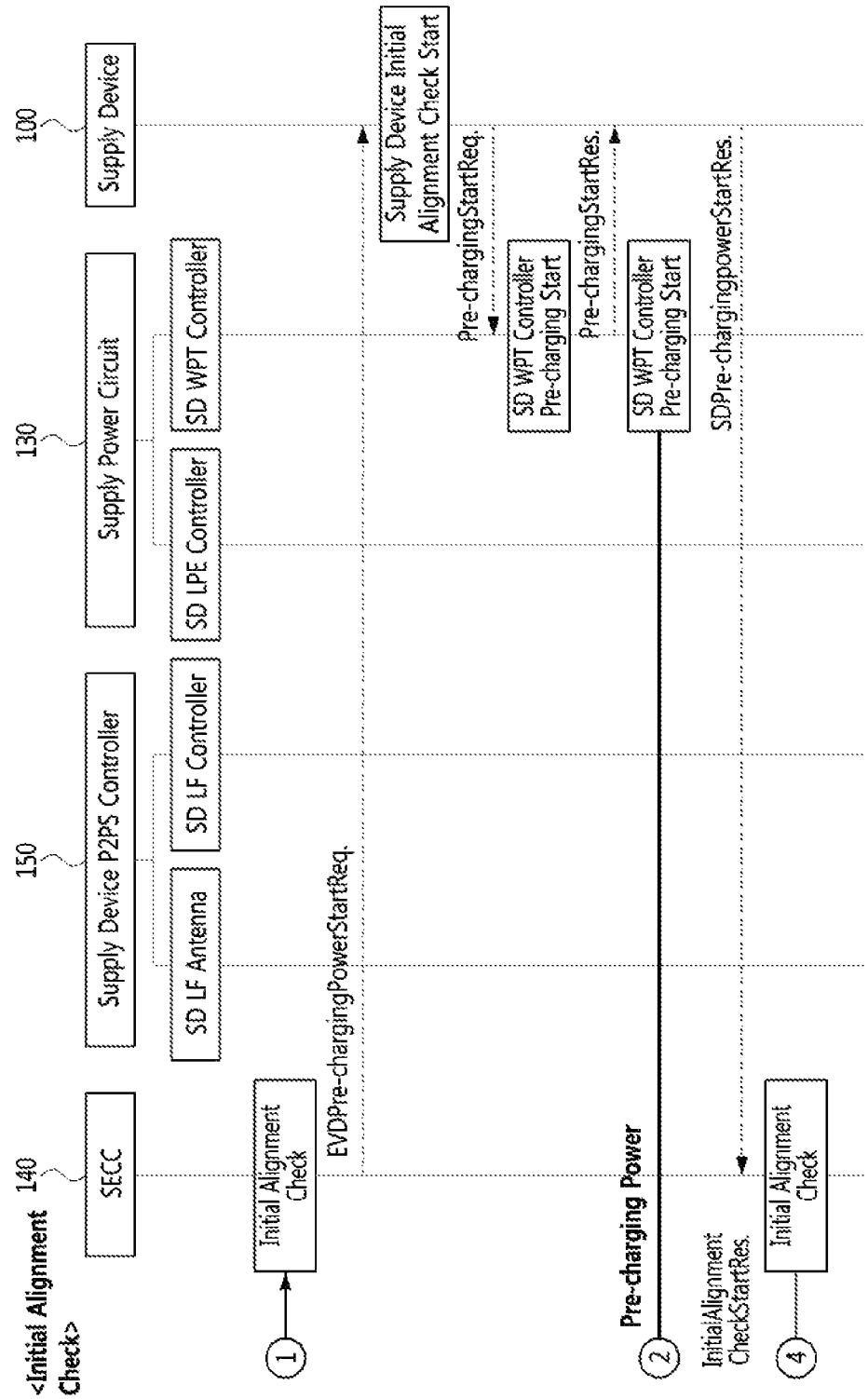
Figure 12E:
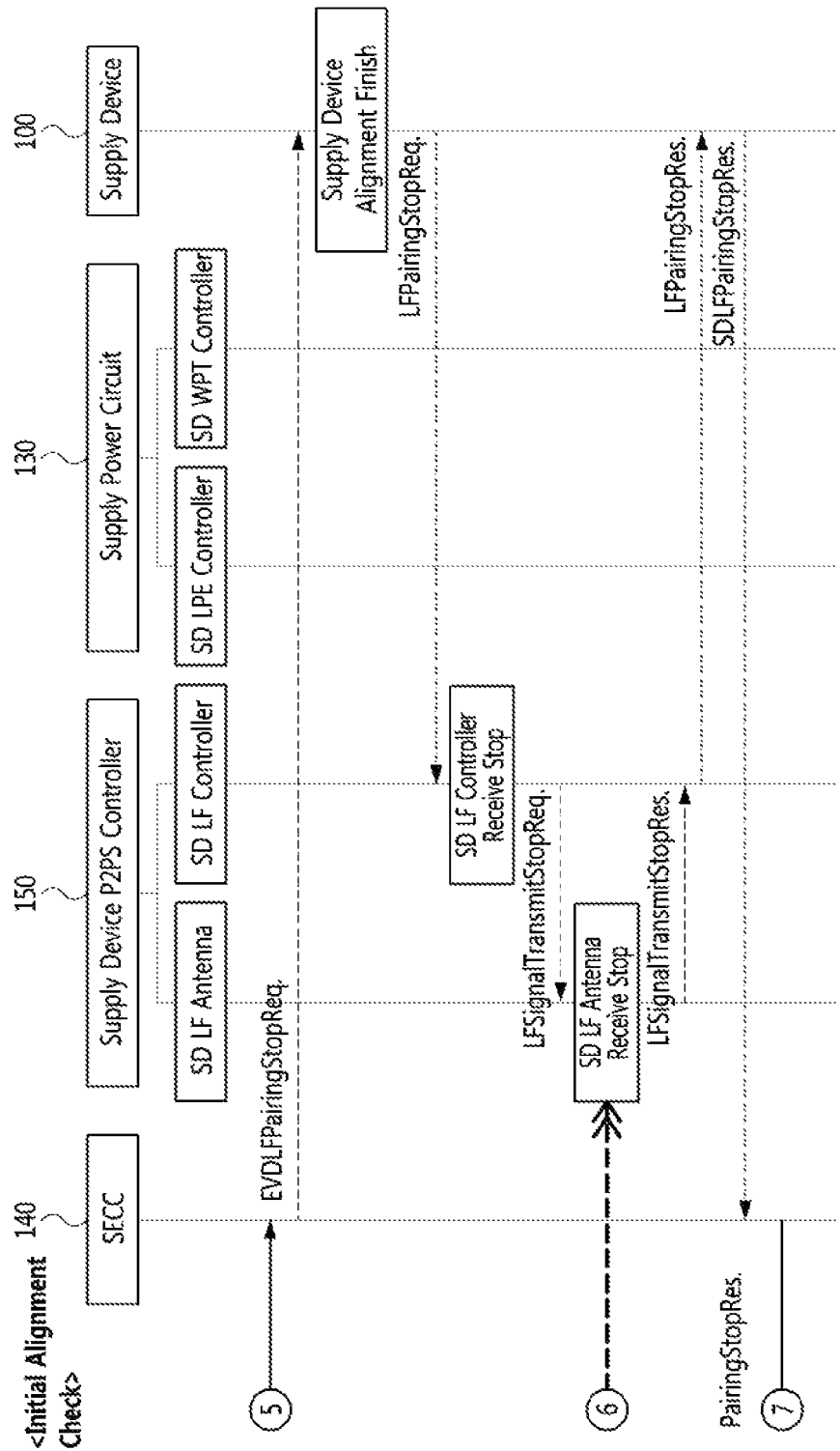
Figure 13A:
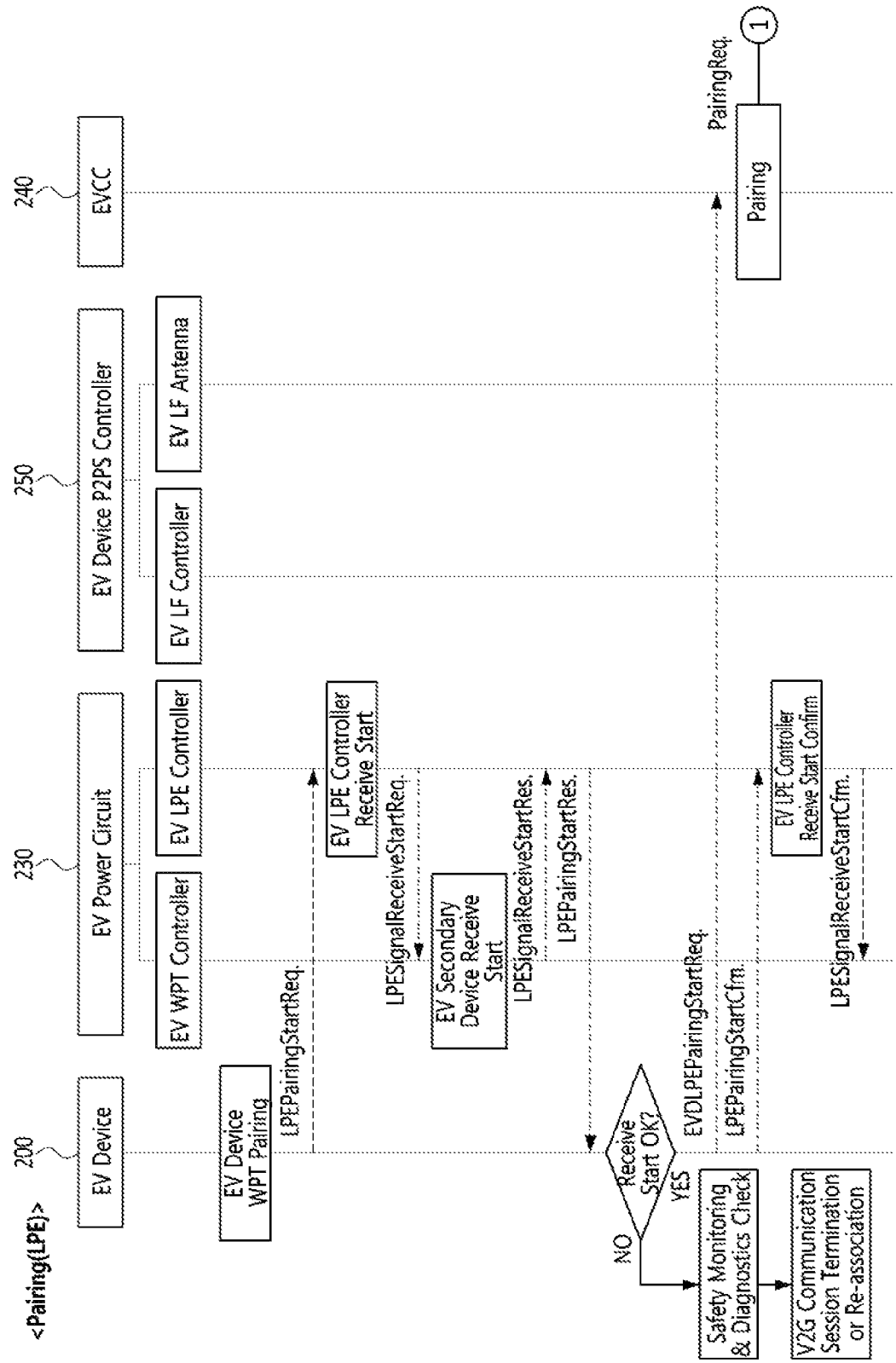
FIGS. 13A to 13D are flowcharts of an LPE pairing process according to an exemplary embodiment of the present disclosure.
Figure 13B:
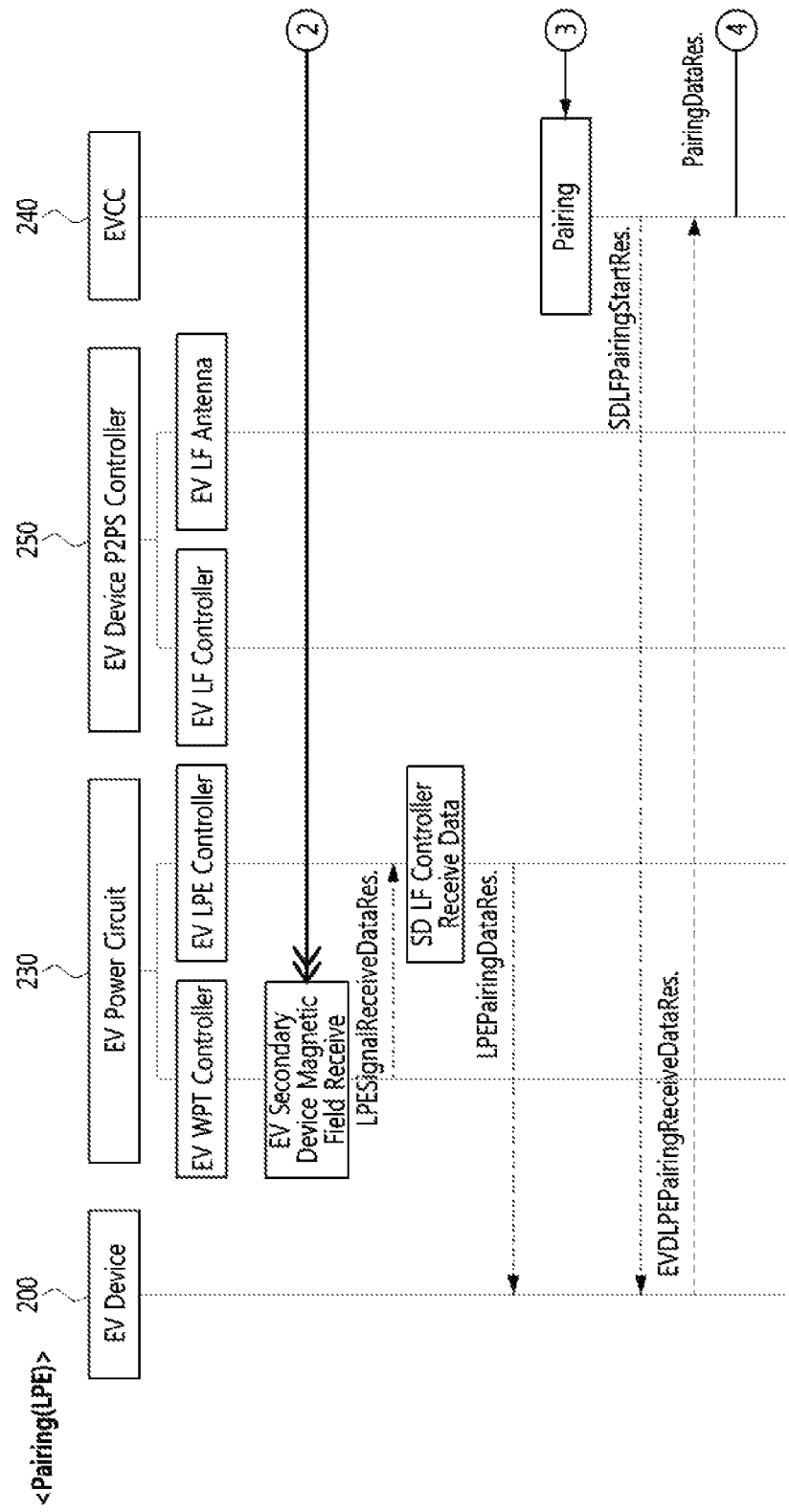
Figure 13C:
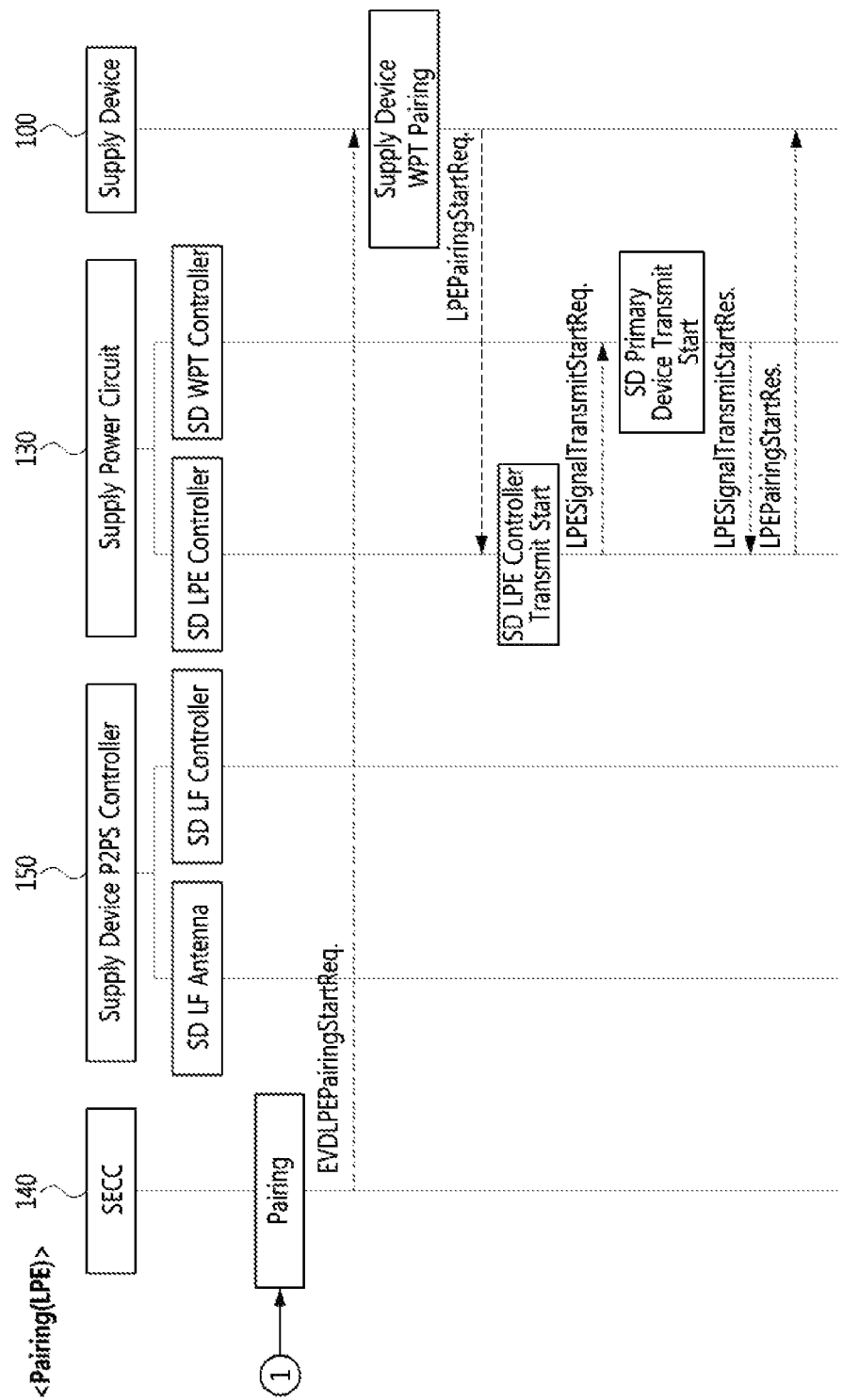
Figure 13D:
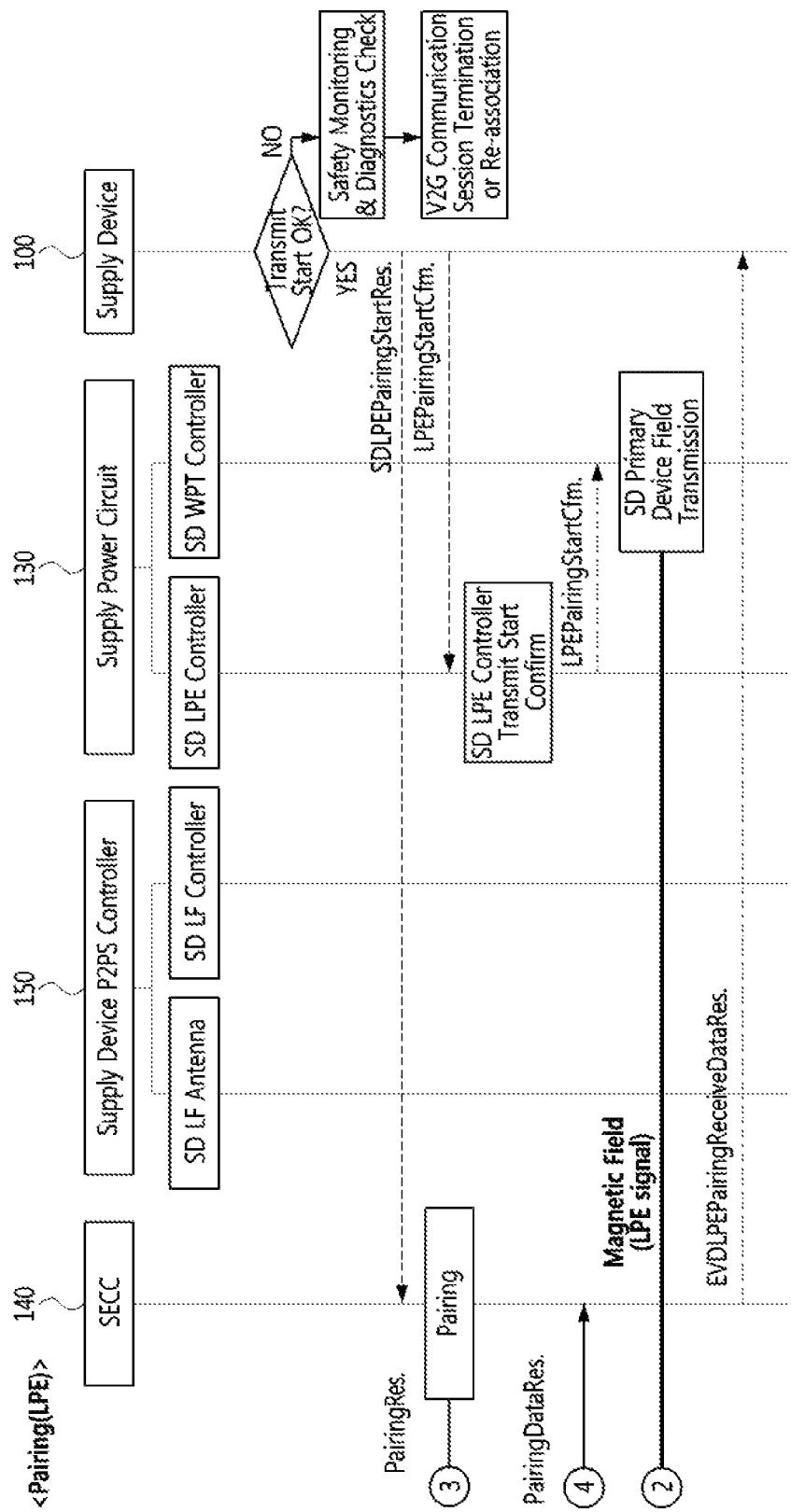

FIGS. 11A to 11B are flowcharts of an initial alignment check setup process according to an exemplary embodiment of the present disclosure. In the initial alignment check setup process, the EV device may be configured to transmit an initial alignment check setup request to the supply device 100 and request the EV power circuit 230 to perform pre-charging initialization and pre-charging await (S1110). In response to receiving the request from the EV device, the supply device 100 may be configured to request the SD WPT controller of the supply power circuit 130 to perform pre-charging initialization and pre-charging await (S1120).

FIGS. 12A to 12E are flowcharts of an initial alignment check process according to an exemplary embodiment of the present disclosure. Following the initial alignment check setup procedure, the EV device 200 may be configured to transmit an initial alignment check start request (InitialAlignmentCheckStartReq.) to the supply device 100. In response to receiving the request, the supply device may be configured to request the SD WPT controller to transmit pre-charging power. The EV power circuit 230 of the EV device may be configured to receive the pre-charging power transmitted by the supply device and the EV device may be configured to determine whether to renegotiate WPT fine positioning based on the received pre-charging power (S1200).

More specifically, in the determination of whether to renegotiate WPT fine positioning (S1200), the EV device may be configured to determine whether a minimum power transfer efficiency of the pre-charging power received from the supply device is greater than or equal to a reference value. When the minimum power transfer efficiency is greater than or equal to the reference value, a LF pairing stop procedure and a LPE pairing procedure may be performed without renegotiating WPT fine positioning. In particular, the reference value related to power transmission efficiency may be about 85%.

On the other hand, in response to determining that the minimum power transmission efficiency is less than the reference value, the EV device may be configured to determine that a mis-alignment has occurred and determine whether to perform WPT pairing again (e.g., whether to repeat the WPT pairing). If the WPT pairing is not to be performed again, the alignment may be stopped, a safety monitoring and a diagnostic check may be performed, and a V2G communication session may be terminated or a re-association may be performed. On the contrary, when repeating the WPT pairing, whether a number of times the WPT pairing is re-executed is greater than or equal to a threshold regarding a number of WPT pairing repeats may be determined. In response to determining that the number of times the WPT pairing is re-performed is less than the threshold, another WPT pairing procedure may be performed.

Additionally, in response to determining that the number of times the WPT pairing is re-executed is greater than or equal to the threshold for WPT pairing repeats, the LF service and/or LPE service of the EV device and the supply device may be checked, and a WPT fine positioning renegotiation may be proceeded. Proceeding with the WPT fine positioning renegotiation indicates that a current procedure proceeds to the service selection step described in the exemplary embodiments of FIGS. 5A and 5B, and the fine positioning setup and fine positioning, LF pairing, and LF pairing hold procedures may be repeated. Meanwhile, as described through FIGS. 10A and 10B, the authentication step may be omitted in the WPT fine positioning renegotiation procedure.

FIGS. 13A to 13D are flowcharts of an LPE pairing process according to an exemplary embodiment of the present disclosure. When the initial alignment check is completed, the supply device may be configured to receive an LPE pairing request from the EV device and operate the primary device to transmit a magnetic field, that is, an LPE signal through a SD WPT controller. For LPE pairing, the secondary device of the EV device may be configured to receive the LPE signal transmitted by the primary device of the SD WPT controller.

Figure 14B:
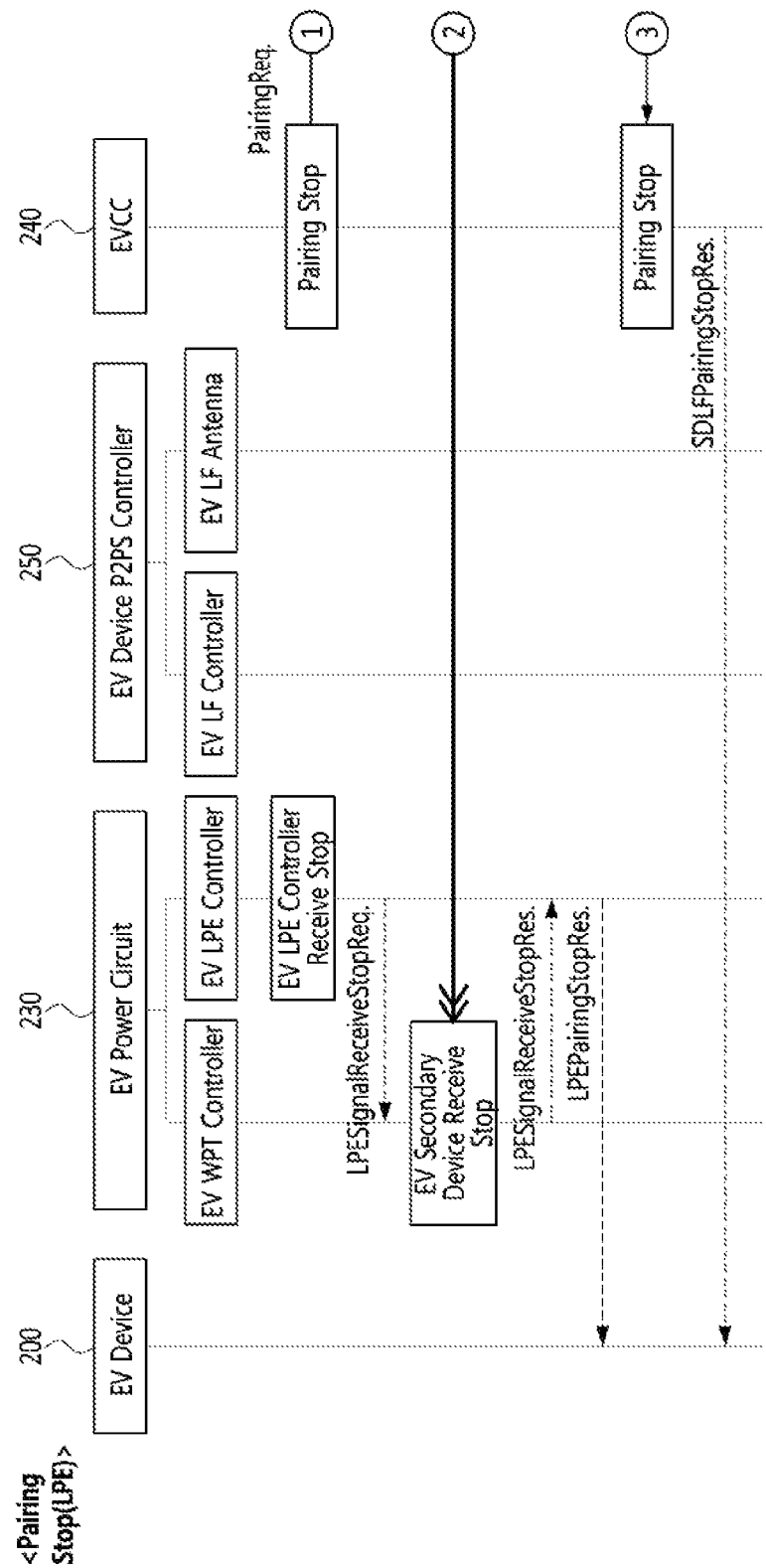

FIGS. 14A to 14C are flowcharts of an LPE pairing stop process according to an exemplary embodiment of the present disclosure. During LPE pairing, the EV device may be configured to compare a tolerance area of the supply device with a position value of the EV device, compare a center alignment point of the supply device with a position value of the EV device, and determine whether to continue or stop the pairing. In response to determining to stop the LPE pairing, the SD WPT controller of the supply device may be configured to instruct the primary device to stop transmitting the magnetic field (i.e., LPE signal). After the LPE pairing is stopped, actual power transmission between the primary device and the secondary device may be performed.

Meanwhile, a charging procedure may be stopped (or a charging session may be interrupted) after the actual power transfer procedure is started. According to exemplary embodiments of the present disclosure, as described below, the charging session may be stopped when a service renegotiation for WPT fine positioning and pairing is required.

Figure 15:
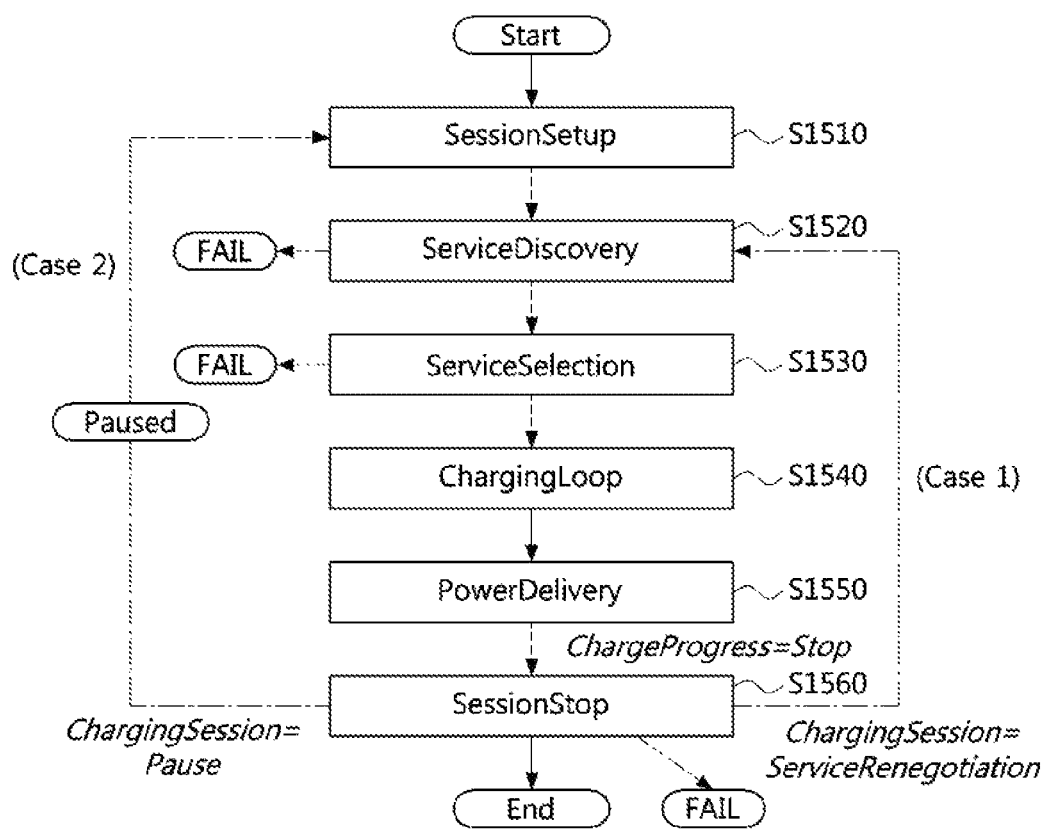
FIG. 15 is a flow chart related to service renegotiation in wireless power transfer (WPT) according to an exemplary embodiment of the present disclosure.

FIG. 15 is a flow chart related to service renegotiation in wireless power transfer (WPT) according to an exemplary embodiment of the present disclosure. According to an exemplary embodiment of the present disclosure, processes considered in a service renegotiation during the wireless power transfer may include steps for session setup (S1510), service discovery (S1520), service selection (S1530), charging loop (S1540), power delivery (S1550), and session stop (S1560).

As discussed above, a service renegotiation procedure, which is a procedure in which the EVCC or the SECC reconsiders a current service selection, may be required for the EV to select a different service set or different parameter values of the same service. Examples of service changes may include changing from a scheduled control to a dynamic control, or vice versa, changing between AC charging and DC charging, and adding or removing a value-added service (VAS).

In a charging session, the SECC may be configured to indicate whether a service renegotiation is possible during a session through a first service discovery response (ServiceDiscoveryRes) message. The ServiceDiscoveyRes message may include a parameter with following characteristics:

Parameter name: ServiceRenegotiationAllowed
Type: Boolean
Inclusion: Mandatory

The "ServiceRenegotiationAllowed" may be included and set in a first ServiceDiscoveryRes message and not be changed throughout the session. If the EVCC or the SECC violates the decision made by the parameter, the session may end.

In the exemplary embodiment of FIG. 15, two cases in which a service renegotiation occurs are shown. The first case is when a service renegotiation is triggered in the middle of or during charging. For example, a service renegotiation may be triggered during exchange of charging loop messages (S1540) such as AC_EnergyTransferLoop, DC_EnergyTransferLoop, and WPT_EnergyTransferLoop. When the SECC triggers a service renegotiation, the SECC may be configured to indicate its intension of the service renegotiation by setting "EVSENotification.EVSEStatus"="ServiceRenegotiation" in a charging loop message to be transmitted from the SECC. However, if the "ServiceRenegotiationAllowed" parameter is set "False", the EV may ignore this parameter.

When the EVCC triggers a service renegotiation, a PowerDeliveryReq message with a ChargeProgress parameter set to "Stop" may be transmitted to the SECC, and the current sequence continues until the session stops. In addition, the EVCC may be configured to transmit a SessionStopReq message with ChargingSession set to "ServiceRenegotiation." If a ResponseCode of the SessionStopRes message is "OK", the EVCC may be configured to transmit the ServiceDiscoveryReq message to the SECC to choose select services thereafter.

If the ResponseCode of the SessionStopRes message indicates that a service renegotiation is not allowed (e.g., "FAILED NoServiceRenegotiationSupported"), the session may end. For example, if the ServiceRenegotiationAllowed is set "False", the SECC may be configured to transmit the SessionStopRes. message with a ResponseCode set "FAILED NoServiceRenegotiationSupported."

A second case related to a service renegotiation is when a service renegotiation is triggered at waking up from a paused period. A paused period is a duration of time of a session when no energy is transferred and no communication is active between the EVCC and the SECC. At the wake up, either triggered by the EVCC or the SECC, the EVCC and the SECC may follow a full sequence from the SessionSetup (S1510) toward the charging loop (S1540).

For the SECC to trigger a service renegotiation, the SECC may offer a different set of services and parameters in the ServiceDiscoveryRes message and/or the ServiceDetailRes message. Meanwhile, the ServiceDiscoveryRes message and the ServiceDetailRes message are messages to which the SECC responds according to a service detail check request from the EV device, and may be understood as having the same or similar meaning or function. For the EVCC to trigger a service renegotiation, whether SECC triggered first or not, the EVCC may be configured to select services and/or parameters that are different from before. If the SECC does not offer the same services/parameters when a service renegotiation is not allowed, the EVCC may stop the session. If the EVCC selects different services/parameters from what it previously selected, the SECC may be configured to transmit a response code "FAILED NoServiceRenegotiationSupported."

FIGS. 16A to 20 show flowcharts of a wireless power transfer method according to another exemplary embodiment of the present disclosure. The wireless power transfer method according to another exemplary embodiment of the present disclosure may include steps for service detail check, service selection, fine positioning setup, fine positioning, LF pairing, LF pairing hold, initial alignment check setup, and LF pairing stop.

Figure 16A:
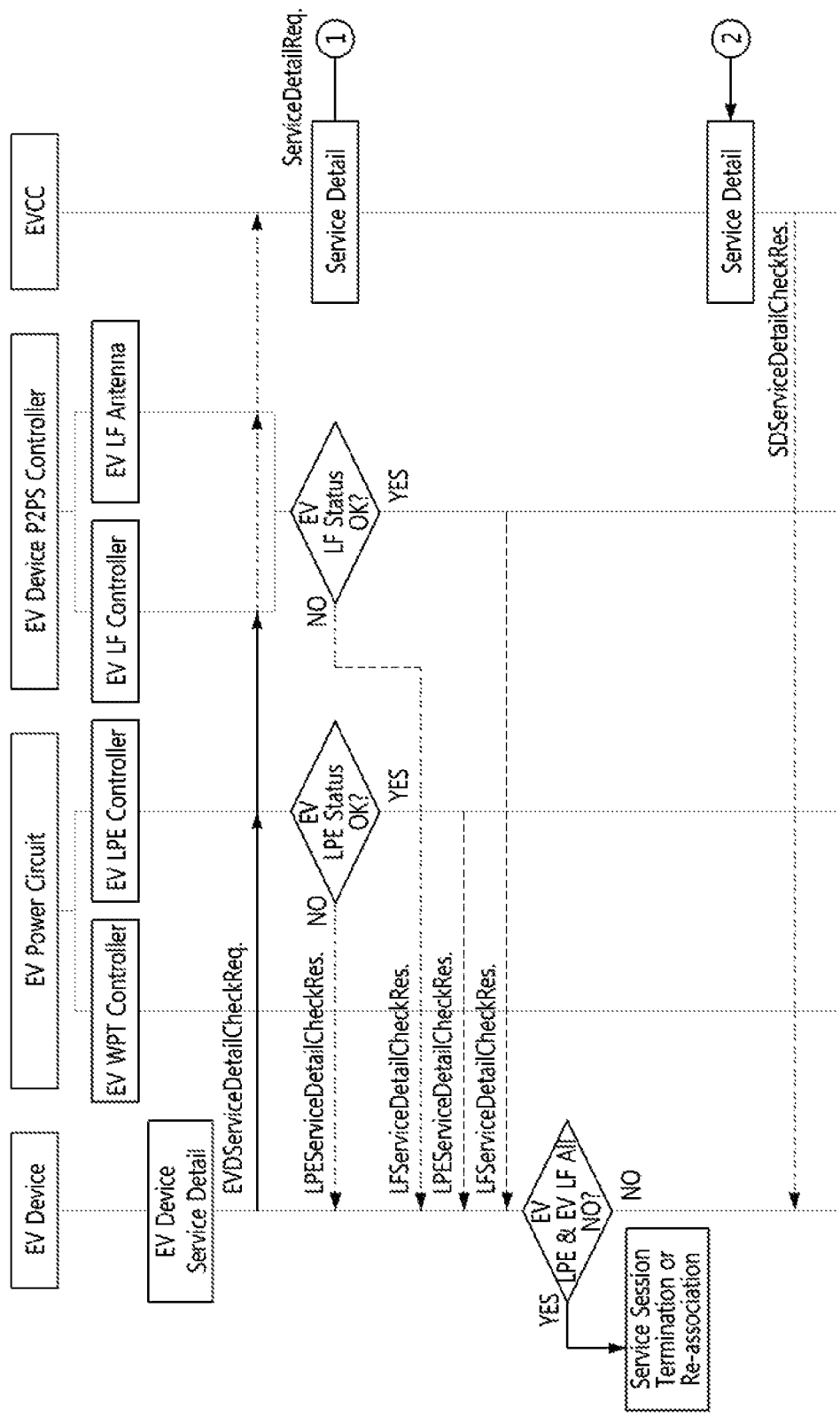
FIGS. 16A to 16B are flowcharts of a service detail check process in wireless power transfer according to another embodiment of the present disclosure.
Figure 16B:
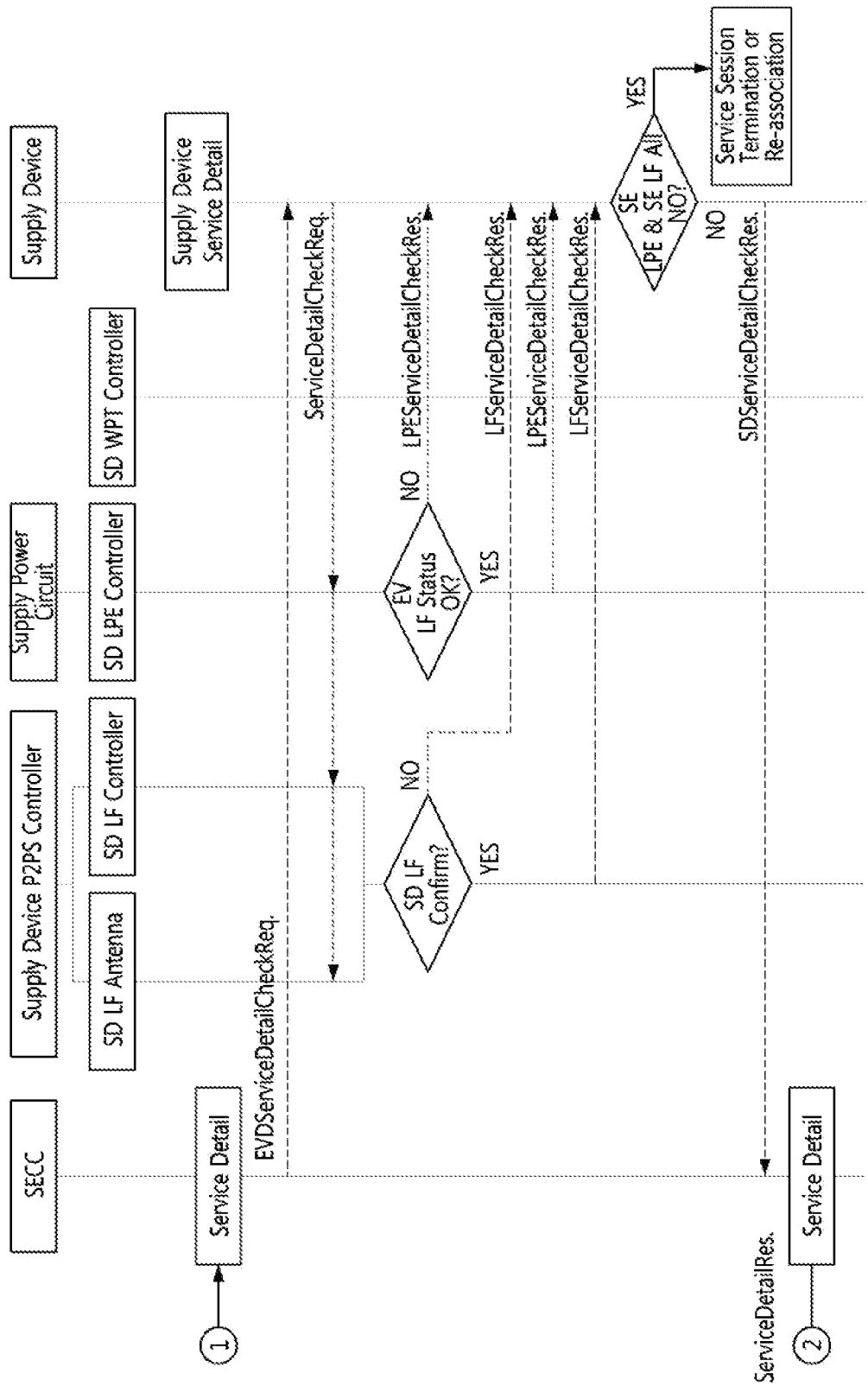
Figure 17B:
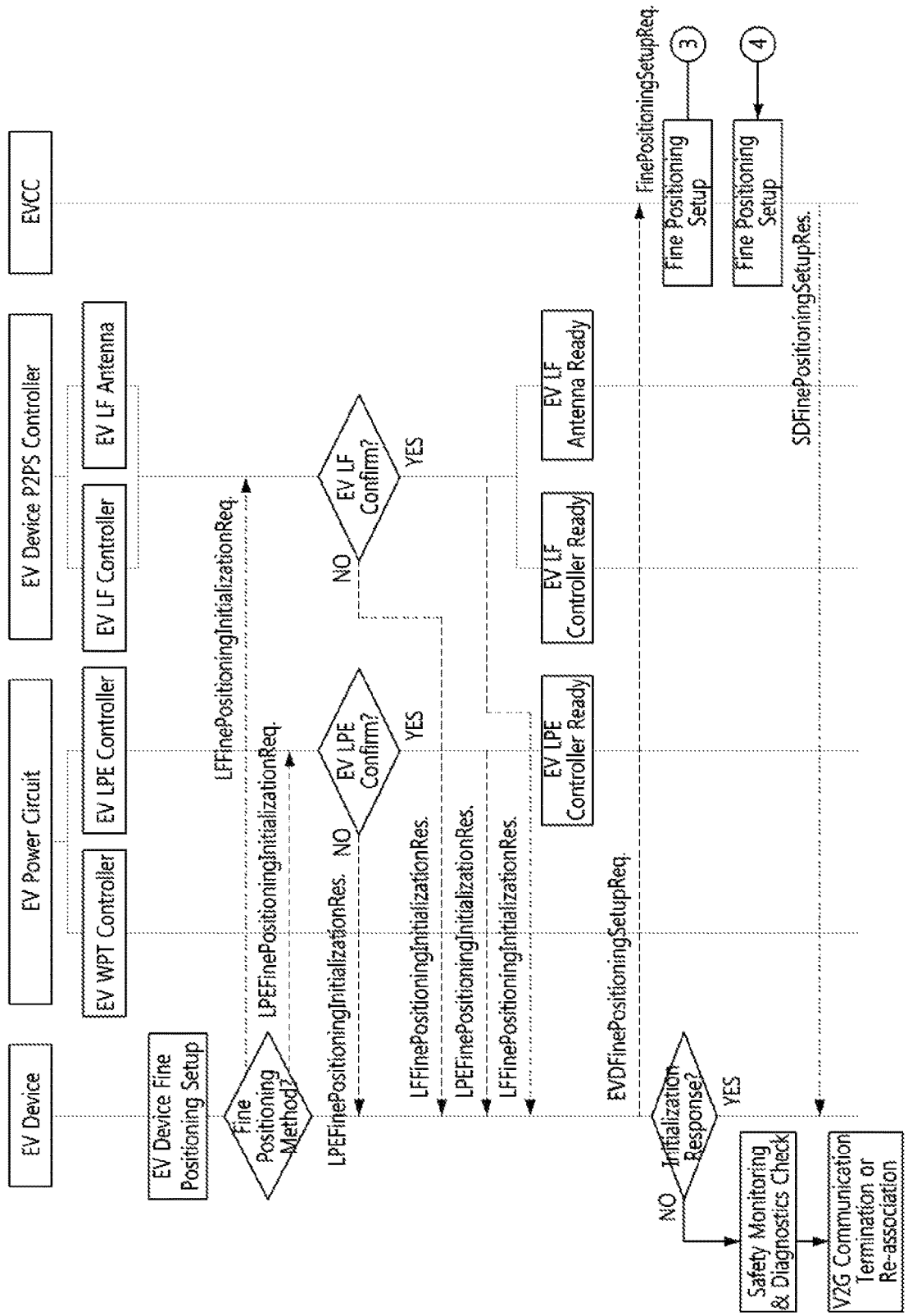
Figure 17C:
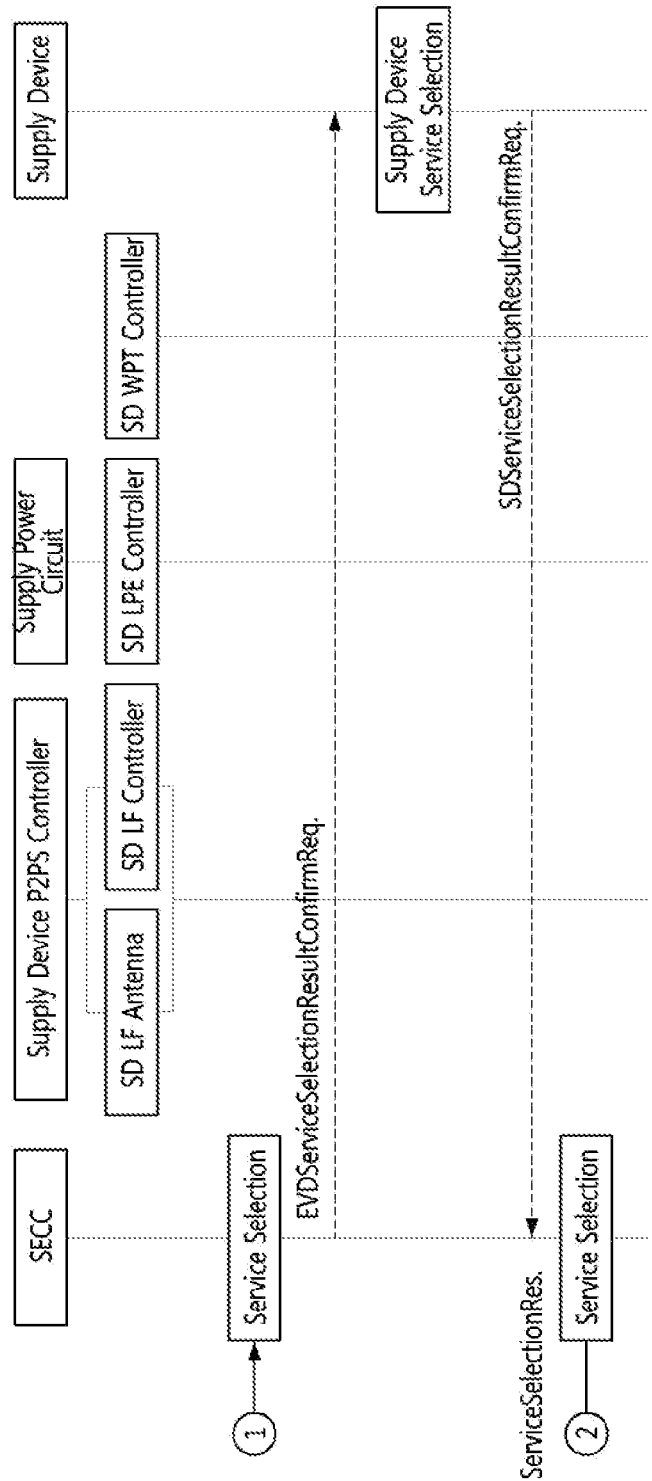
Figure 17D:
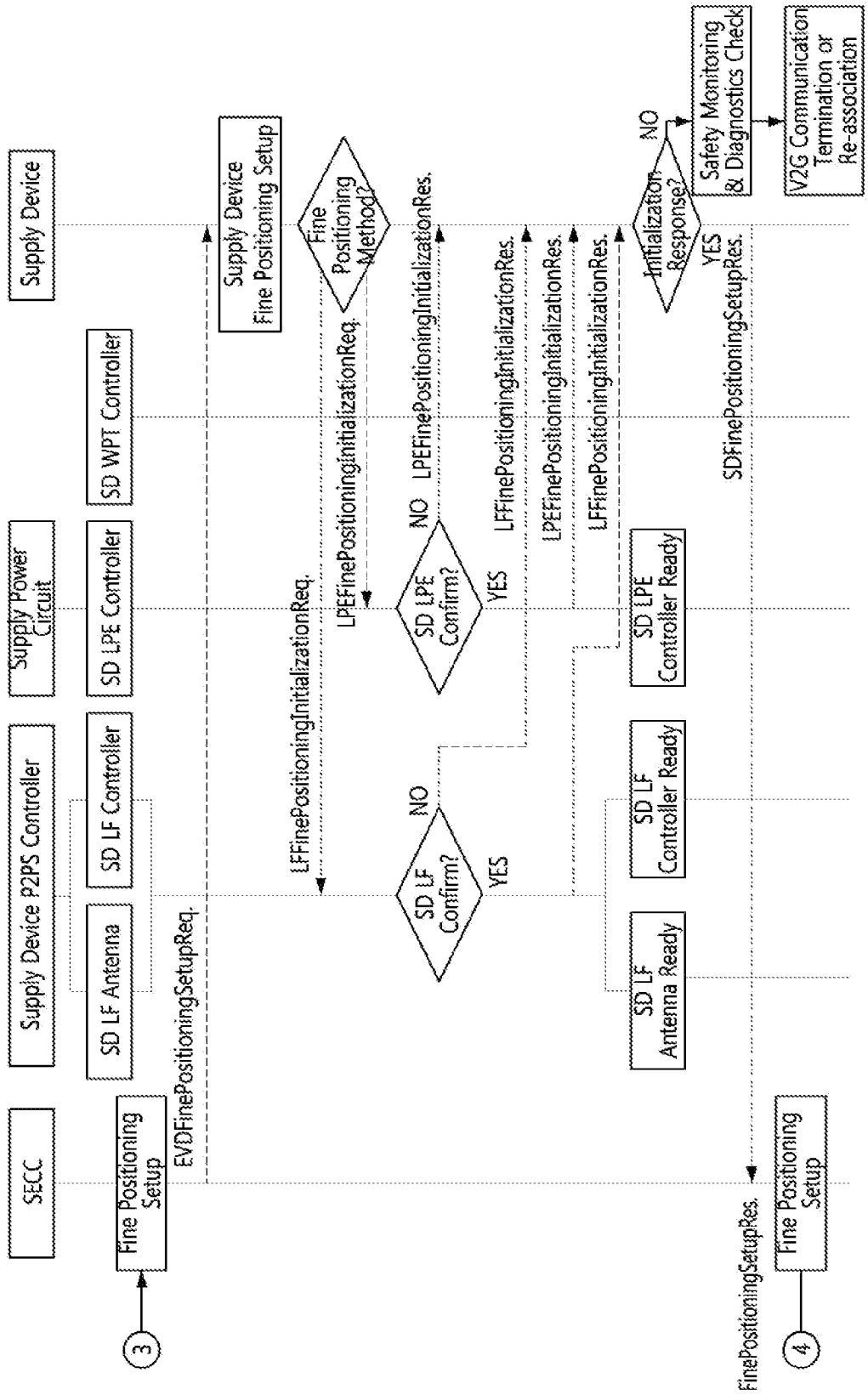
Figure 18A:
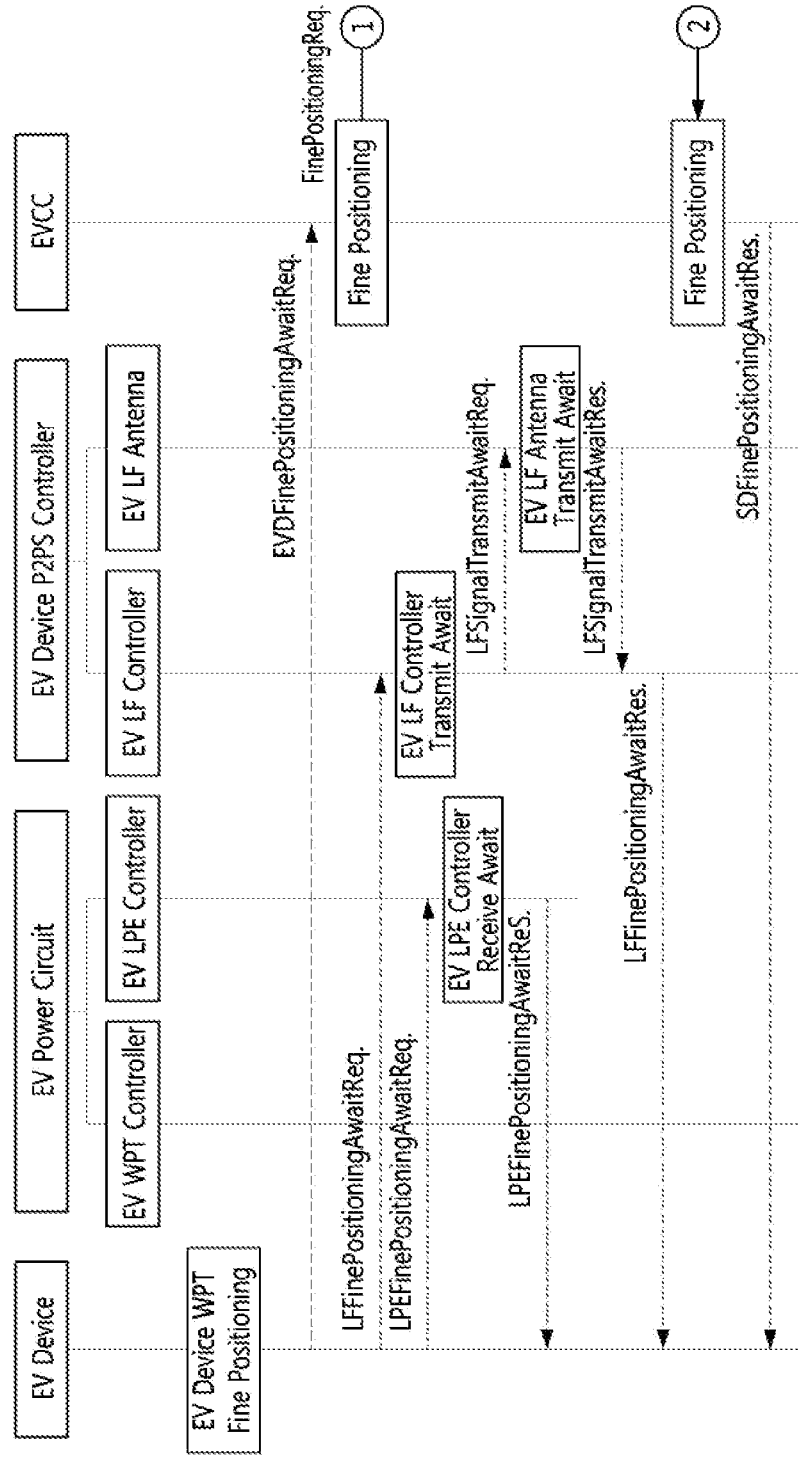
FIGS. 18A to 18D are flowcharts of a fine positioning process and a pairing process in wireless power transfer according to another embodiment of the present disclosure.
Figure 18B:
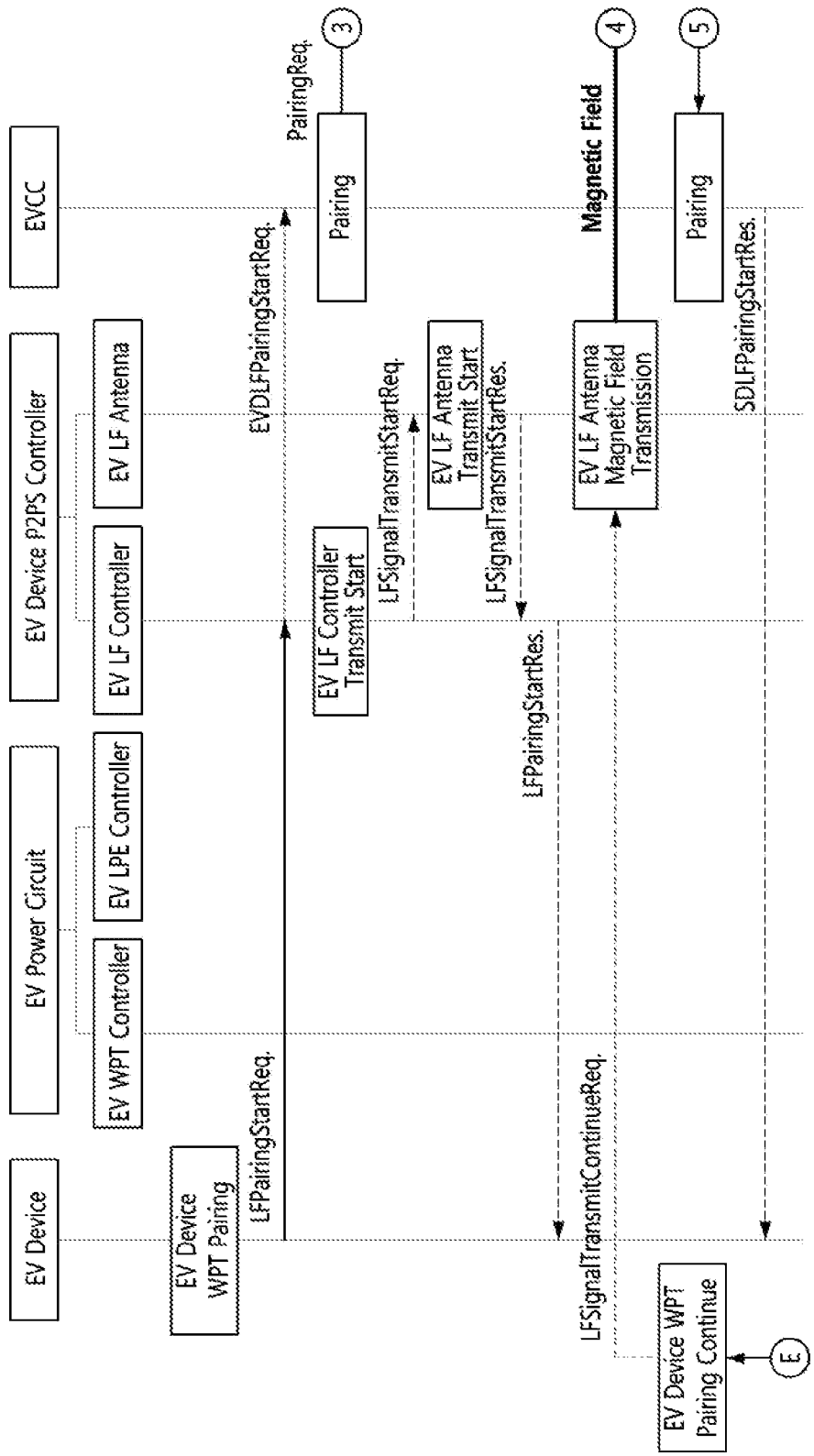
Figure 18C:
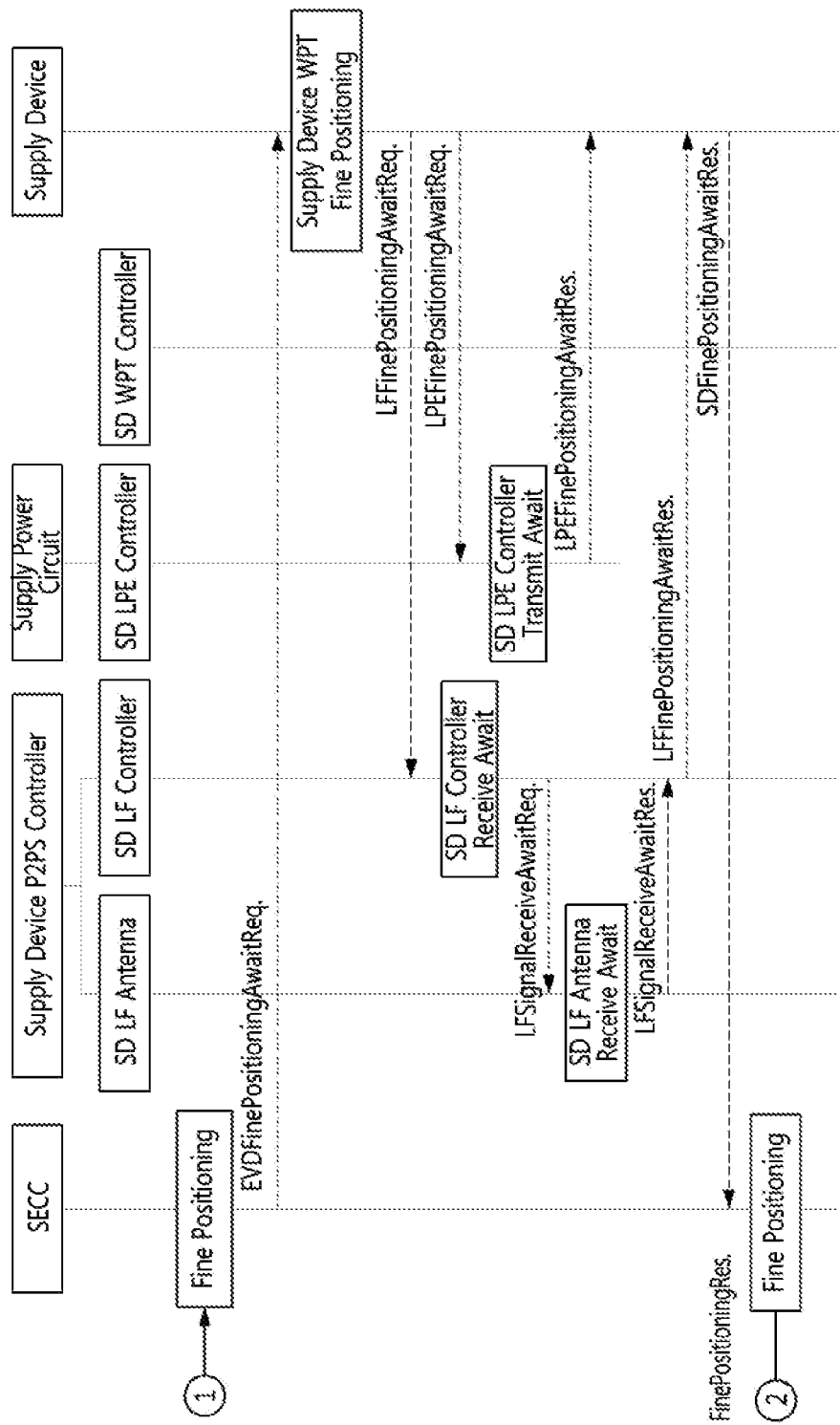
Figure 18D:
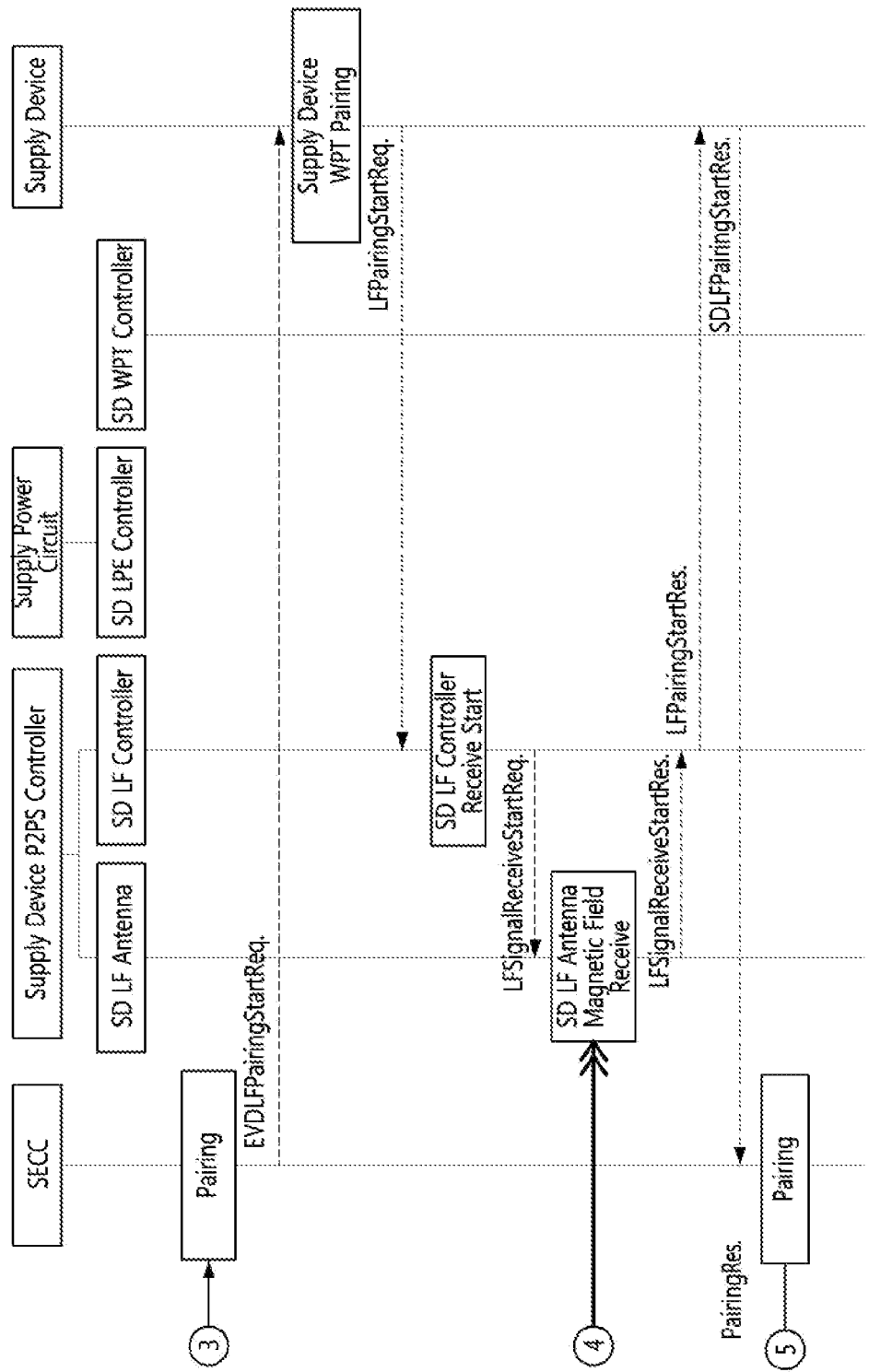
Figure 19A:
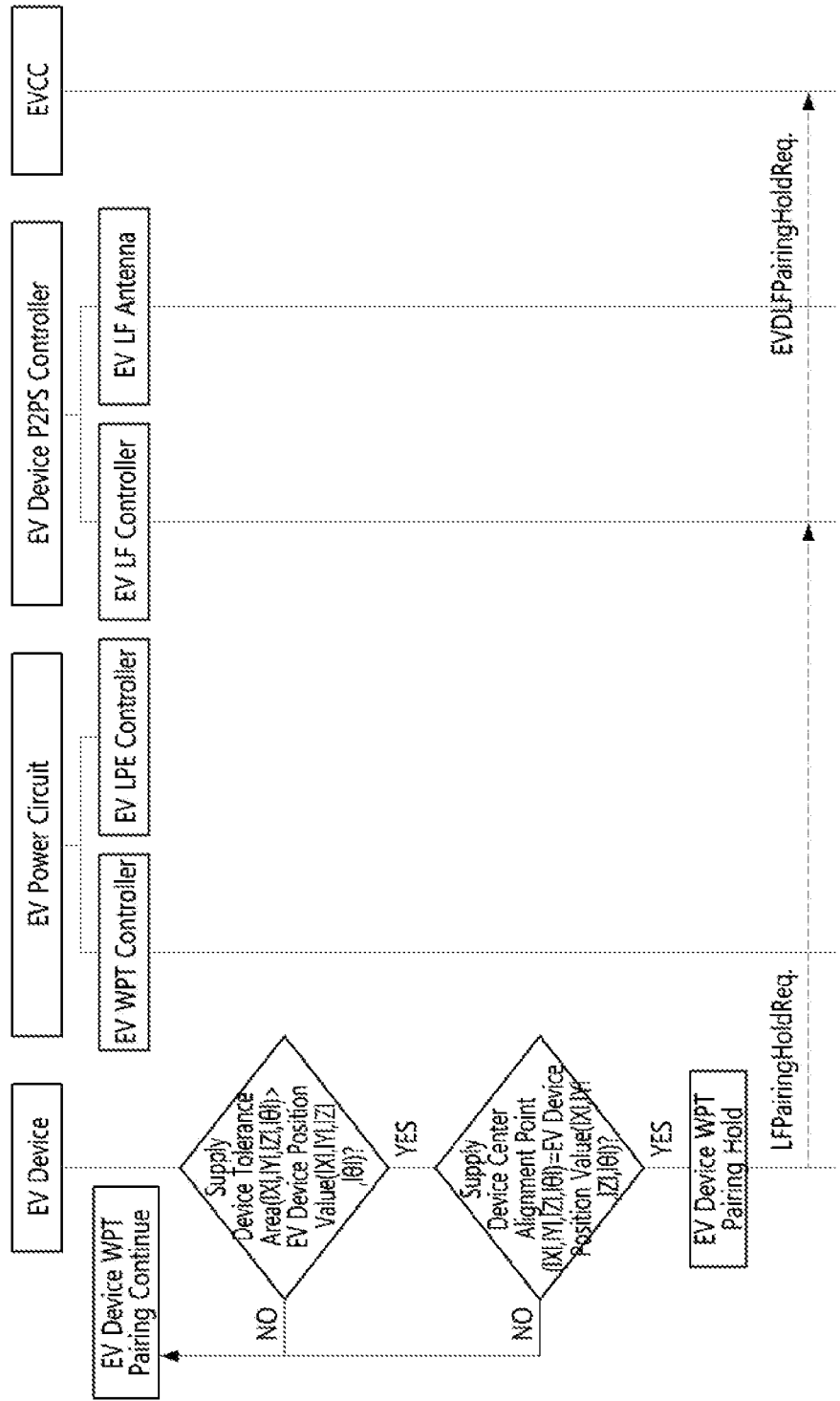
FIGS. 19A to 19E are flowcharts of LF pairing hold and initial alignment check setup in wireless power transfer according to another embodiment of the present disclosure.
Figure 19B:
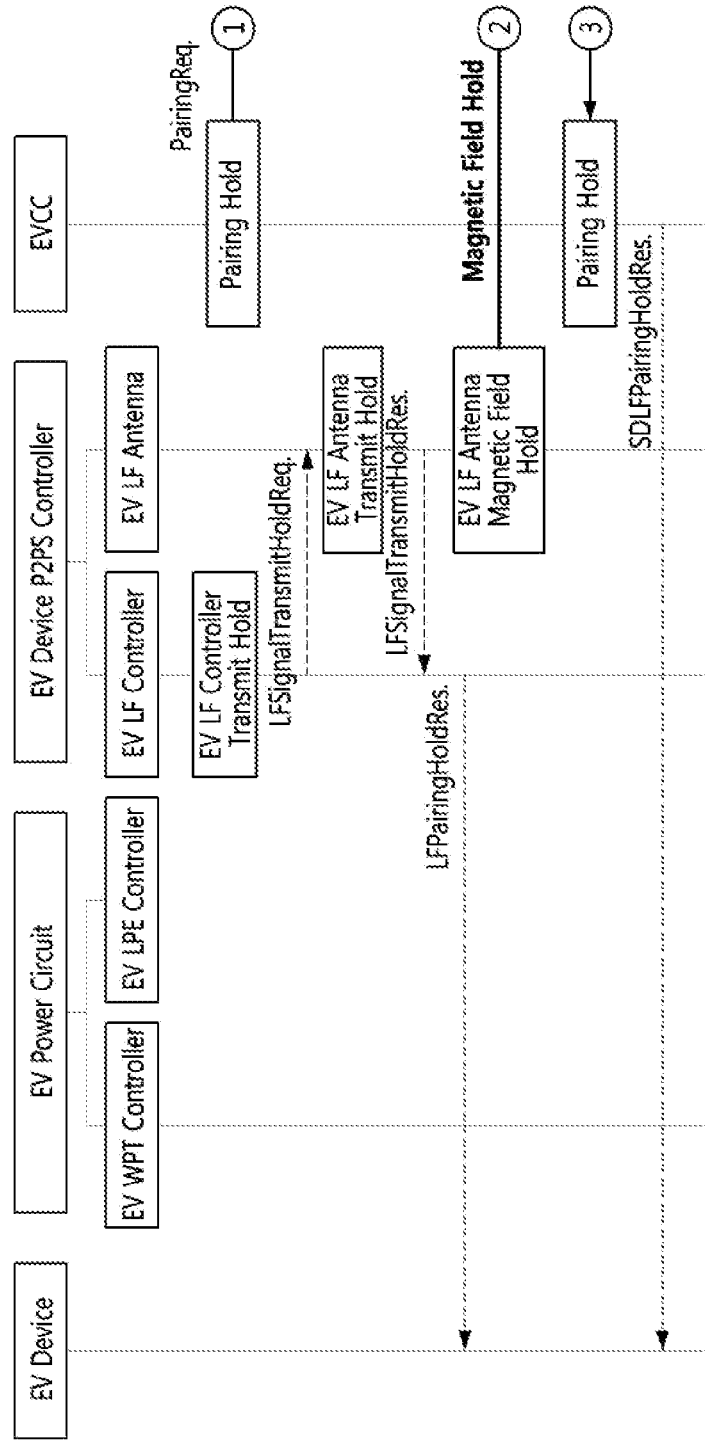
Figure 19C:
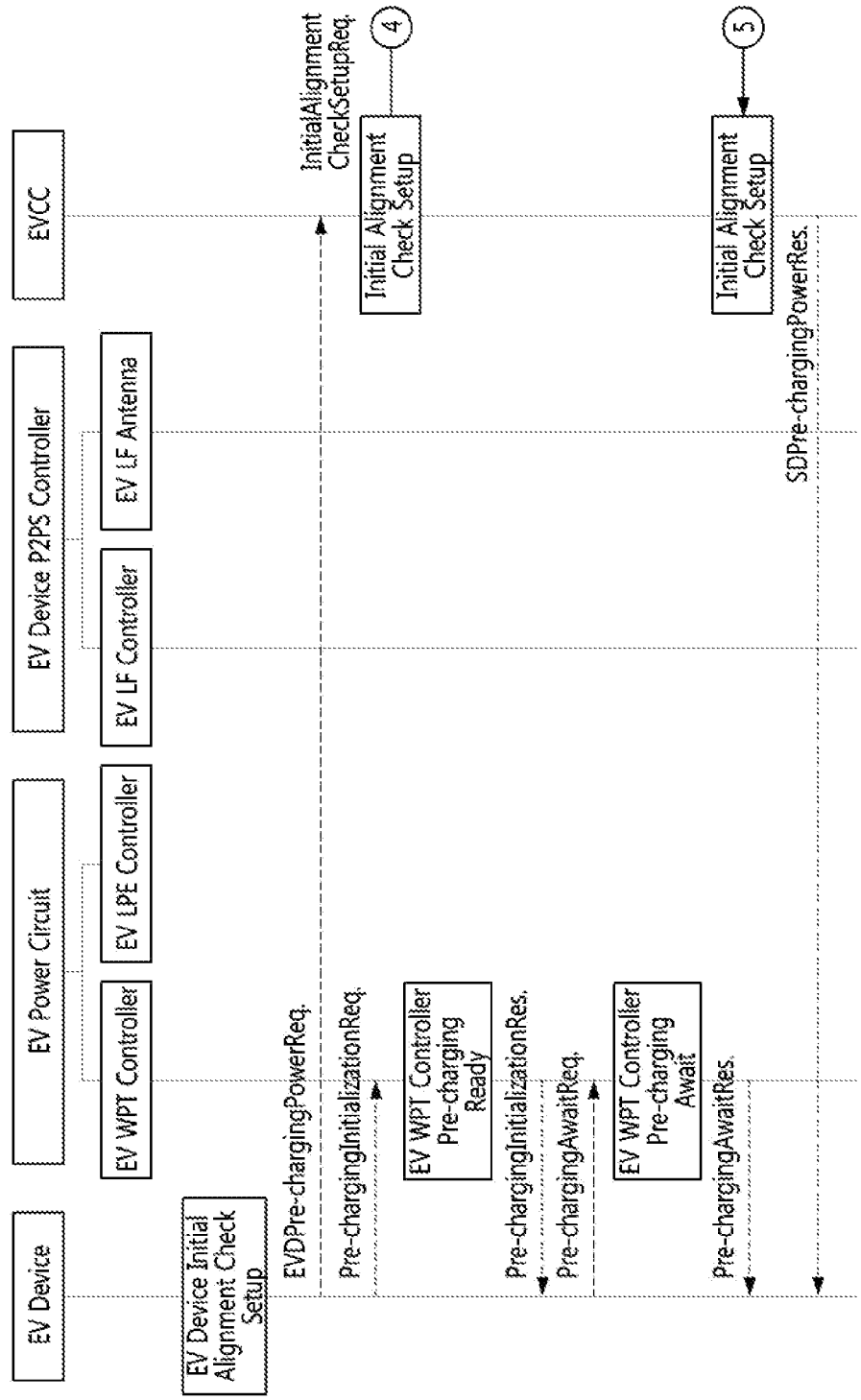
Figure 19D:
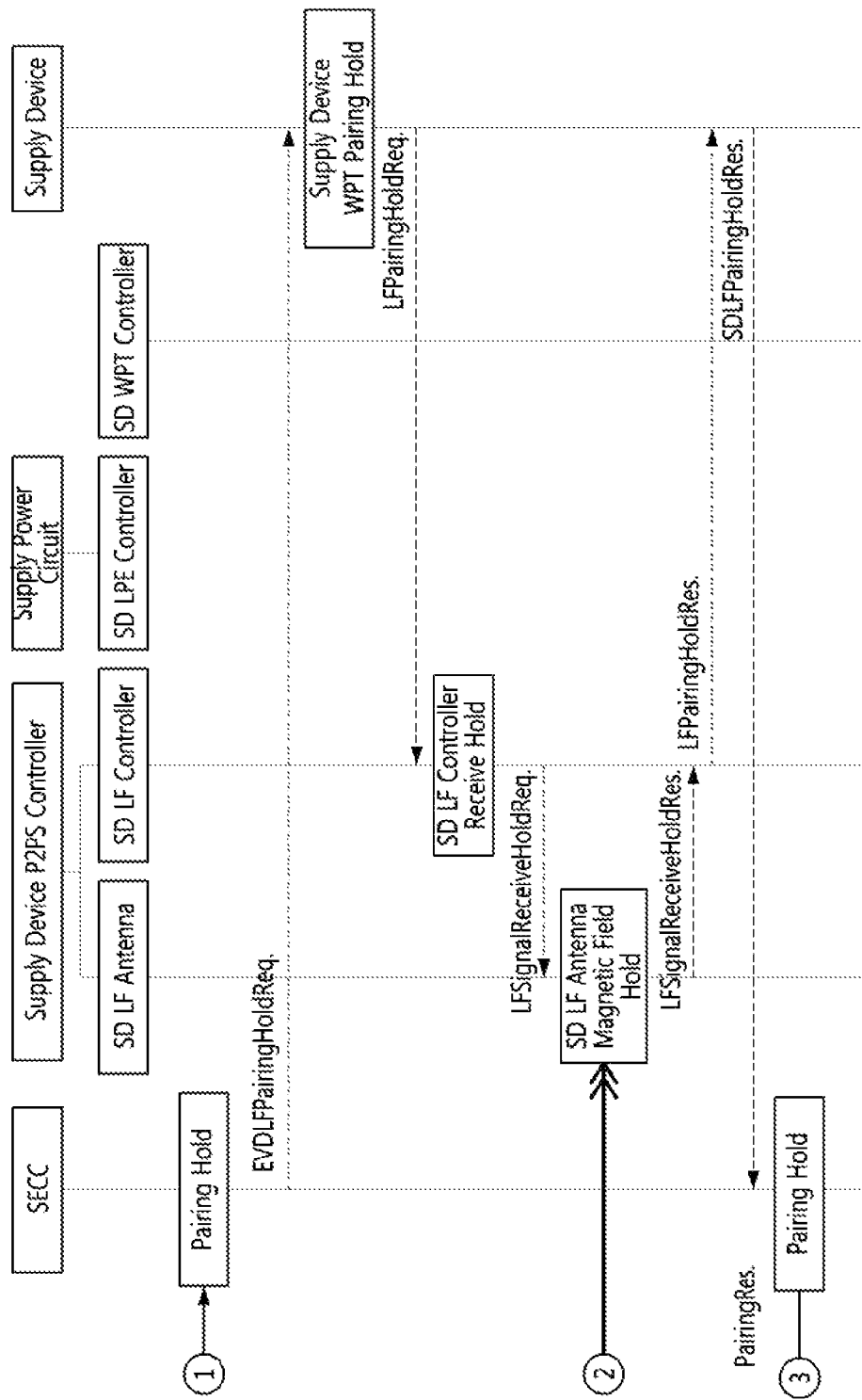
Figure 19E:
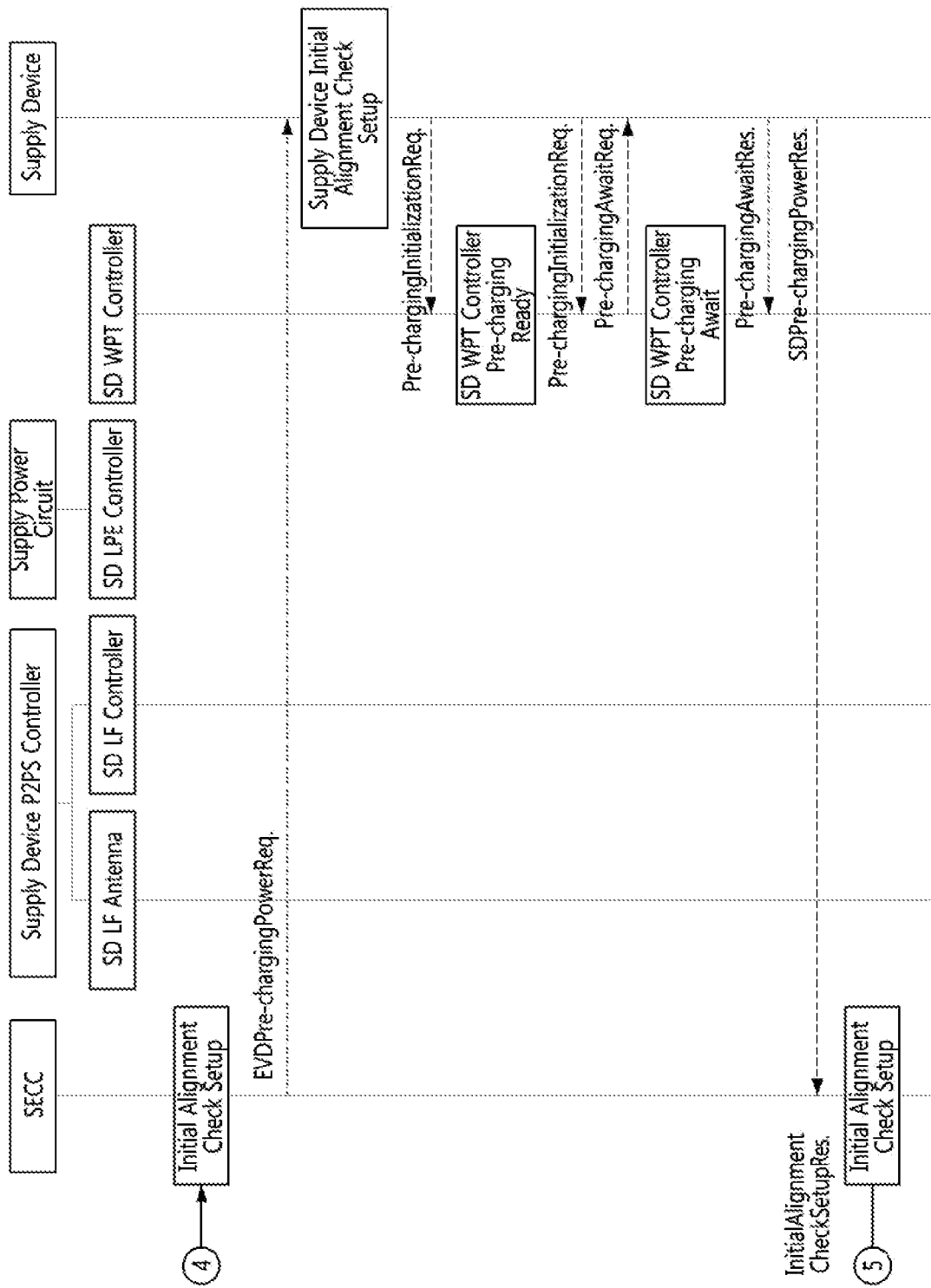
Figure 20A:
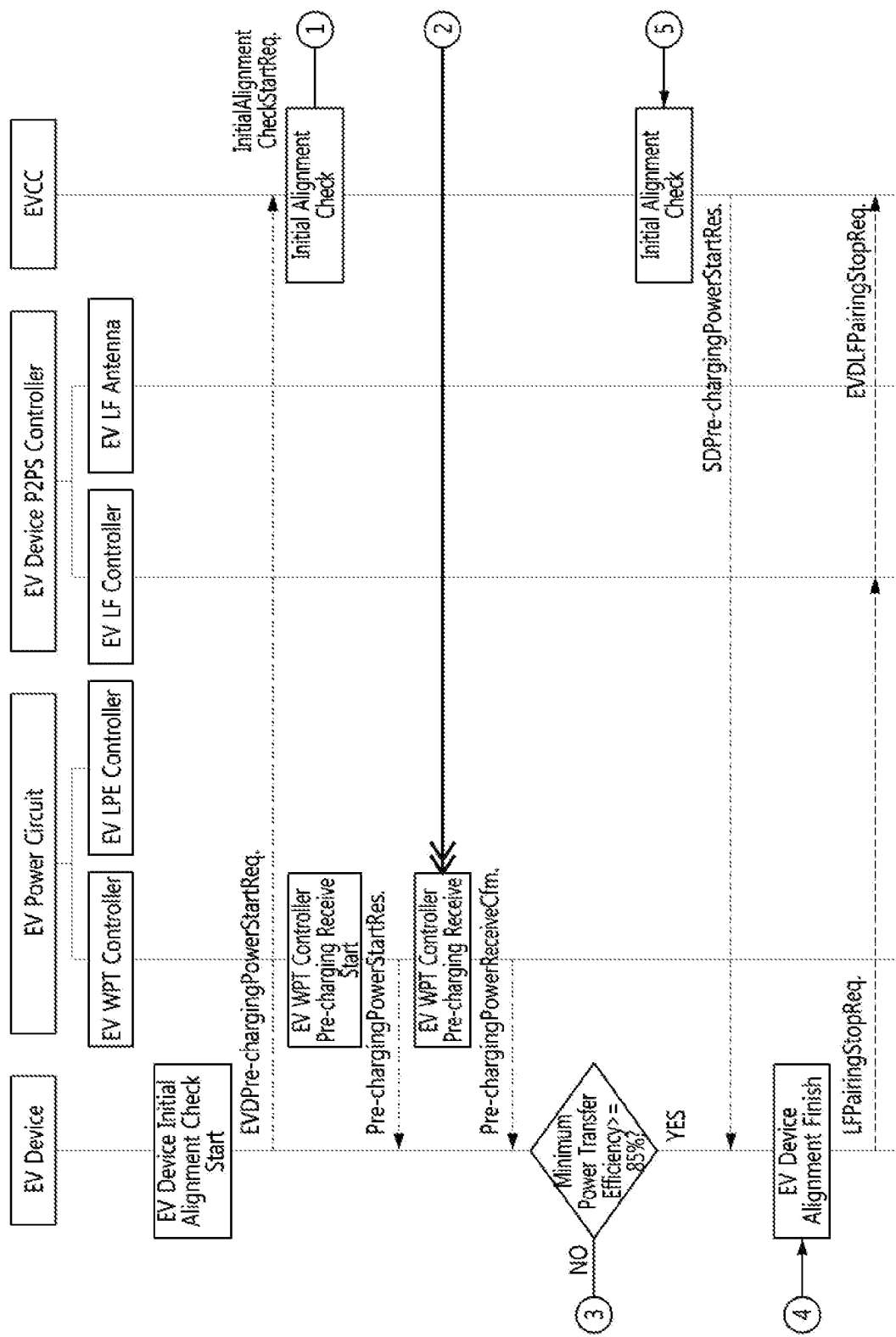
FIGS. 20A to 20E are flowcharts of an initial alignment check and a LF pairing stop process in wireless power transfer according to another embodiment of the present disclosure.
Figure 20B:
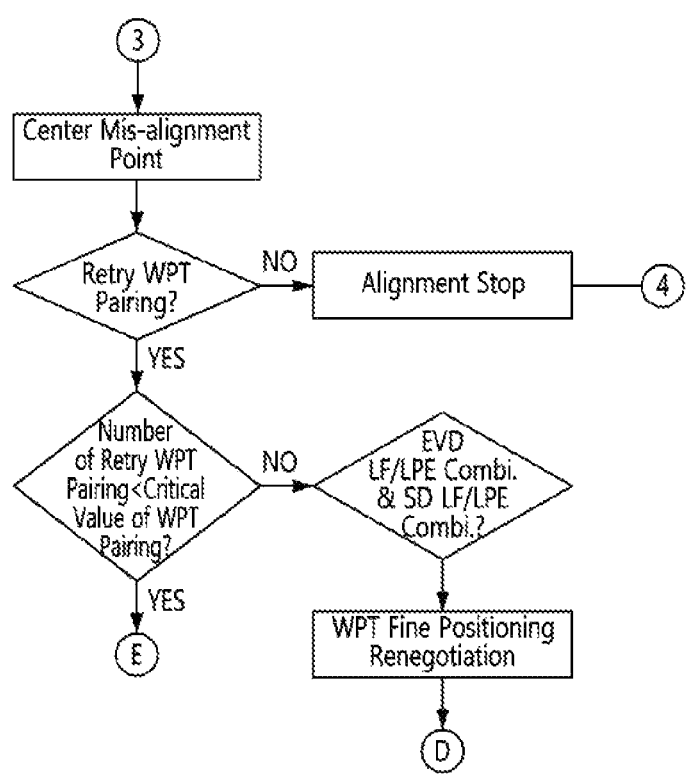
Figure 20C:
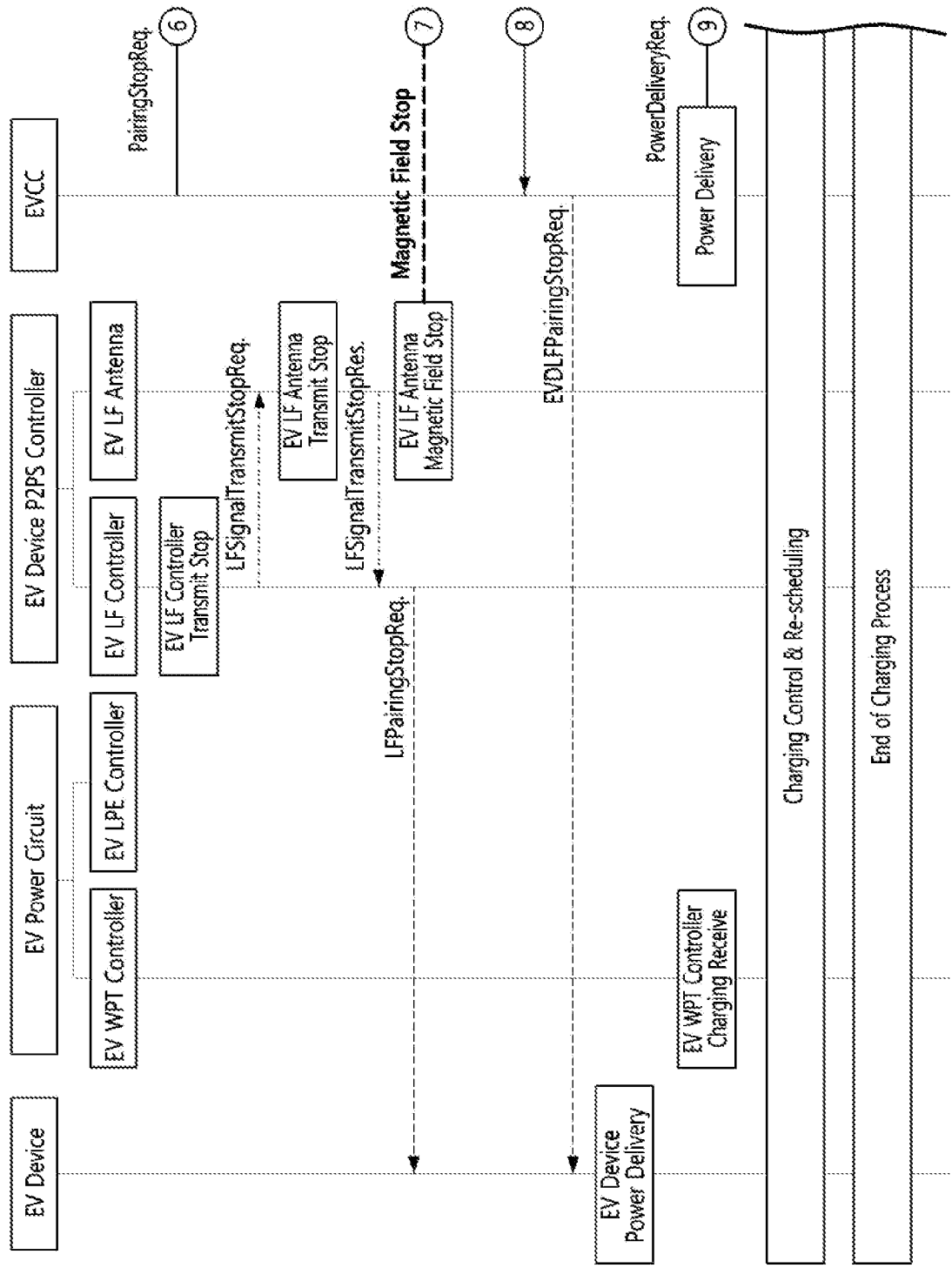
Figure 20D:
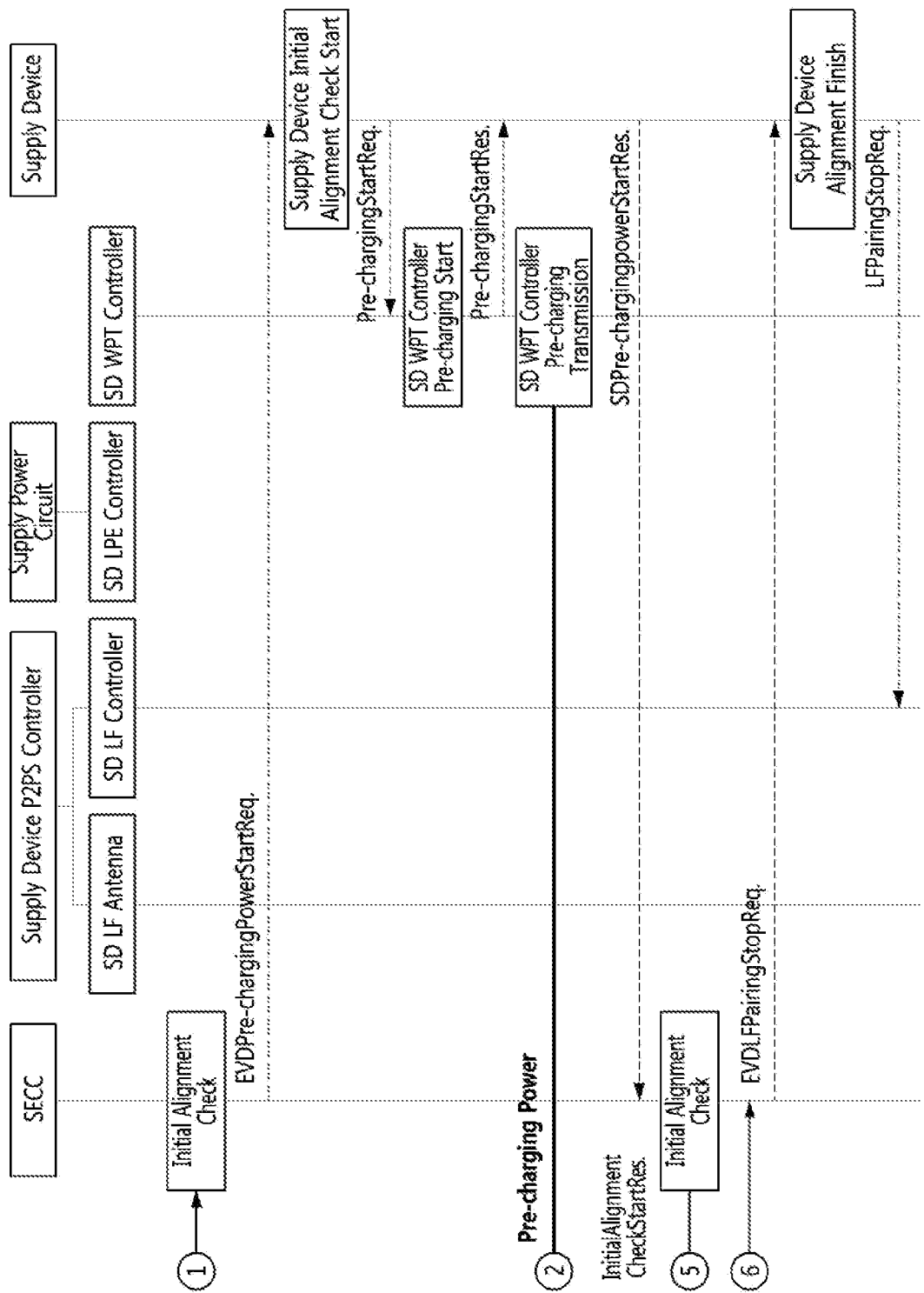
Figure 20E:
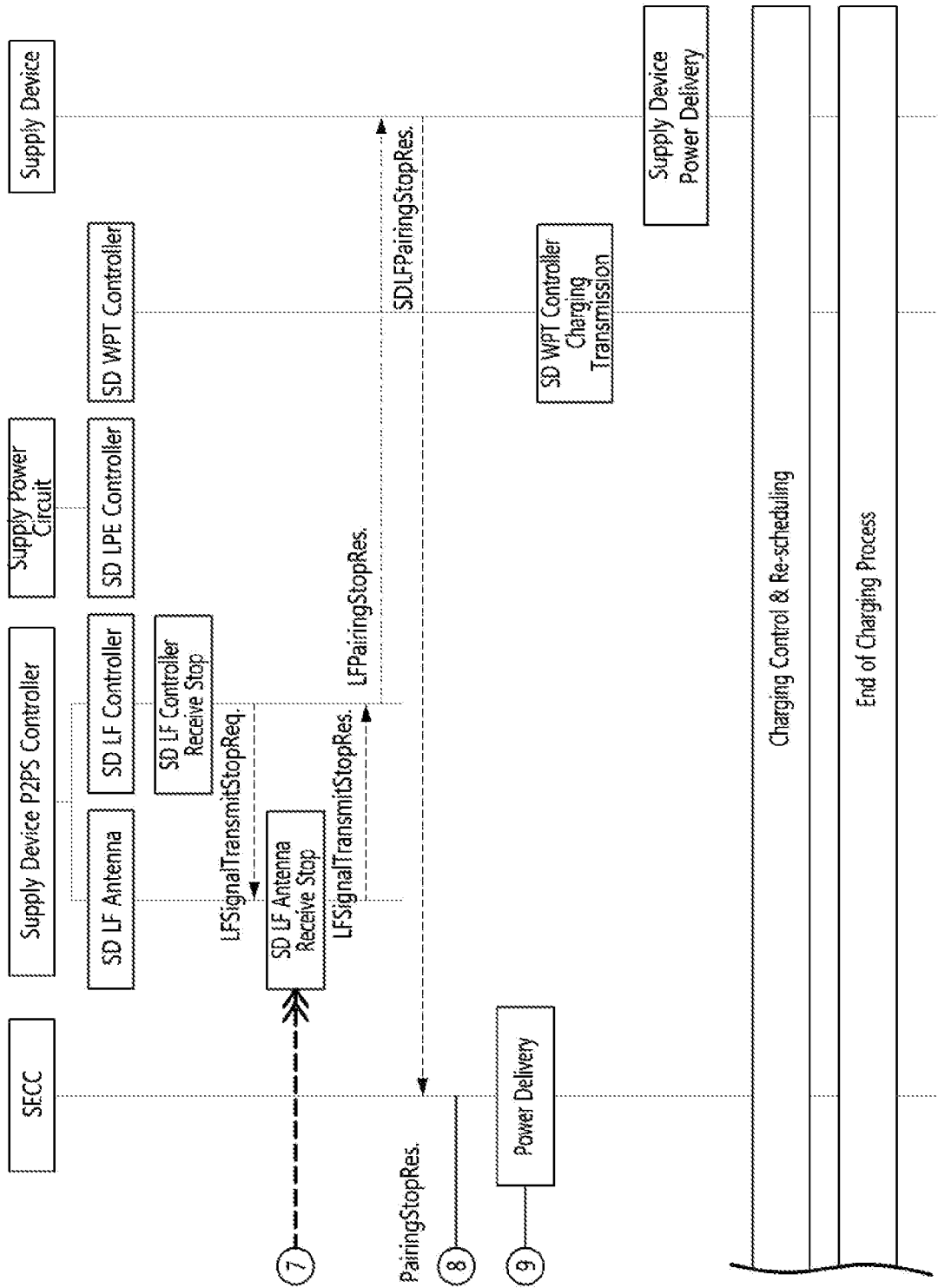

FIGS. 16A to 16B are flowcharts of a service detail check process in wireless power transfer according to another exemplary embodiment of the present disclosure. In the service detail check process, the EV power circuit 230, the EV device P2PS controller 250, the supply power circuit 130, and the supply device P2PS controller 150, in response to a service detail check request by the EV device, may be configured to check a state of the EV LPE, a state of the EV LF, a state of the supply device (SD) LPE, and a state of the SD LF, and return each state information to the EV device.

FIGS. 17A to 17D are flow charts of service selection and fine positioning setup in wireless power transfer according to another exemplary embodiment of the present disclosure. Referring to FIGS. 17A to 17D, in the service selection process, the EV device 200 may be configured to compare services that the EV device is capable of providing and services the supply device is capable of providing based on the state of the EV LPE, the state of the EV LF, the state of the SD LPE, and the state of the SD LF confirmed through the service detail check.

Specifically, in this step, the EV device 200 may be configured to check if the service that the EV device (EVD) is capable of providing is LPE, LF, or both LPE and LF, check if the service that the supply device (SD) is capable of providing is LPE, LF, or LPE and LF, and compare available services of the EV device and the supply device. In response to determining that the types of services capable of being provided by the EV device and the services capable of being provided by the supply device SD are different, the service session may be terminated or a re-association procedure may be performed. In response to determining that one or more service of the same type capable of being provided by both of the EV device and the supply device (SD), the EV device may be configured to select the one or more service and transmit the service selection result to the supply device 100 through the EVCC 240.

In the fine positioning setup process following the service selection process, the EV device first may be configured to check the fine positioning method selected through the service detail check and service selection process. Depending on whether the EV device uses LF, LPE, or both for fine positioning, the EV device may be configured to transmit a fine positioning initialization request (FinePositioningInitializationReq.) to the EV LPE controller and/or the EV device P2PS controller and receive a response to the initialization request (FinePositioningInitializationRes) from the controllers. The EV device may be configured to transmit a fine positioning setup request (FinePositioningSetupReq.) to the supply device when the confirmation of the LPE and/or LF for fine positioning is completed. The supply device may be configured to perform a fine positioning setup procedure (S620), by transmitting a fine positioning initialization request (FinePositioningInitializationReq.) to the SD LPE controller or the SD P2PS controller based on whether the supply device uses LF, LPE, or both methods for fine positioning and by receiving a response (FinePositioningInitializationRes.) from them.

FIGS. 18A to 18D are flowcharts of a fine positioning process and a pairing process in wireless power transfer according to another exemplary embodiment of the present disclosure.

When the fine positioning setup procedure is completed, the EV device may be configured to transmit a fine positioning wait request signal (FinePositioningAwaitReq.) to the EV power circuit 230 and the EV device P2PS controller 250 and receive response signals from the controllers. The supply device may also be configured to transmit a fine positioning wait request signal to the SD power circuit 130 and the supply device P2PS controller 150 and receive response signals from the controllers.

In the LF pairing process following the fine positioning setup process, the EV device P2PS controller 250 may be configured to transmit a magnetic field using the EV LF antenna according to the LF pairing start request (LFPairingStartReq.) from the EV device. The supply device 100 may be configured to detect the magnetic field using the SD LF antenna, the magnetic field (i.e., the LF signal) being transmitted by the EV LF antenna and reply to the EV device that the LF pairing data has been received.

FIGS. 19A to 19E are flowcharts of LF pairing hold and initial alignment check setup in wireless power transfer according to another exemplary embodiment of the present disclosure. During pairing, the EV device may be configured to compare a tolerance area of the supply device with position values of the EV device and compare a center alignment point of the supply device with the position values of the EV device to determine whether to continue or stop WPT pairing. In other words, LF pairing (LF pairing) may be held by a pairing hold request for a period of time required as shown in FIG. 19.

In the initial alignment check setup process, the EV device may be configured to transmit an initial alignment check setup request to the supply device 100 and request the EV power circuit 230 to perform pre-charging initialization and pre-charging await. The supply device 100, in response to receiving the request from the EV device, may be configured to request the SD WPT controller of the supply power circuit 130 to perform pre-charging initialization and pre-charging await.

FIGS. 20A to 20E are flowcharts of an initial alignment check and a LF pairing stop process in wireless power transfer according to another exemplary embodiment of the present disclosure. Following the initial alignment check setup procedure, the EV device 200 may be configured to transmit an initial alignment check start request (InitialAlignmentCheckStartReq.) to the supply device 100. In response to receiving the request, the supply device may be configured to request the SD WPT controller to transmit pre-charging power. The EV power circuit 230 of the EV device may be configured to receive the pre-charging power transmitted by the supply device and the EV device may be configured to determine whether to renegotiate WPT fine positioning based on the received pre-charging power.

More specifically, in the determination of whether to renegotiate WPT fine positioning, the EV device may be configured to determine whether a minimum power transfer efficiency of the pre-charging power received from the supply device is greater than or equal to a reference value. In response to determining that the minimum power transfer efficiency is greater than or equal to the reference value, a LF pairing may stop procedure and a LPE pairing procedure may be performed without renegotiating WPT fine positioning. The reference value related to power transmission efficiency may be about 85%.

On the other hand, in response to determining that the minimum power transmission efficiency is less than the reference value, the EV device may be configured to determine that a mis-alignment has occurred and determine whether to perform WPT pairing again. If the WPT pairing is not to be performed again, the alignment may be stopped, a safety monitoring and diagnostic check may be performed, and a V2G communication session may be terminated or a re-association may be performed. On the contrary, when performing WPT pairing again, whether a number of times the WPT pairing is re-executed is greater than or equal to a threshold regarding a number of WPT pairing repeats may be determined. In response to determining that the number of times the WPT pairing is re-performed is less than the threshold, another WPT pairing procedure may be performed.

Additionally, in response to determining that the number of times the WPT pairing is re-executed is greater than or equal to the threshold for WPT pairing repeats, the LF service and/or LPE service of the EV device and the supply device may be checked, and a WPT fine positioning renegotiation may be performed. Proceeding with the WPT fine positioning renegotiation indicates that the current procedure may proceed to the service selection step described in the exemplary embodiments of FIGS. 17A to 17D, and the fine positioning setup and fine positioning, LF pairing, and LF pairing hold procedures may be performed again. Meanwhile, once the initial alignment check procedure is completed, the LF pairing may be stopped and actual power transmission, charging control and re-scheduling between the primary device and the secondary device may be performed.

Figure 21:
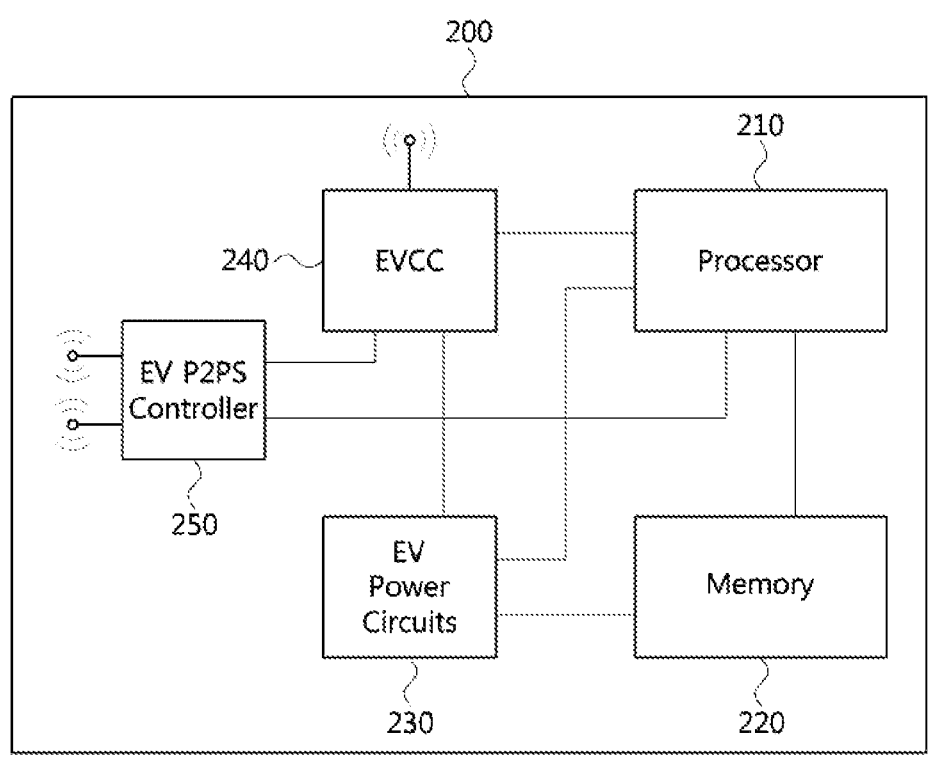
FIG. 21 is a block diagram of a power transmission control apparatus according to an exemplary embodiment of the present disclosure.

FIG. 21 is a block diagram of a power transmission control apparatus according to an exemplary embodiment of the present disclosure. The power transmission control apparatus 200 illustrated in FIG. 21 may be an EV device. In other words, the configuration of the power transmission control device 200 in the present specification is not limited to the name, and may be defined by its function. In addition, a plurality of functions may be performed by one component, and a plurality of functions may be performed by one component. The power transmission control device 200 may include at least one processor 210 and a memory 220 configured to store at least one instruction for executing the above-described operation through the processor.

The at least one processor may be a central processing unit (CPU), a graphics processing unit (GPU), or a dedicated processor on which methods in accordance with the exemplary embodiments of the present disclosure are performed. The memory may include at least one of a volatile storage medium and a nonvolatile storage medium. For example, the memory may comprise at least one of a read only memory (ROM) and a random access memory (RAM).

The at least one instruction may cause the at least one processor to check service details regarding a method for fine positioning and pairing between the supply device and the EV device and select a service; perform fine positioning with the supply device according to a pairing method associated with the selected service; perform LF pairing based on the selected service; perform an initial alignment check using pre-charging power transmission; and perform LPE pairing based on the selected service and a result of the initial alignment check.

The power transmission control device 200 may further include an EV Power Circuit 230 configured to receive power supplied by the supply device, an EV communication controller (EVCC) 240 configured to communicate with the supply device using wireless communication; and an EV device P2PS controller 250 forming a P2PS connection with the supply device using low frequency (LF) signals. Specifically, the EV power circuit may be configured to receive a low power excitation (LPE) signal transmitted by the supply device. The at least one instruction may further cause the at least one processor to perform LPE pairing based on the selected service and the result of performing the initial alignment check in case a minimum power transmission efficiency is greater than or equal to a reference value.

A service discovery response message provided by the supply device for checking the service detail may include a parameter indicating whether a service renegotiation is possible. The service renegotiation may be triggered by the supply device or by the EV device during charging, or triggered when the supply device and the EV device wake up from a charging paused period.

The at least one instruction may further cause the at least one processor to determine whether to perform a WPT fine positioning and pairing renegotiation based on the pre-charging power received from the supply device. The at least one instruction may further cause the at least one processor to determine whether a minimum power transfer efficiency of the pre-charging power is greater than or equal to a reference value; confirm that a misalignment has occurred when the minimum power transmission efficiency is less than a reference value; and determine to perform the WPT fine positioning and pairing renegotiation according to the misalignment. The at least one instruction may further cause the at least one processor, in response to determining a WPT fine positioning and pairing renegotiation, to re-execute checking the service details and selecting a service, performing the fine positioning, and performing the LF pairing.

Figure 22:
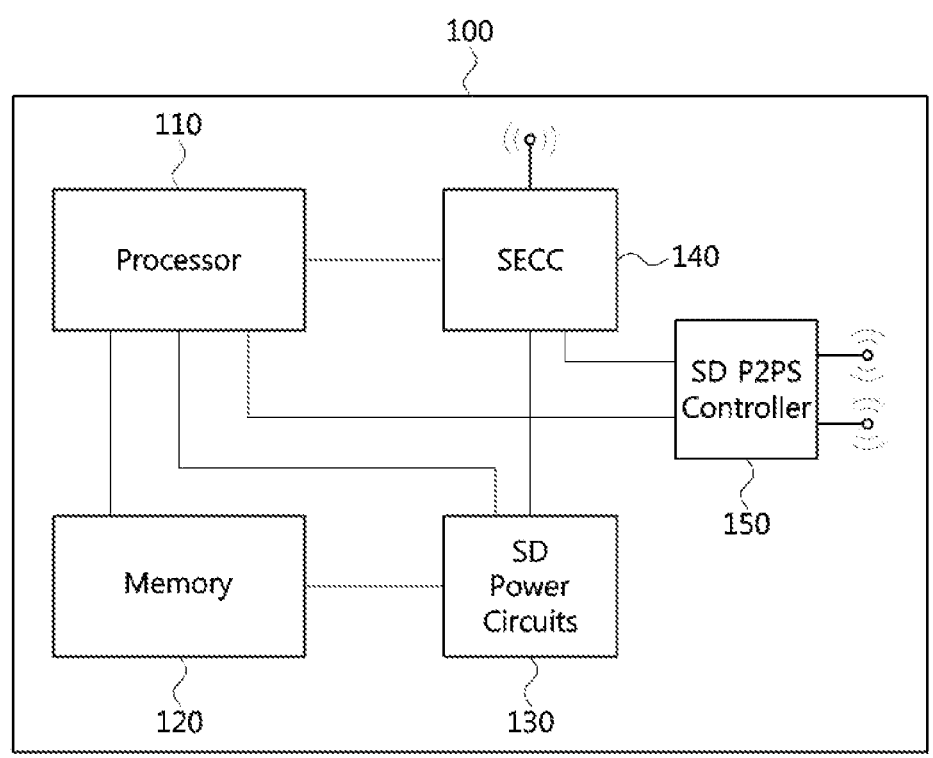
FIG. 22 is a block diagram of a wireless power transfer apparatus according to an exemplary embodiment of the present disclosure.

FIG. 22 is a block diagram of a wireless power transfer apparatus according to an exemplary embodiment of the present disclosure. The wireless power transfer device 100 shown in the exemplary embodiment shown in FIG. 22 may be a supply device. In other words, the configuration of the wireless power transfer apparatus 100 in this specification is not limited to the name, and may be defined by its function. In addition, a plurality of functions may be performed by one component, and a plurality of functions may be performed by one component. The wireless power transfer apparatus 100 may include at least one processor 110 and a memory 120 configured to store at least one instruction for executing the above-described operation through the processor.

The at least one processor may be a central processing unit (CPU), a graphics processing unit (GPU), or a dedicated processor on which methods in accordance with the exemplary embodiments of the present disclosure are performed. The memory may include at least one of a volatile storage medium and a nonvolatile storage medium. For example, the memory may comprise at least one of a read only memory (ROM) and a random access memory (RAM).

The at least one instruction may cause the at least one processor to check, in response to a service detail check request from the EV device, service statuses regarding at least one method for fine positioning and pairing between the supply device and the EV device and transmitting a response based on the check; perform fine positioning with the EV device according to a pairing method associated with a service selected by the EV device; perform LF (Low Frequency) pairing based on the selected service; transmit pre-charging power to be used for initial alignment check to the EV device; perform Low Power Excitation (LPE) pairing based on the selected service and a result of the initial alignment check; and transfer power to the EV device. The wireless power transfer device 100 may also include a supply power circuit (SPC) 130 configured to transmit power to the EV device, a supply device communication controller 140 configured to communicate with the EV device using wireless communication, and the supply device P2PS controller 150 forming a P2PS connection with the EV device using the LF signal.

While some aspects of the present disclosure have been described in the context of an apparatus, the present disclosure may also represent a description according to a corresponding method, wherein the block or apparatus corresponds to a method step or a feature of the method step. Similarly, aspects described in the context of a method may also be represented by features of the corresponding block or item or corresponding device. Some or all of the method steps may be performed by (or using) a hardware device such as, for example, a microprocessor, a specifically programmed computer, or an electronic circuit. In various exemplary embodiments, one or more of the most important method steps may be performed by such an apparatus.

In exemplary embodiments, a programmable logic device (e.g., a field programmable gate array (FPGA)) may be used to perform some or all of the functions of the methods described herein. In addition, the FPGA may be configured to operate in conjunction with a microprocessor to perform one of the methods described herein. Generally, the methods are performed by some hardware device.

The foregoing description has been directed to exemplary embodiments of the present disclosure. It will be apparent, however, that other variations, substitutions and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:

1. A method for controlling wireless power transfer (WPT), performed by an electric vehicle (EV) device receiving power from a supply device, the method comprising:
exchanging messages with the supply device to check service details and select at least one service of services that the supply device is capable of providing, the service details including at least one method for fine positioning, pairing and alignment check in a service session for the WPT between the supply device and the EV device, and the at least one method including a method using Low Frequency (LF) or Low Power Excitation (LPE);
performing fine positioning with the supply device based on a service selected from the at least one method;
performing pairing with the supply device based on a service selected from the at least one method; and
performing an alignment check to check and confirm a position of the EV device with a primary device of the supply device,
wherein a service discovery response message provided by the supply device for checking the service detail includes a parameter that indicates whether a service renegotiation is possible.

2. The method according to claim 1, wherein the service renegotiation is triggered through a charging loop message by the supply device.

3. The method according to claim 1, wherein the service renegotiation is triggered through a power delivery request message by the EV device.

4. The method according to claim 3, further comprising transmitting a service discovery request message to a supply equipment communication controller (SECC) of the supply device and renegotiate the service after the service renegotiation is triggered.

5. The method according to claim 4, further comprising receiving a different set of services and parameters in at least one of a service discovery response message and a service detail response message from the SECC.

6. The method according to claim 1, wherein the service renegotiation is triggered at waking up a paused period which is a duration of time of a session when no energy is transferred.

7. The method according to claim 1, wherein the service renegotiation is triggered at waking up a paused period which is a duration of time of a session when no communication is active between an EV communication controller (EVCC) of the EV device and a supply equipment communication controller (SECC) of the supply device.

8. The method according to claim 1, further comprising performing an authentication process between the EV device and the supply device based on an authentication request message being sent to the supply device.

9. The method according to claim 1, further comprising re-executing steps of checking service details and selecting a service of the services after the service renegotiation is triggered.

10. An apparatus for controlling wireless power transfer (WPT) in an Electric Vehicle (EV) device, including at least one processor and a memory configured to store at least one instruction executable by the at least one processor, wherein when executed by the at least one processor, the at least one instruction causes the at least one processor to:
exchange messages with the supply device to check service details and select at least one service of services that the supply device is capable of providing, the service details including at least one method for fine positioning, pairing and alignment check in a service session for the WPT between the supply device and the EV device, and the at least one method including a method using Low Frequency (LF) or Low Power Excitation (LPE);
perform fine positioning with the supply device based on a service selected from the at least one method;
perform pairing with the supply device based on a service selected from the at least one method; and
perform an alignment check to check and confirm a position of the EV device with a primary device of the supply device,
wherein a service discovery response message provided by the supply device for checking the service detail includes a parameter that indicates whether a service renegotiation is possible.

11. The apparatus according to claim 10, further comprising:
- an EV communication controller (EVCC) configured to communicate with the supply device using wireless communication; and
- an EV device Point to Point signal (P2PS) controller forming a P2PS connection with the supply device using low frequency (LF) signals.

12. The apparatus according to claim 11, wherein the service renegotiation is triggered through a charging loop message by the supply device or a power delivery request message by the EV device.

13. The apparatus according to claim 12, wherein after the service renegotiation is triggered, the EVCC transmits a service discovery request message to a supply equipment communication controller (SECC) of the supply device and renegotiate the service.

14. The apparatus according to claim 13, wherein the EVCC receives a different set of services and parameters in at least one of a service discovery response message and a service detail response message from the SECC.

15. The apparatus according to claim 10, wherein the service renegotiation is triggered at waking up a paused period which is a duration of time of a session when no communication is active between an EV communication controller (EVCC) of the EV device and a supply equipment communication controller (SECC) of the supply device.

16. The apparatus according to claim 10, wherein the at least one instruction further causes the at least one processor to re-execute steps of checking service details and selecting a service of the services after the service renegotiation is triggered.

17. A wireless power transfer (WPT) method, performed by a supply device supplying power to an electric vehicle (EV) device, the WPT method comprising:
- providing details of services capable of providing to the EV device by exchanging messages with the EV device, the service details including at least one method for fine positioning, pairing and alignment check in a service session for the WPT between the supply device and the EV device, and the at least one method including a method using Low Frequency (LF) or Low Power Excitation (LPE);
- performing fine positioning with the EV device based on a service selected from the at least one method; and
- performing pairing with the EV device based on a service selected from the at least one method;
- wherein a service discovery response message provided by the supply device for checking the service detail includes a parameter that indicates whether a service renegotiation is possible.

18. The method according to claim 17, wherein the service renegotiation is triggered through a charging loop message by the supply device or a power delivery request message by the EV device.

19. The method according to claim 18, wherein after the service renegotiation is triggered, a supply equipment communication controller (SECC) of the supply device receives a service discovery request message for renegotiating the service from an EV communication controller (EVCC) of the EV device.

20. The method according to claim 19, wherein the SECC offers the EVCC to a different set of services and parameters in at least one of a service discovery response message and a service detail response message.

* * * * *